(12) United States Patent
Yamanaka et al.

(10) Patent No.: US 8,049,968 B2
(45) Date of Patent: Nov. 1, 2011

(54) ZOOM LENS

(75) Inventors: Hisayuki Yamanaka, Saitama (JP);
Dayong Li, Saitama (JP)

(73) Assignee: Tamron Co., Ltd., Saitama (JP)

( * ) Notice: Subject to any disclaimer, the term of this patent is extended or adjusted under 35 U.S.C. 154(b) by 145 days.

(21) Appl. No.: 12/318,515

(22) Filed: Dec. 30, 2008

(65) Prior Publication Data

US 2009/0195885 A1     Aug. 6, 2009

(30) Foreign Application Priority Data

Jan. 11, 2008   (JP) ................................ 2008-004557
Jan. 11, 2008   (JP) ................................ 2008-004558

(51) Int. Cl.
*G02B 15/14* (2006.01)

(52) U.S. Cl. ....................................... 359/676; 359/684

(58) Field of Classification Search .................. 359/676, 359/684, 687
See application file for complete search history.

(56) References Cited

U.S. PATENT DOCUMENTS

| 5,585,969 | A  | * | 12/1996 | Endo ............................. | 359/683 |
| 7,573,649 | B2 | * | 8/2009  | Arakawa ....................... | 359/687 |
| 7,672,063 | B2 | * | 3/2010  | Take ............................. | 359/687 |

FOREIGN PATENT DOCUMENTS

| JP | H10-133107 | 5/1998 |
| JP | 2000-47107 | 2/2000 |
| JP | 2005-292338 | 10/2005 |

* cited by examiner

*Primary Examiner* — Jordan Schwartz
(74) *Attorney, Agent, or Firm* — Jacobson Holman PLLC

(57) ABSTRACT

The invention is directed to inner-focusing zoom lenses that include multi groups of lens pieces, namely, the first lens group or the leading lens group of positive refractivity, the second lens group of negative refractivity, and the remaining trailing groups of positive refractivity, as a whole. At least one group of positive refractivity among the trailing groups includes two or more negative lens pieces, at least one of which is connected on its surface to another lens piece to form a duplicated composite lens so that the junction between two of them functions to diverge incident beams. Assuming now that a sum of the refractivities of all the junctions of the composite lenses can be expressed as $\Sigma\phi=\Sigma|(N1-N2)/R|$ where N1 and N2 are refractivities that substances before and after the junction of the composite lenses respectively have, R is a radius of curvature of the junction, ft is a focal length of the comprehensive lens optics of the zoom lens at the telephoto end.

5 Claims, 42 Drawing Sheets

ZOOM LENS

FIELD OF THE INVENTION

The present invention relates to inner-focusing or rear-focusing, telephotography zoom lenses, and more particularly, to zoom lenses suitable for 35-mm cameras, video cameras, electronic still cameras, and so forth that are of approximately 4.3 to 5.7 in variable power ratio and that are capable of attaining enhanced optical performances throughout the entire ranges of both power ratio and objective distance.

The present invention is especially directed to zoom lenses that have merely a single group of lens pieces among other groups utilized for inner-focusing or rear-focusing, to well compensate for varied spherical aberration at the telephoto end during focusing.

BACKGROUND ART

In the prior art, it is well known that some zoom lenses are adapted to simply displace the leading group of lens pieces closest to a subject being photographed for the focusing, which may be referred to as a 'front lens focusing system'. With such a front lens focusing system, switching the focusing mode to 'Automatic' forces the large heavy lens pieces to move instantaneously, resulting in an unsatisfactory rapidity.

Additional types of the focusing system, which are known as 'inner-focusing' and 'rear-focusing,' have been developed in the art which enable rapid focusing by virtue of the reduced dimensions of the focusing lens groups.

With such inner-focusing and rear-focusing, however, their rapid focusing ability is a tradeoff of more largely varied aberration, and as a result of the focusing, it becomes hard to compensate well for so much variation in the aberration.

In a specific type of the zoom lens, which is for telephoto shooting with a field angle 2ω of less than 40 degrees at the wide-angle end, a positive lens piece(s) in the first lens group has its convex surface faced toward the image plane while a negative lens piece(s) closest to the subject being photographed in the second lens group has it objective surface flattened or convex in shape and faced toward the subject being photographed, so as to reduce variations in spherical aberration at the telephoto end, thereby facilitating the compensation, which is a tradeoff of considerable difficulties in adjusting and controlling the varied curvature of the image plane at the wide-angle end.

For instance, one typical inner-focusing zoom lens already disclosed is of five groups of lens pieces, including their respective optical properties, i.e., of positive, negative, positive, positive, and negative refractivities, respectively (see Patent Document 1 listed below).

Another zoom lens coping with the aforementioned disadvantage in the art is of six groups of lens pieces where only the fifth succeeding to the first or the leading group of them are displaced for the focusing (see Patent Document 2 listed below).

Still another typical zoom lens in the prior art is of six groups of lens pieces, namely, the ones respectively having positive, negative, positive, negative, positive, and negative refractivities, and the sixth serving as the primary focusing lens along with the fourth behave as floating lens during the focusing for a shift from the long distance zooming to the short distance zooming (see Patent Document 3 listed below).

Patent Document 1
Japanese Patent Publication of Unexamined Application No. 2005-292338

Patent Document 2
Japanese Patent Publication of Unexamined Application No. H10-133107

Patent Document 3
Japanese Patent Publication of Unexamined Application No. 2000-47107

The zoom lens as disclosed in Patent Document 1 has a problem of significant variation in curved image plane at the wide-angle end due to a negative lens piece closest to the subject being photographed in the second lens group that has its surface closer to the subject shaped in concave.

In the zoom lens as disclosed in Patent Document 2, the first or foremost of the lens groups under-correct the varied spherical aberration during the focusing for the shift from the long distance zooming to the short distance zooming, but instead, the fifth lens group permits the variations in spherical aberration to be overdone and prevalent by means of connecting a single negative lens piece and another lens piece into a composite lens with its junction serving to diverge incident beams, so as to countervail the variations in the spherical aberration in the lens optics, as a whole. Configured in this manner, however, the zoom lens fails to sufficiently adjust the varied spherical aberration as desired in the comprehensive lens optics, especially, at the telephoto end, due to the insufficient diverging effects at the junction of the composite lenses.

Patent Document 2 also teaches the fifth and the fourth of the lens groups behave in the floating manner for focusing. This is especially for adjusting and controlling both the curved image plane at the wide-angle end and the varied spherical aberration at the telephoto end. In contrast with the one that carries out the focusing simply relying on the inner-focusing system, however, this prior art embodiment becomes more complicated in structure because of additional coupling components to a lens barrel to cope with the floating.

According to the disclosure of Patent Document 3, the first to the fourth of the lens groups under-correct the varied spherical aberration, and instead, the fifth turns the same overdone and prevalent during the focusing, which permit the variations in spherical aberration to be reduced in the lens optics, as a whole. However, the negative lens of the composite lens effects insufficient to diverge the incident beam thereon to satisfactorily compensate for the varied spherical aberration at the telephoto end. Moreover, the teachings about the focusing where the fourth and the six of the lens groups behave in a floating manner bring about another problem of the more complicated structure due to the coupling components added to the lens barrel to conduct the floating.

During focusing for the shift from long distance zooming to short distance zooming, in general, the zoom lens is prone to under-correct the variations in spherical aberration unless it is specifically modified to address the desired reduction in displacement of the focusing lens groups or modified in some other ways, and this tendency is conspicuous especially at the telephoto end. As to the zoom lenses designed specifically for telephoto shooting where a focal length is as long as 400 mm, degradation in optical performance is considerable during the focusing for the short distance zooming.

The present invention is made to overcome the aforementioned disadvantages in the prior art that zoom lenses employing a focusing system such as inner-focusing, rear-focusing, or the like, allow for rapid focusing in contrast with the front lens focusing system but compromise with difficulty in well compensating for the varied aberration, and accordingly, it is an object of the present invention to provide a zoom lens that has merely a single group of lens pieces among other groups utilized for inner-focusing or rear-focusing to well compensate for varied spherical aberration at the telephoto end during focusing.

SUMMARY OF THE INVENTION

In an aspect of the present invention, there is provided an inner-focusing zoom lens that includes multi groups of lens pieces, namely, the first lens group or the leading lens group of positive refractivity, the second lens group of negative refractivity, and the remaining trailing groups of positive refractivity, as a whole. At least one group of positive refractivity among the trailing groups includes two or more negative lens pieces, at least one of which is connected on its surface to another lens piece to form a doublet composite lens so that the junction between two of them functions to diverge incident beams. Assuming now that a sum of the refractivities of all the junctions of the composite lenses can be expressed as $\Sigma\phi=\Sigma|(N1-N2)/R|$ where N1 and N2 are refractivities that substances before and after the junction of the composite lenses respectively have, R is a radius of curvature of the junction, ft is a focal length of the comprehensive lens optics of the zoom lens at the telephoto end, and $\phi t=1/ft$ is the refractivity of the comprehensive lens optics at the telephoto end, the requirements as defined in the following formula are satisfied:

$$2<\Sigma\phi/\phi t<10 \quad (1)$$

The inner-focusing zoom lens of the present invention can be described in more detailed as follows:

The zoom lens is comprised of at least five of the groups of lens pieces, namely, the first lens group or the leading lens group of positive refractivity, the second lens group of negative refractivity, the third lens group of positive refractivity, the fourth lens group of positive refractivity, and the fifth lens group of negative refractivity all arranged in order from the object (the subject being photographed) side, and the fourth lens group includes two or more negative lens pieces, at least one of which is connected on its surface to another lens piece into a doublet composite lens so that the junction between two of them functions to diverge incident beams.

The zoom lens is modified to includes at least six of the groups of lens pieces, namely, the first lens group or the leading lens group of positive refractivity, the second lens group of negative refractivity, the third lens group of positive refractivity, the fourth lens group of positive refractivity, the fifth lens group of positive refractivity, and the six lens group of negative refractivity all arranged in order from the object side, and the fifth lens group includes two or more negative lens pieces, at least one of which is connected on its surface to another lens piece into a doublet composite lens so that the junction between two of them functions to diverge incident beams.

The zoom lens in the present aspect is characterized in that the rearmost lens group closest to the image plane is used for the focusing.

The zoom lens in the present aspect is also characterized in that the rearmost lens of positive refractivity and closest to the image plane are used for the focusing.

The zoom lens is also characterized in that at least one group of positive refractivity among the third lens group and all the succeeding lens groups includes a triplet composite lens of negative-positive-negative power configuration of three of the lens pieces.

In another aspect of the present invention, the zoom lens is comprised of at least five of the groups of lens pieces, namely, the first lens group or the leading lens group of positive refractivity, the second lens group of negative refractivity, the third lens group of positive refractivity, the fourth lens group of positive refractivity, and the fifth lens group of negative refractivity all arranged in order from the object side, or is modifiably comprised of at least six of the groups of lens pieces, namely, the first lens group or the leading lens group of positive refractivity, the second lens group of negative refractivity, the third lens group of positive refractivity, the fourth lens group of positive refractivity, the fifth lens group of positive refractivity, and the six lens group of negative refractivity all arranged in order from the object side. In either of such zoom lenses, the first lens group at least includes one negative lens piece and two or more positive lens pieces, and the first lens group provides optical properties as expressed by the following formulae:

$$40<vd1<55 \quad (2)$$

$$20<vd2<35 \quad (3)$$

where vd1 is an Abbe number of the negative lens piece(s) in the first lens group, and vd2 is the Abbe number of the positive lens piece(s) in any one of the lens groups of positive refractivity succeeding to the first lens group.

In still another aspect of the present invention, the inner-focusing zoom lens that does not conduct the floating focusing includes multi groups of lens pieces, namely, the first lens group or the leading lens group of positive refractivity, the second lens group of negative refractivity, and the remaining trailing groups of positive refractivity, as a whole. The second lens group includes a meniscus negative lens having its convex surface faced toward the subject being photographed, and another composite lens having negative and positive lens pieces connected to one another, and the second lens group provides optical properties as expressed by the following formulae:

$$1<R/f(\text{wide})<8 \quad (4)$$

$$2\omega(\text{wide})<40 \quad (5)$$

where R is a radius of curvature of an objective surface of the foremost lens piece in the second lens group, f(wide) is a focal length of the comprehensive lens optics at the wide-angle end, and $\omega$(wide) is a half field angle of the comprehensive lens optics at the wide-angle end.

The zoom lens in the present aspect is characterized in that at least one group of positive refractivity among the third lens group and all the succeeding lens groups includes a triplet composite lens of negative-positive-negative power configuration of three of the lens pieces.

The zoom lens is comprised of the first lens group or the leading lens group of positive refractivity, the second lens group of negative refractivity, and the remaining trailing groups of positive refractivity, as a whole. At least one group of positive refractivity among the trailing groups includes two or more negative lens pieces, at least one of which is connected on its surface to another lens piece to form a doublet composite lens so that the junction between two of them functions to diverge incident beams. Assuming now that a sum of the refractivities of all the junctions of the composite lenses can be expressed as $\Sigma\phi=\Sigma|(N1-N2)/R|$ where N1 and N2 are refractivities that substances before and after the junction of the composite lenses respectively have, R is a radius of curvature of the junction, f(tele) is a focal length of the comprehensive lens optics of the zoom lens at the telephoto end, and $\phi(\text{tele})=1/f(\text{tele})$ is the refractivity of the comprehensive lens optics at the telephoto end, the following formula is given:

$$2<\Sigma\phi/\phi(\text{tele})<10 \quad (6)$$

The zoom lens can be modified to be characterized in that at least one group of positive refractivity among the third lens group and all the succeeding lens groups includes a triplet composite lens of negative-positive-negative power configuration of three of the lens pieces.

DETAILED DESCRIPTION OF THE INVENTION

Figure 1:
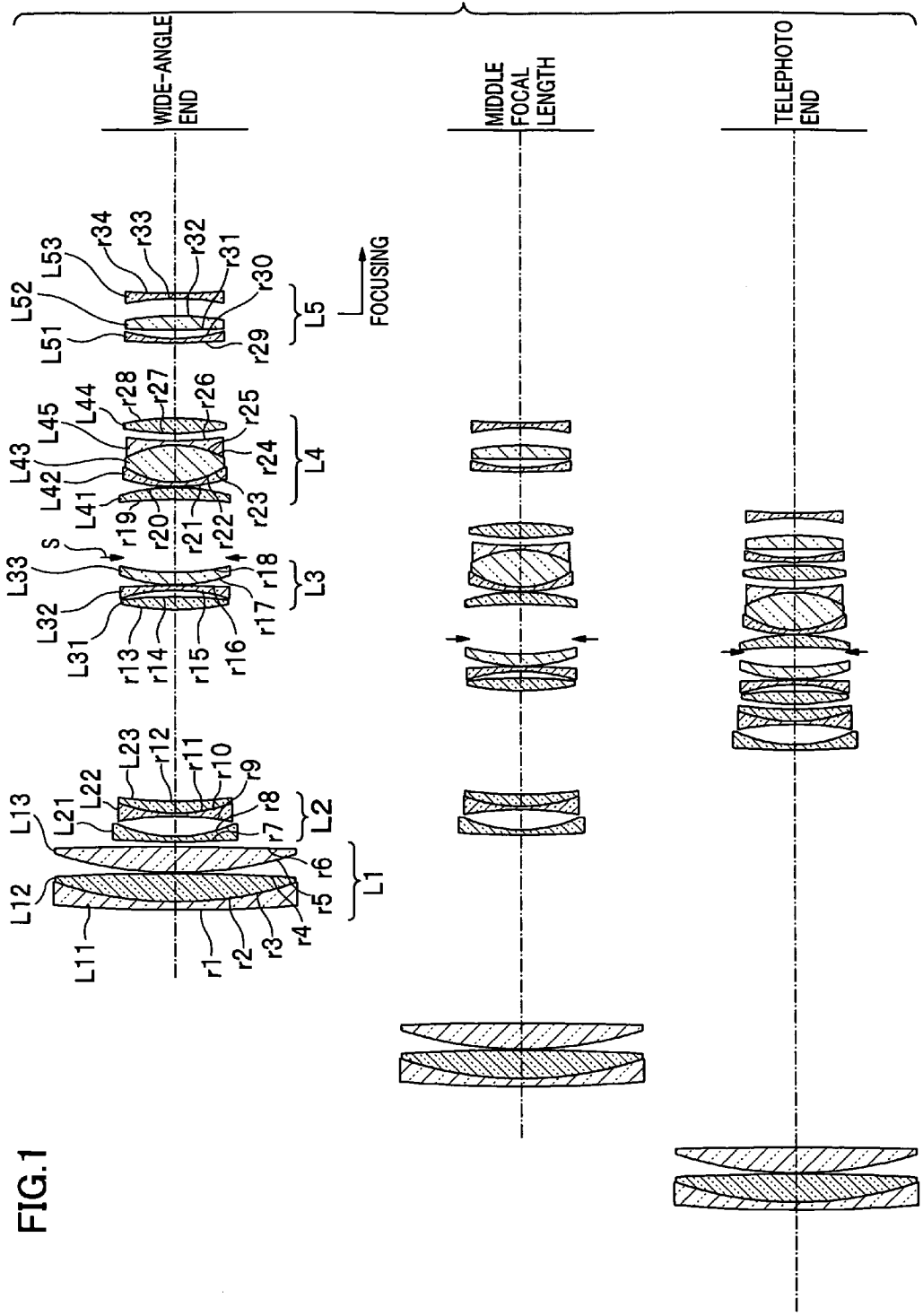
FIG. 1 is a sectional view illustrating a first embodiment of a zoom lens in accordance with the present invention.
Figure 2:
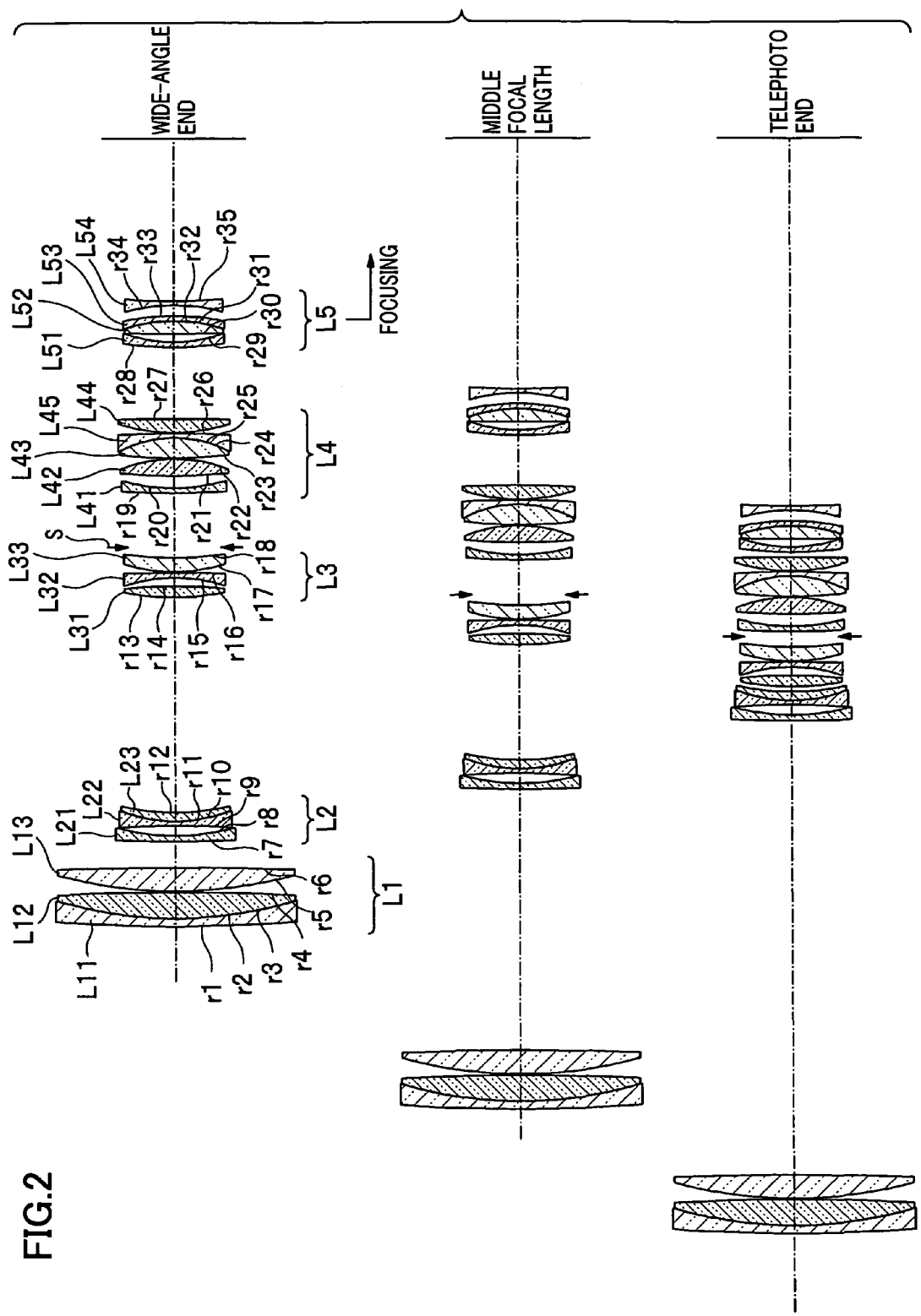
FIG. 2 is a sectional view illustrating a second embodiment of the zoom lens in accordance with the present invention.
Figure 3:
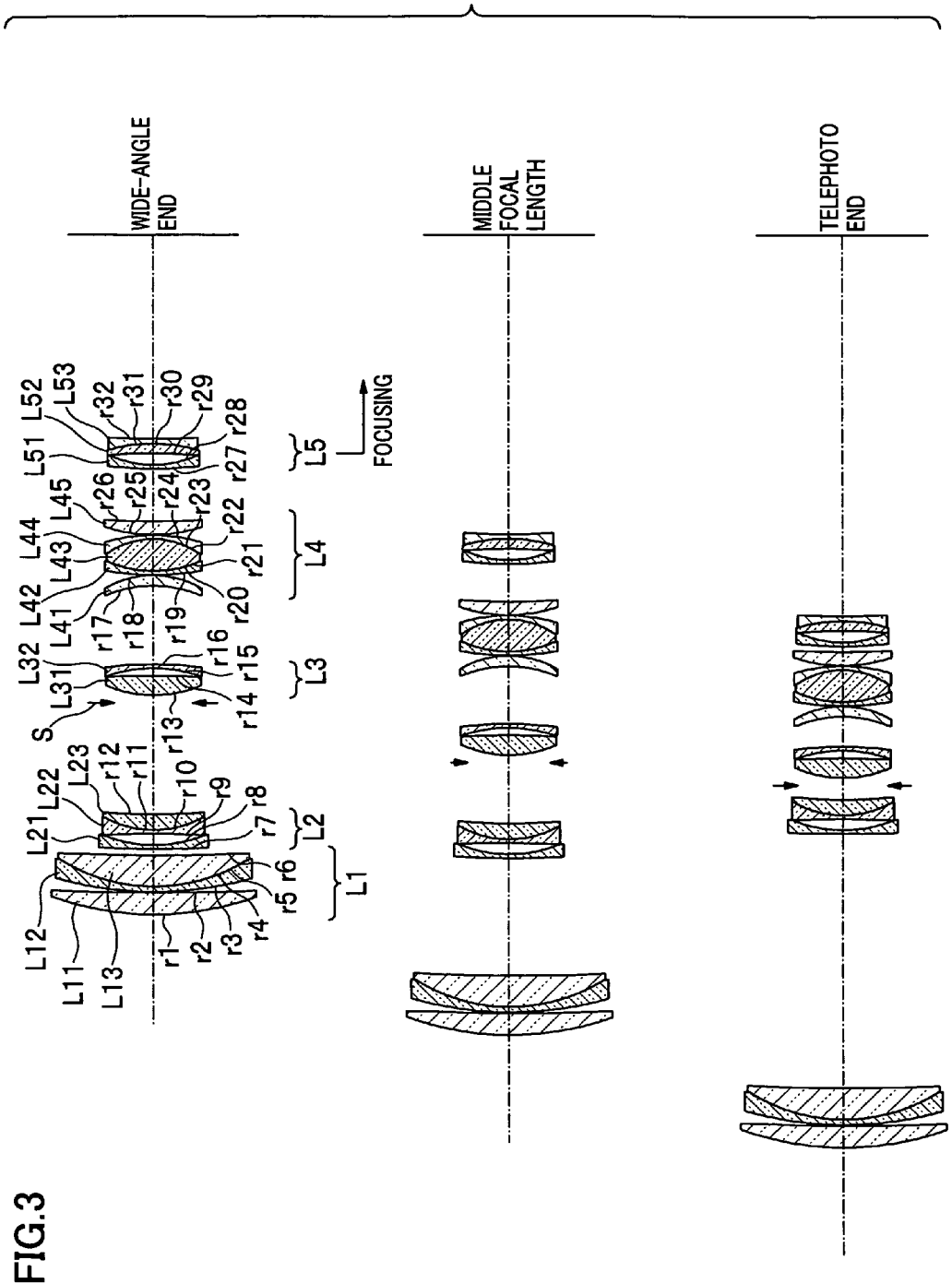
FIG. 3 is a sectional view illustrating a third embodiment of the zoom lens in accordance with the present invention.
Figure 4:
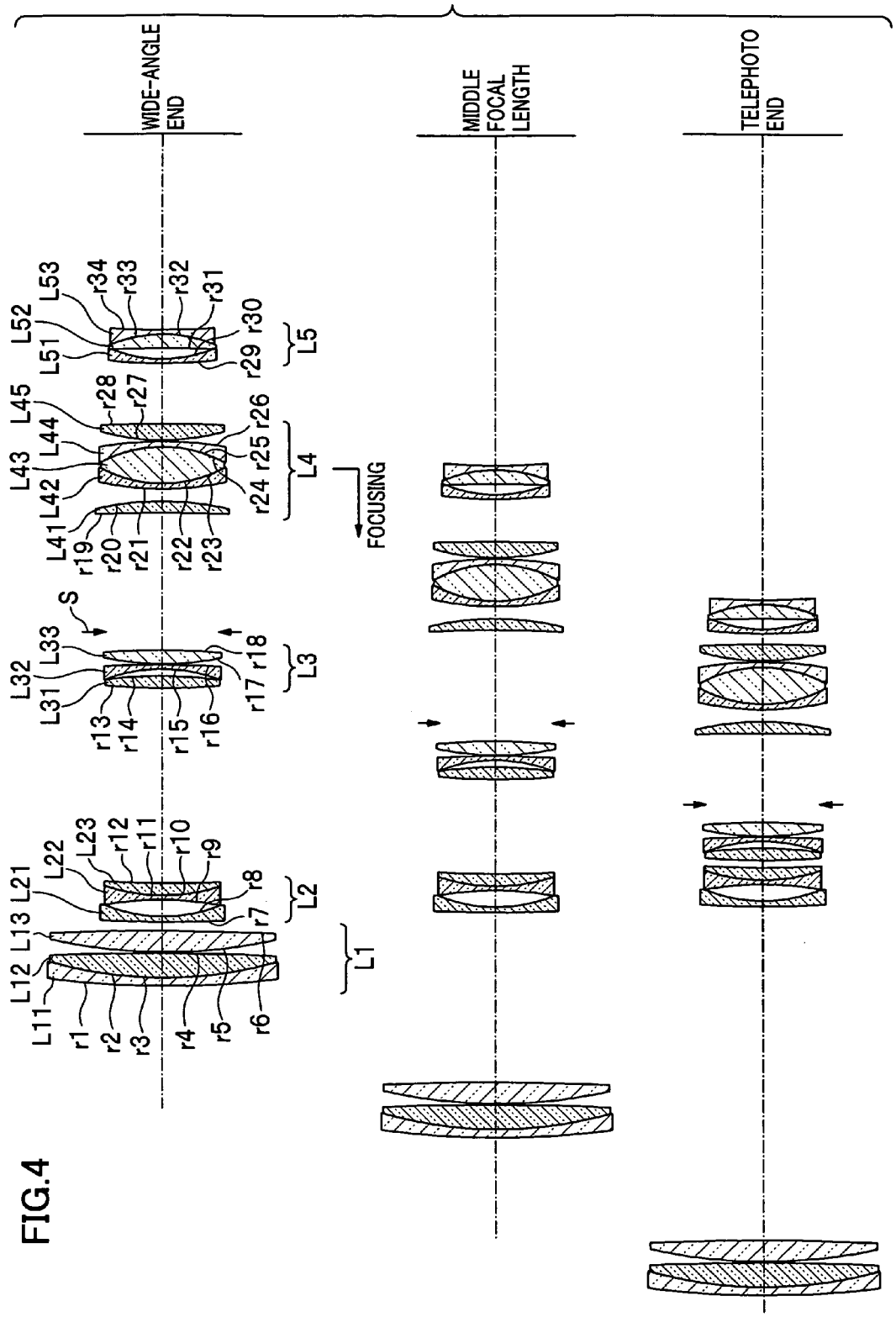
FIG. 4 is a sectional view illustrating a fourth embodiment of the zoom lens in accordance with the present invention.
Figure 5:
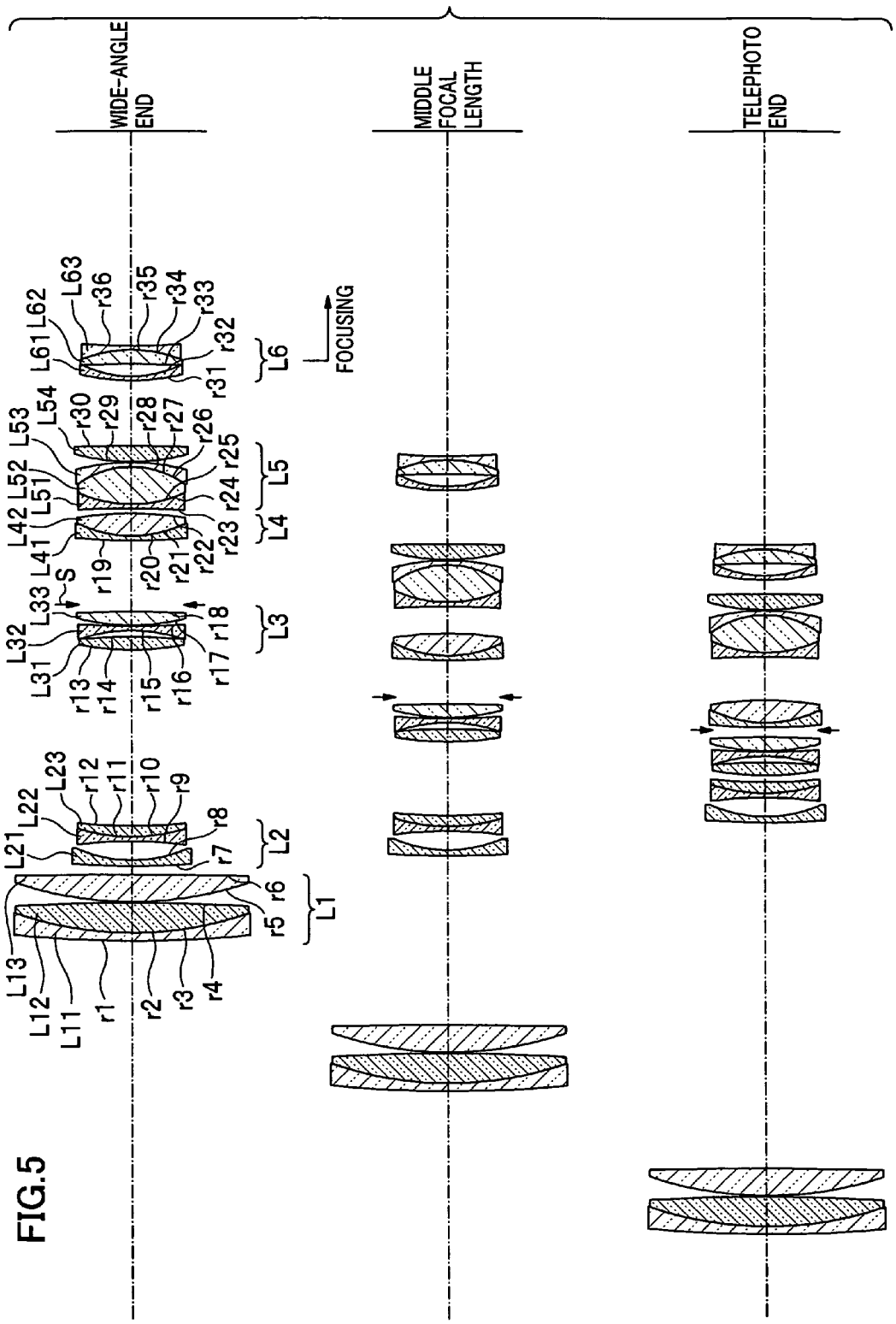
FIG. 5 is a sectional view illustrating a fifth embodiment of the zoom lens in accordance with the present invention.
Figure 6:
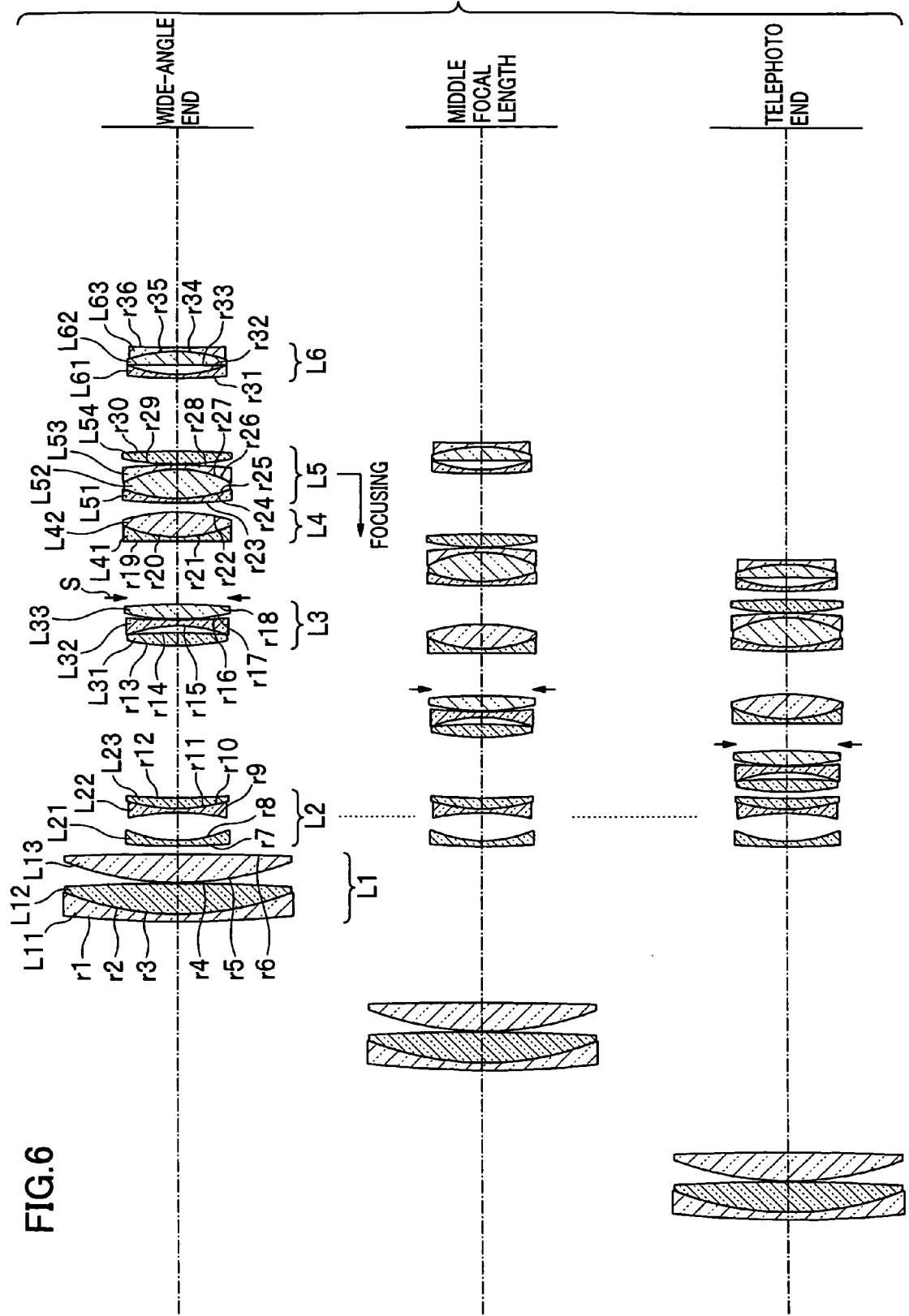
FIG. 6 is a sectional view illustrating a sixth embodiment of the zoom lens in accordance with the present invention.
Figure 7:
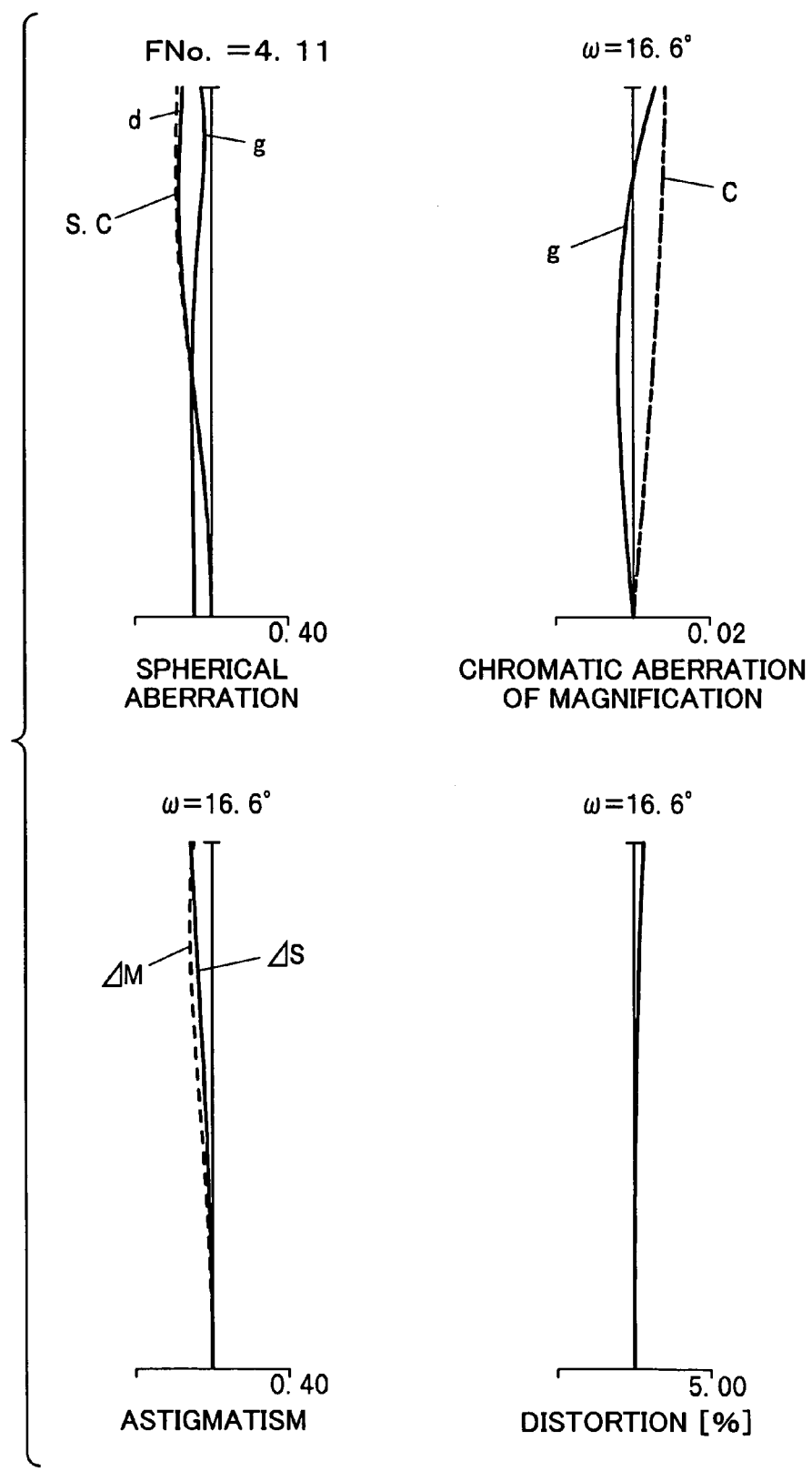
FIG. 7 depicts aberration at the wide-angle end under an assumption of the infinitely far imaging plane in the first exemplary zoom lens.
Figure 8:
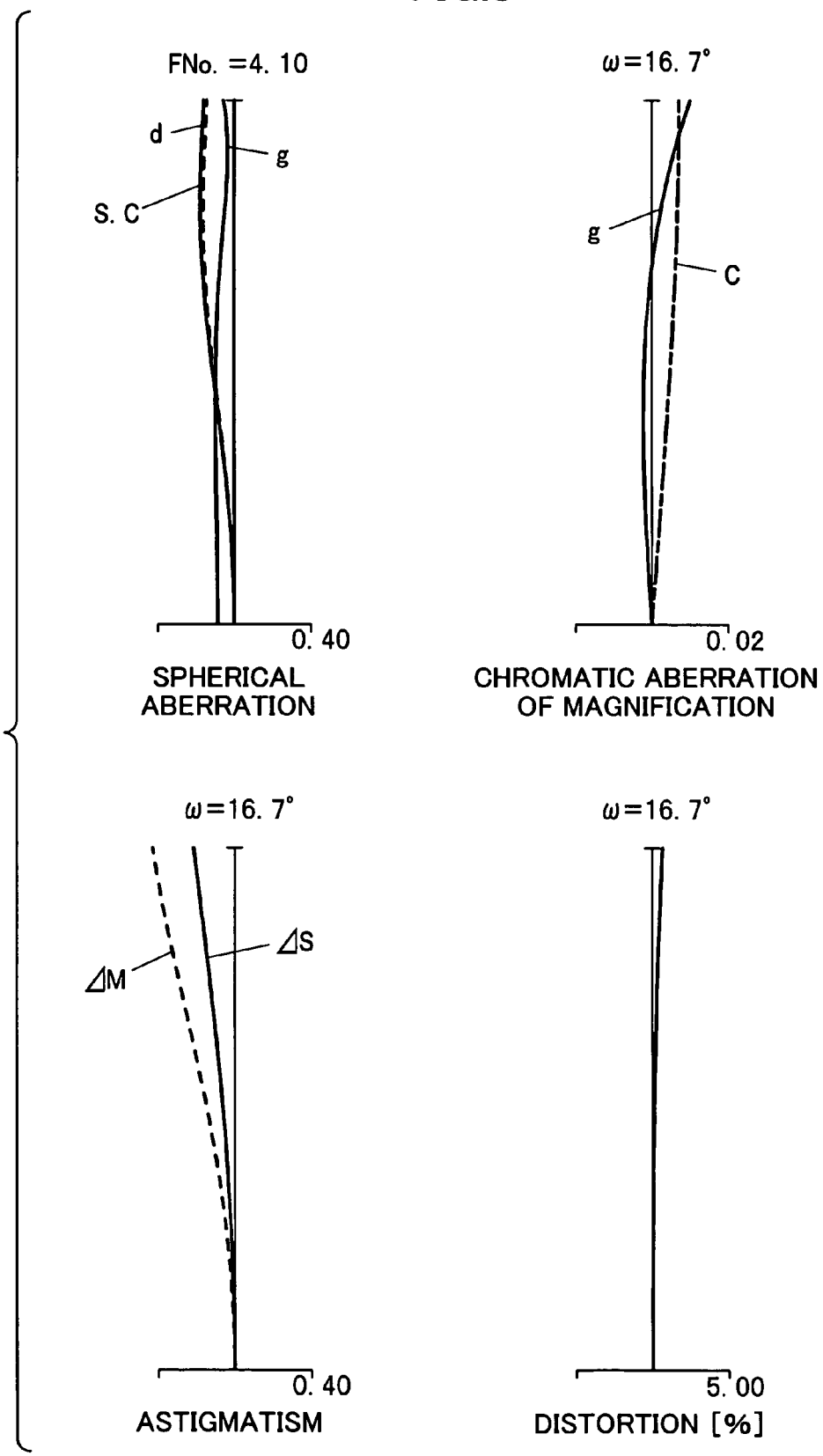
FIG. 8 depicts the aberration at the wide-angle end under another assumption of 1.6 meters in distance from the leading or foremost lens piece to a subject being photographed, in the first exemplary zoom lens.
Figure 9:
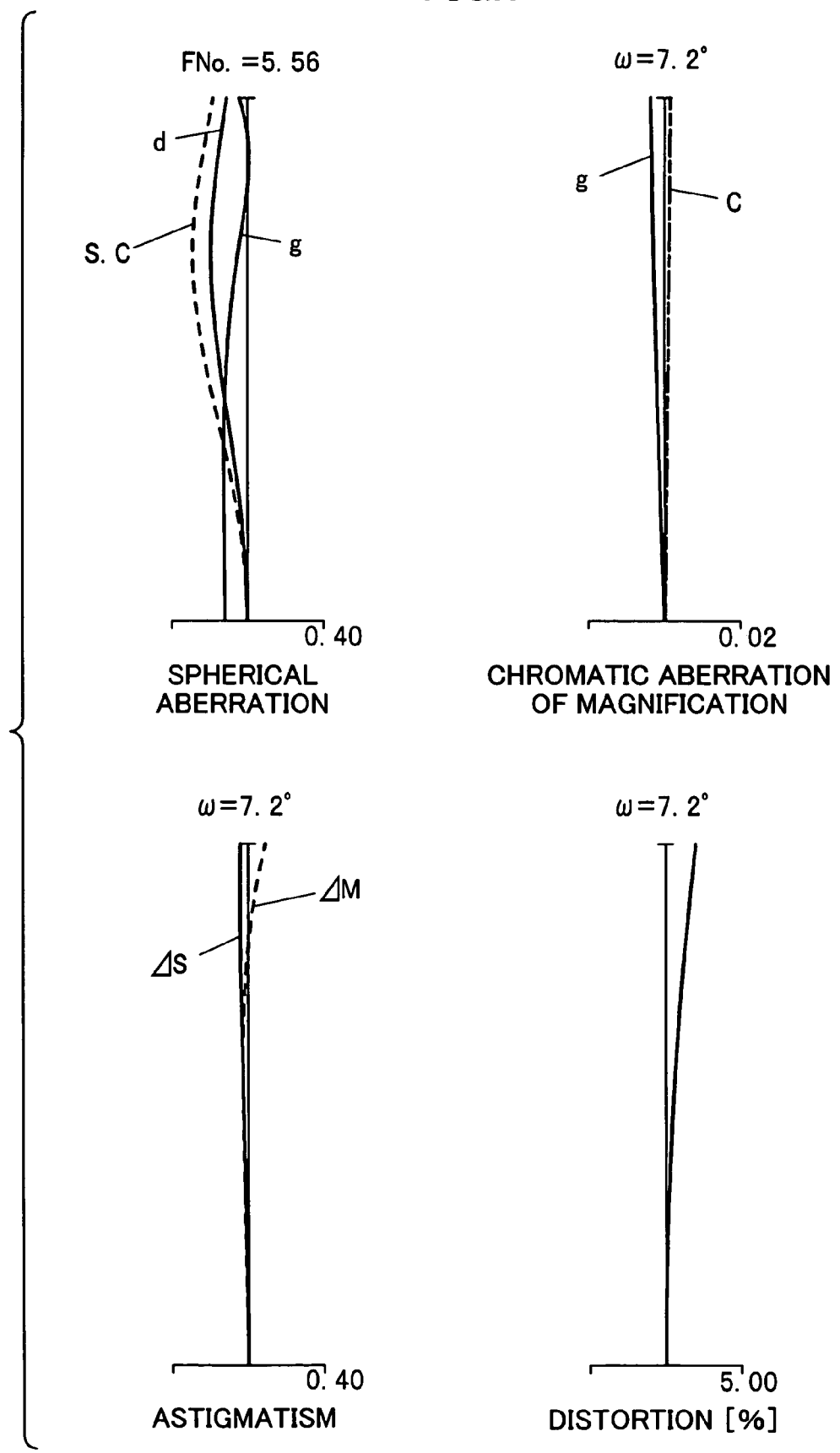
FIG. 9 depicts aberration at the intermediate focal length under the assumption of the infinitely far imaging plane in the first exemplary zoom lens.
Figure 10:
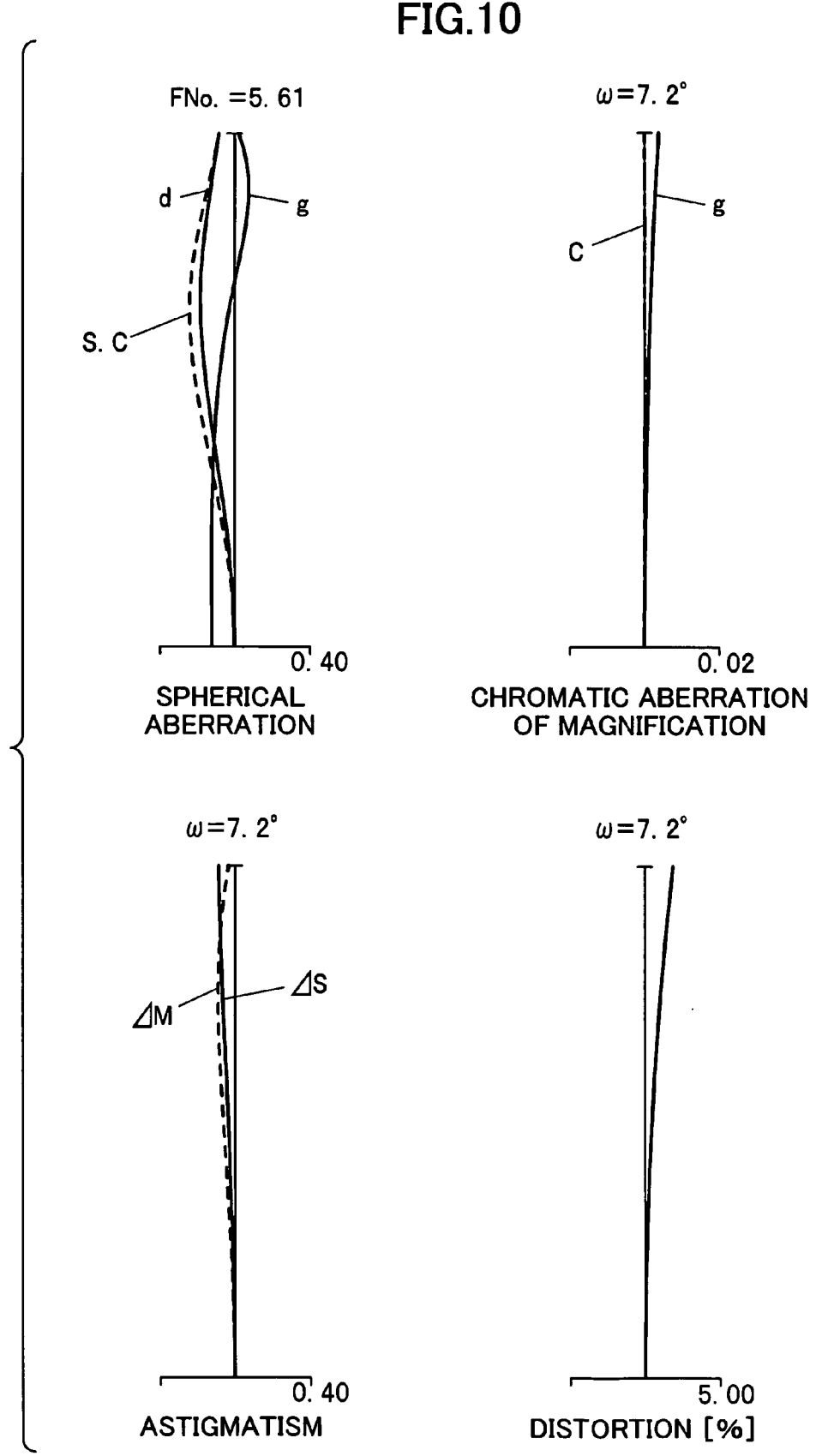
FIG. 10 depicts the aberration at the intermediate focal length under the assumption of 1.6 meters in distance from the leading or foremost lens piece to the subject being photographed, in the first exemplary zoom lens.
Figure 11:
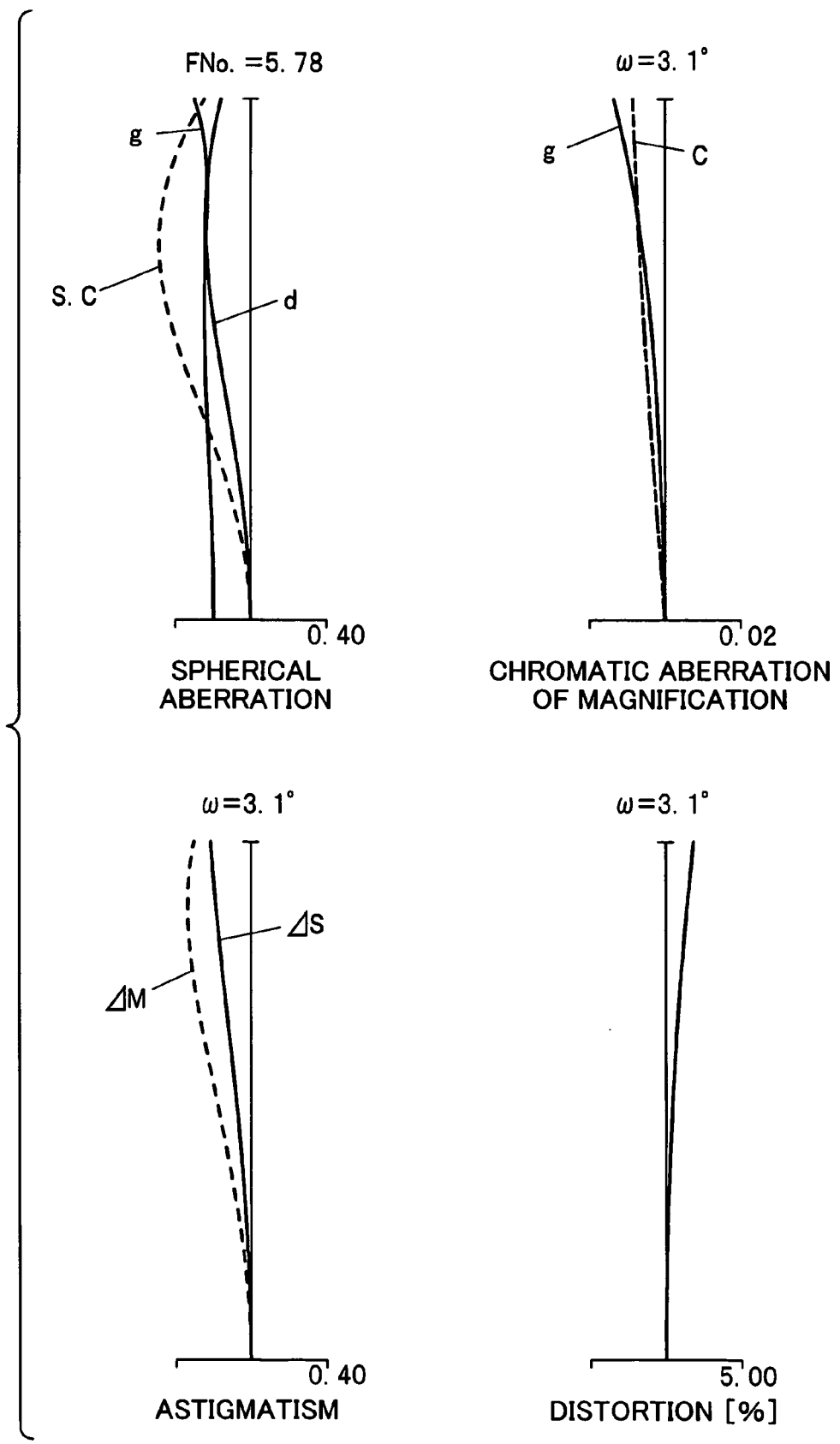
FIG. 11 depicts aberration at the telephoto end under the assumption of the infinitely far imaging plane in the first exemplary zoom lens.
Figure 12:
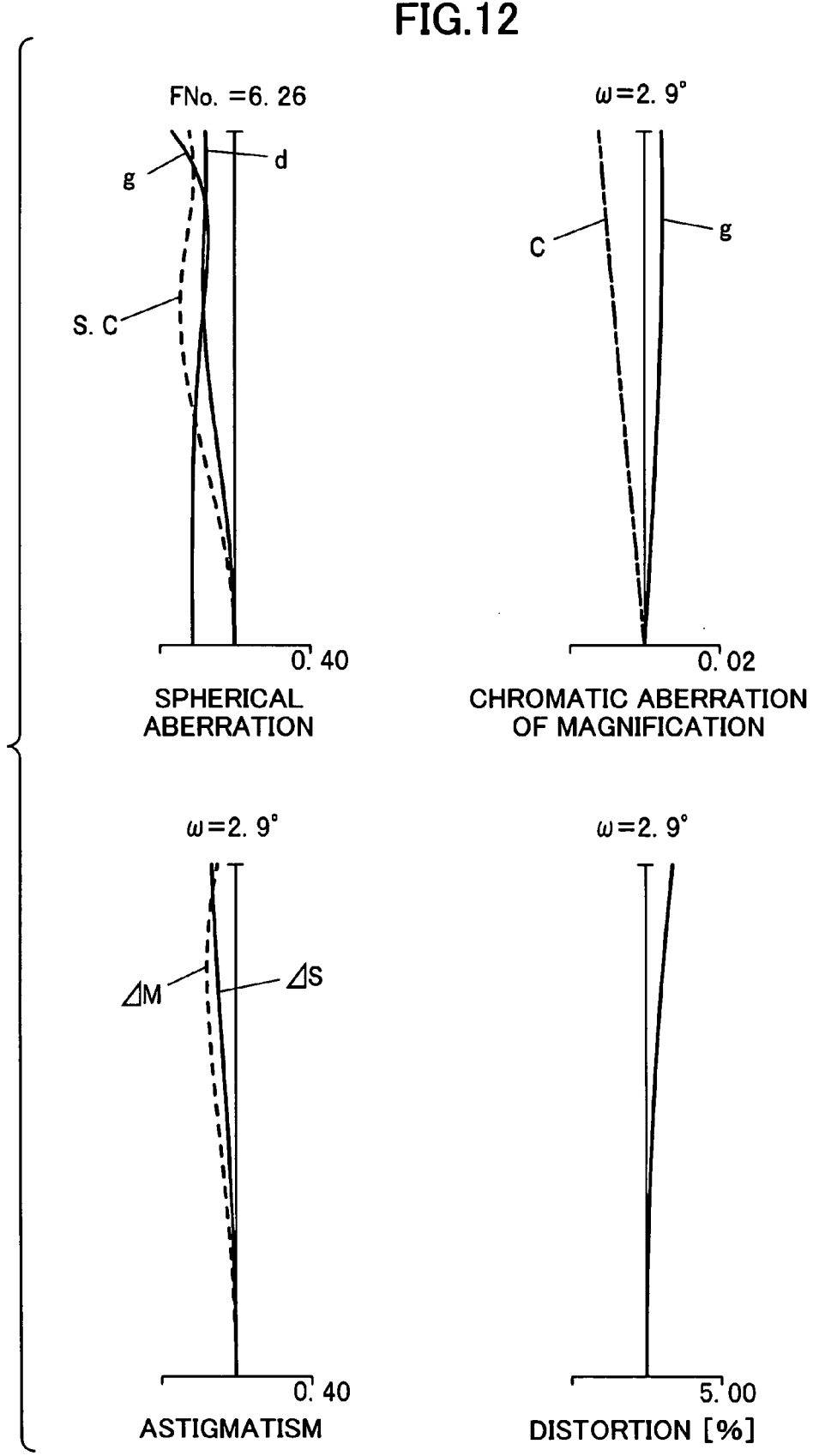
FIG. 12 depicts the aberration at the telephoto end under the assumption of 1.6 meters in distance from the leading or foremost lens piece to the subject being photographed, in the first exemplary zoom lens.
Figure 13:
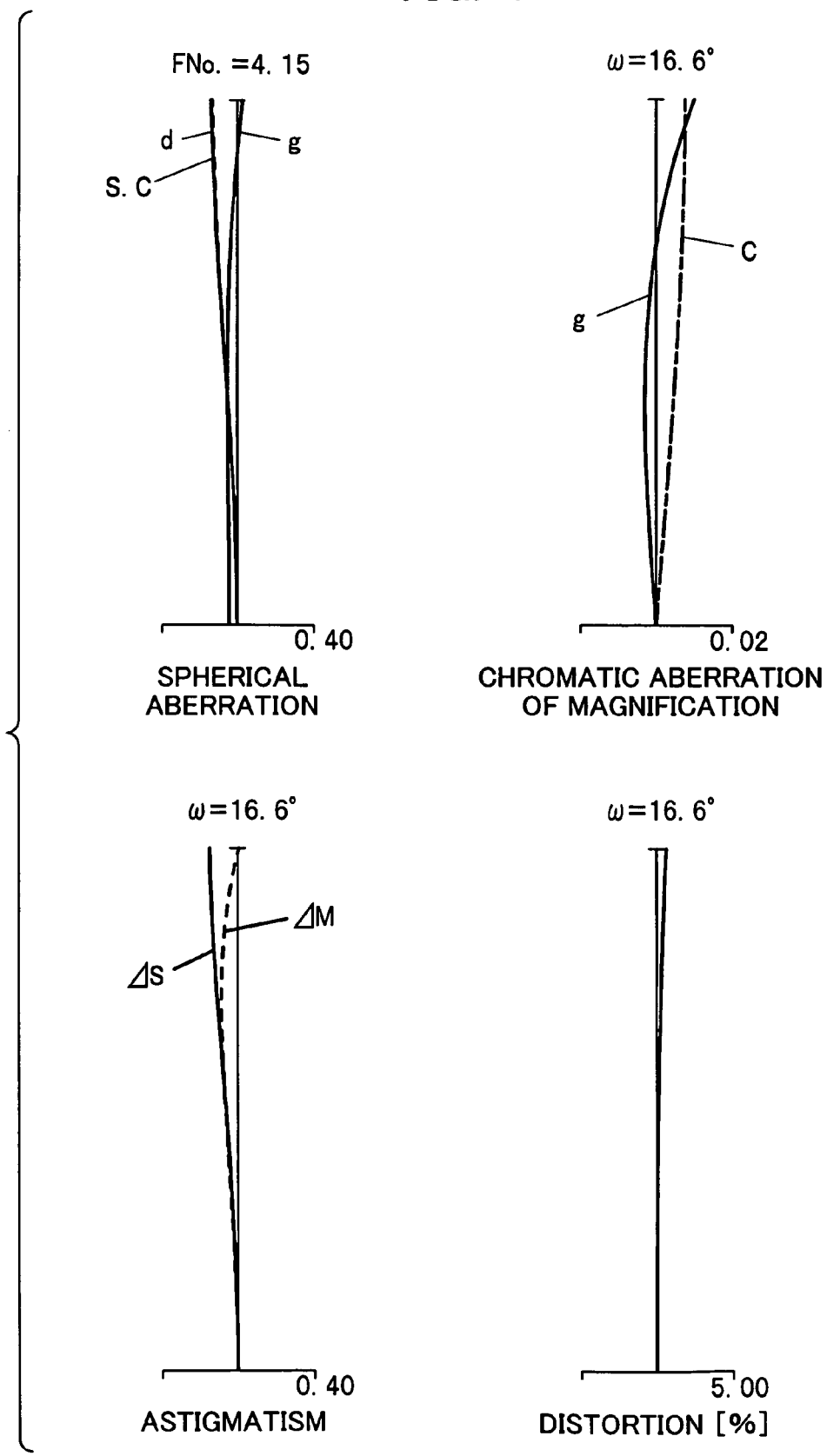
FIG. 13 depicts aberration at the wide-angle end under the assumption of the infinitely far imaging plane in the second exemplary zoom lens.
Figure 14:
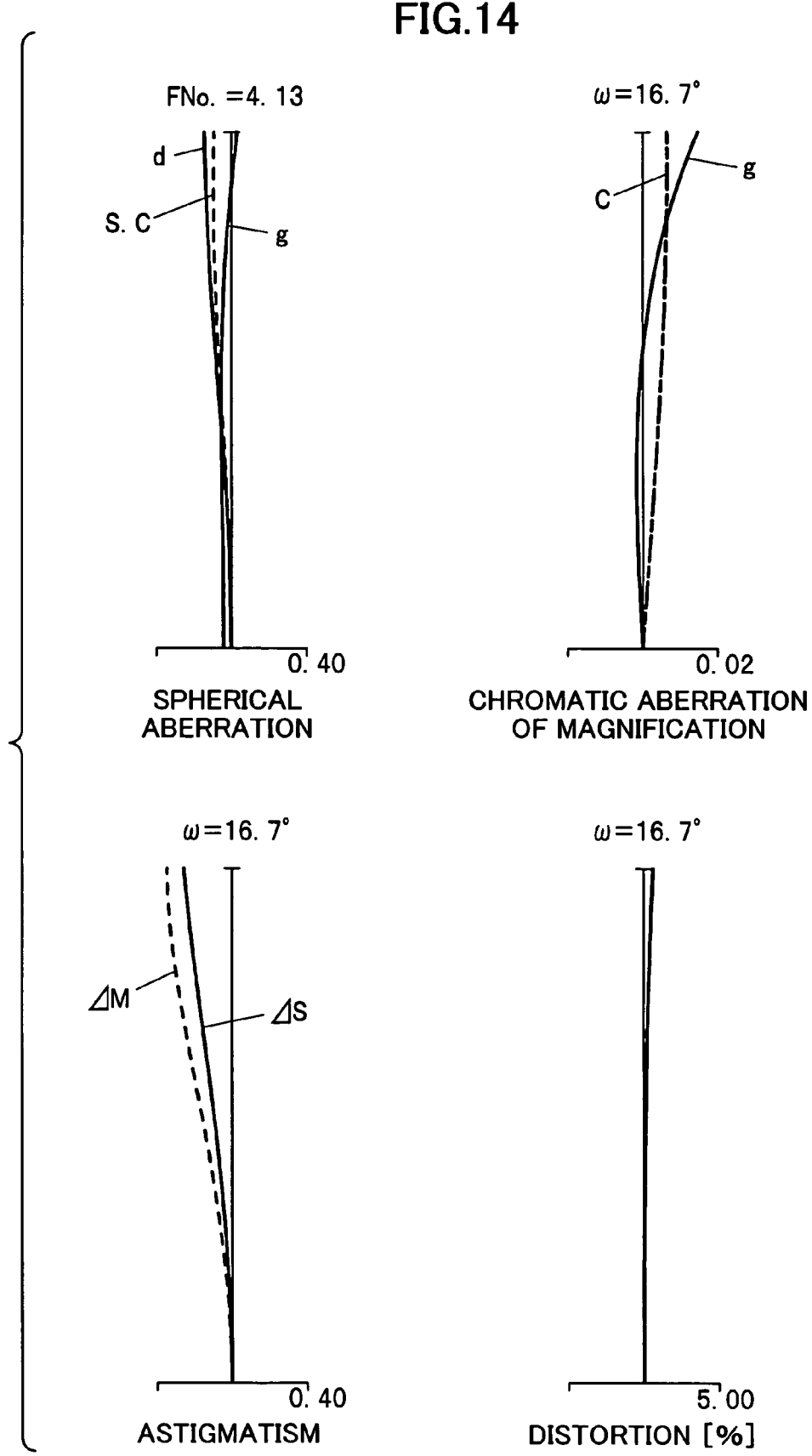
FIG. 14 depicts the aberration at the wide-angle end under the assumption of 1.6 meters in distance from the leading or foremost lens piece to the subject being photographed, in the second exemplary zoom lens.
Figure 15:
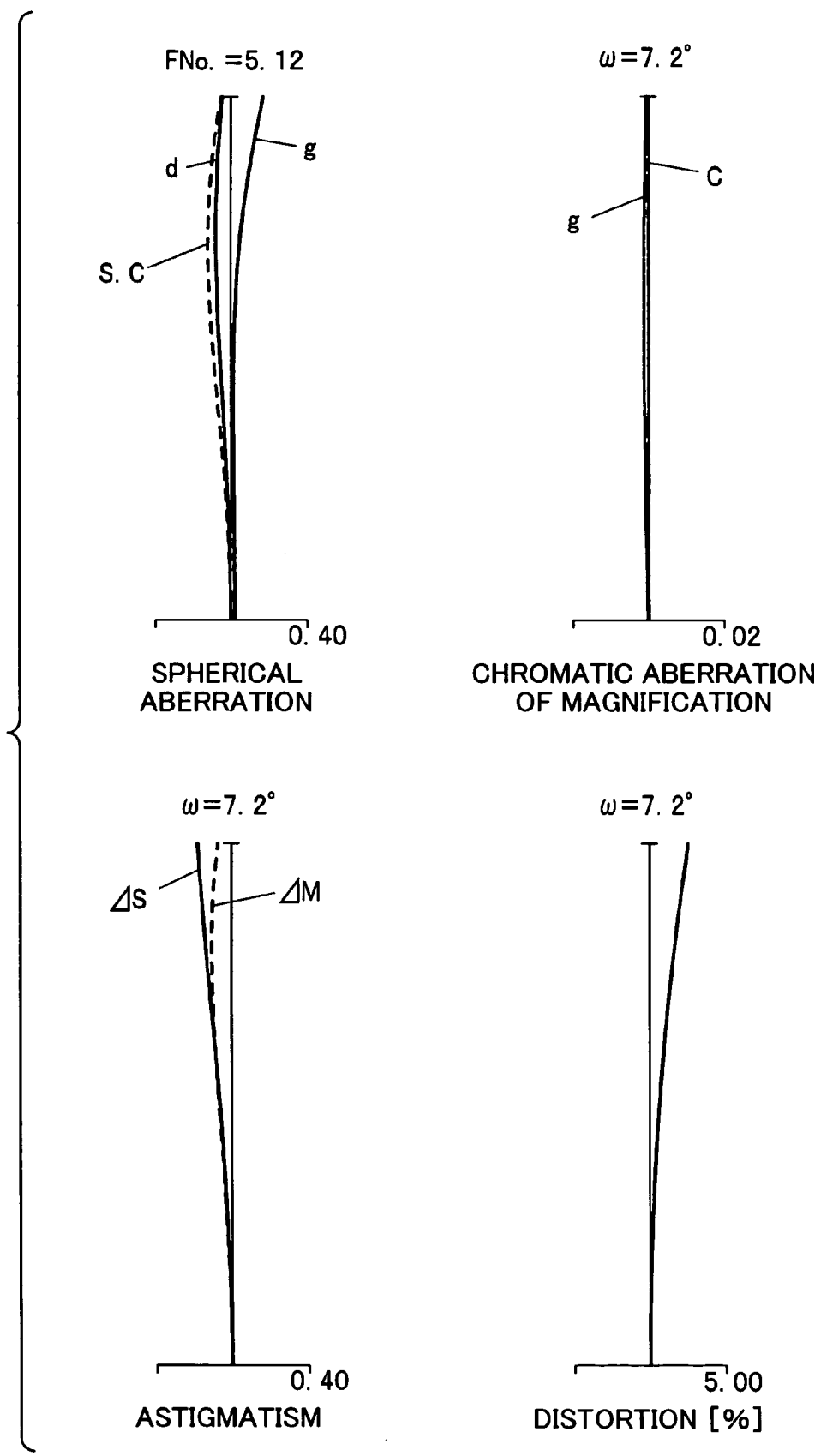
FIG. 15 depicts aberration at the intermediate focal length under the assumption of the infinitely far imaging plane in the second exemplary zoom lens.
Figure 16:
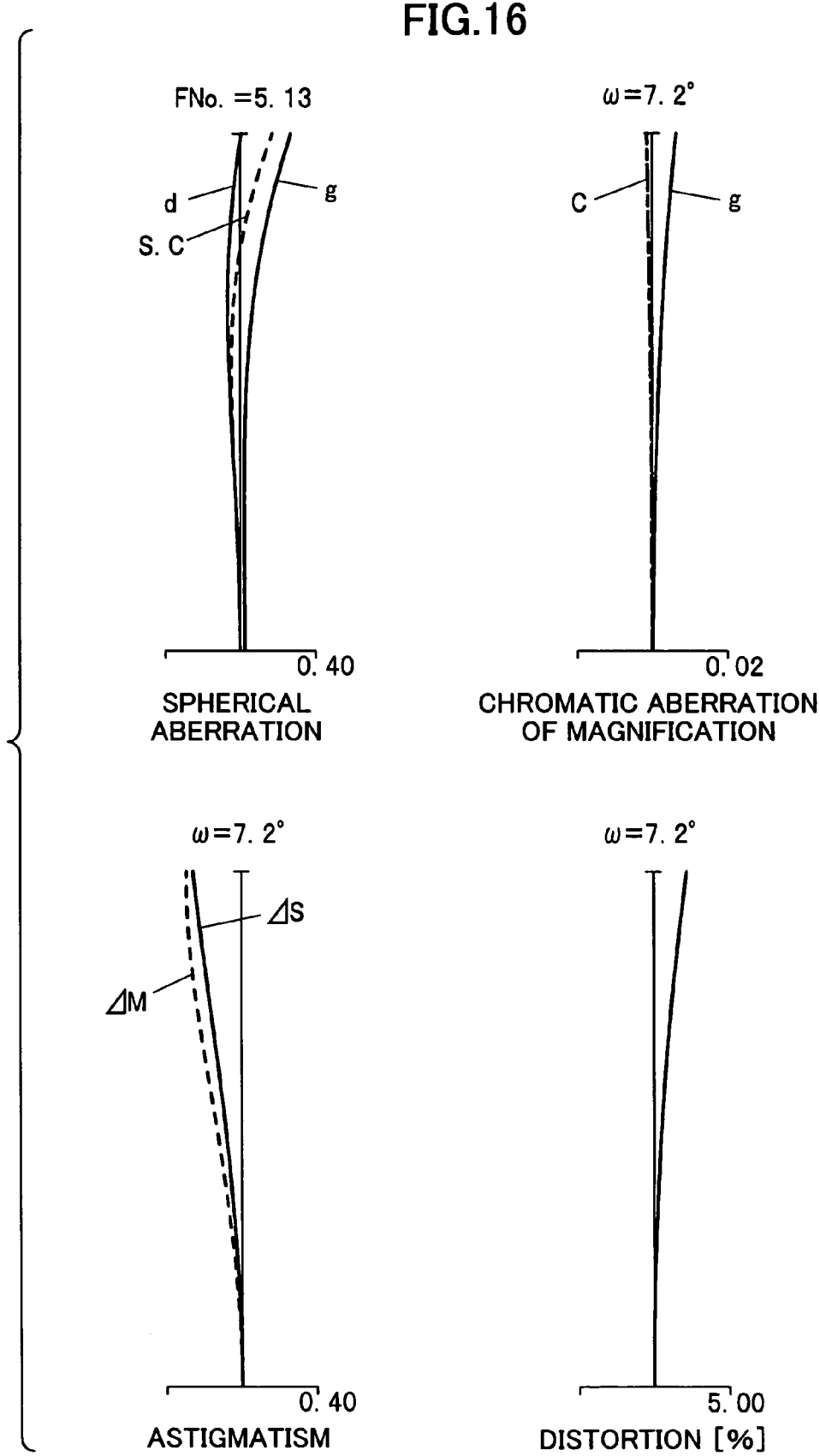
FIG. 16 depicts the aberration at the intermediate focal length under the assumption of 1.6 meters in distance from the leading or foremost lens piece to the subject being photographed, in the second exemplary zoom lens.
Figure 17:
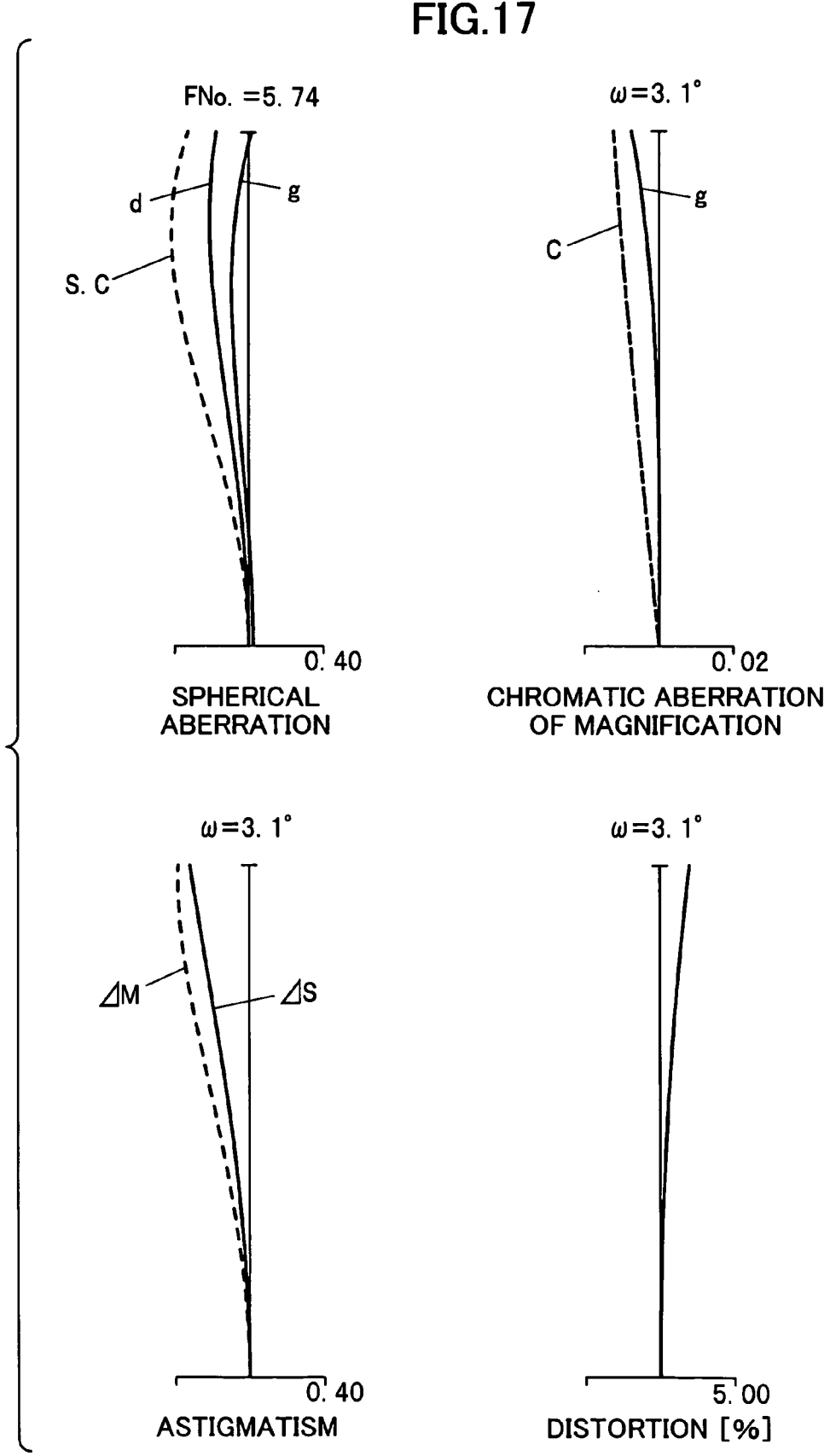
FIG. 17 depicts aberration at the telephoto end under the assumption of the infinitely far imaging plane in the second exemplary zoom lens.
Figure 18:
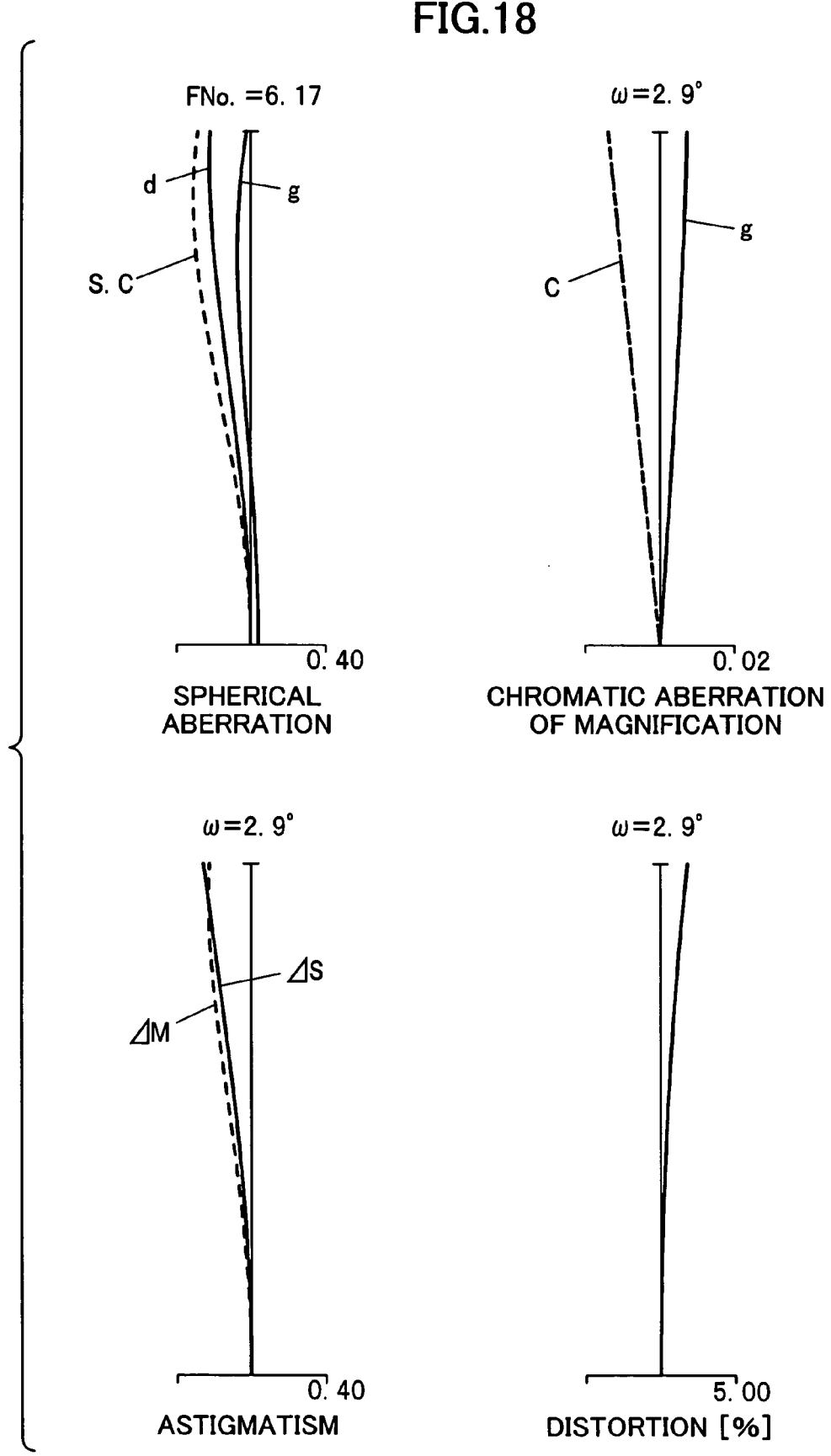
FIG. 18 depicts the aberration at the telephoto end under the assumption of 1.6 meters in distance from the leading or foremost lens piece to the subject being photographed, in the second exemplary zoom lens.
Figure 19:
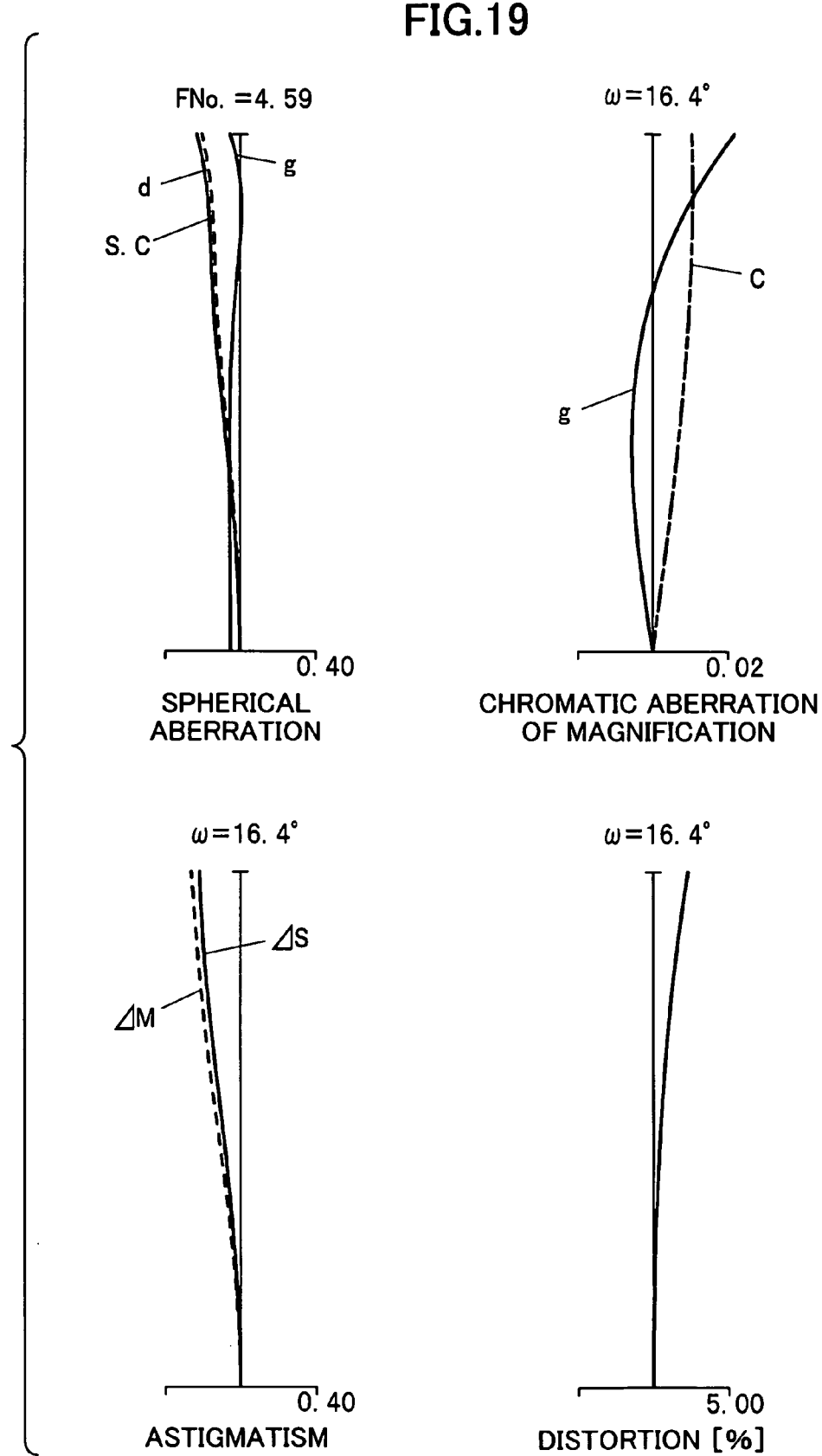
FIG. 19 depicts aberration at the wide-angle end under the assumption of the infinitely far imaging plane in the third exemplary zoom lens.
Figure 20:
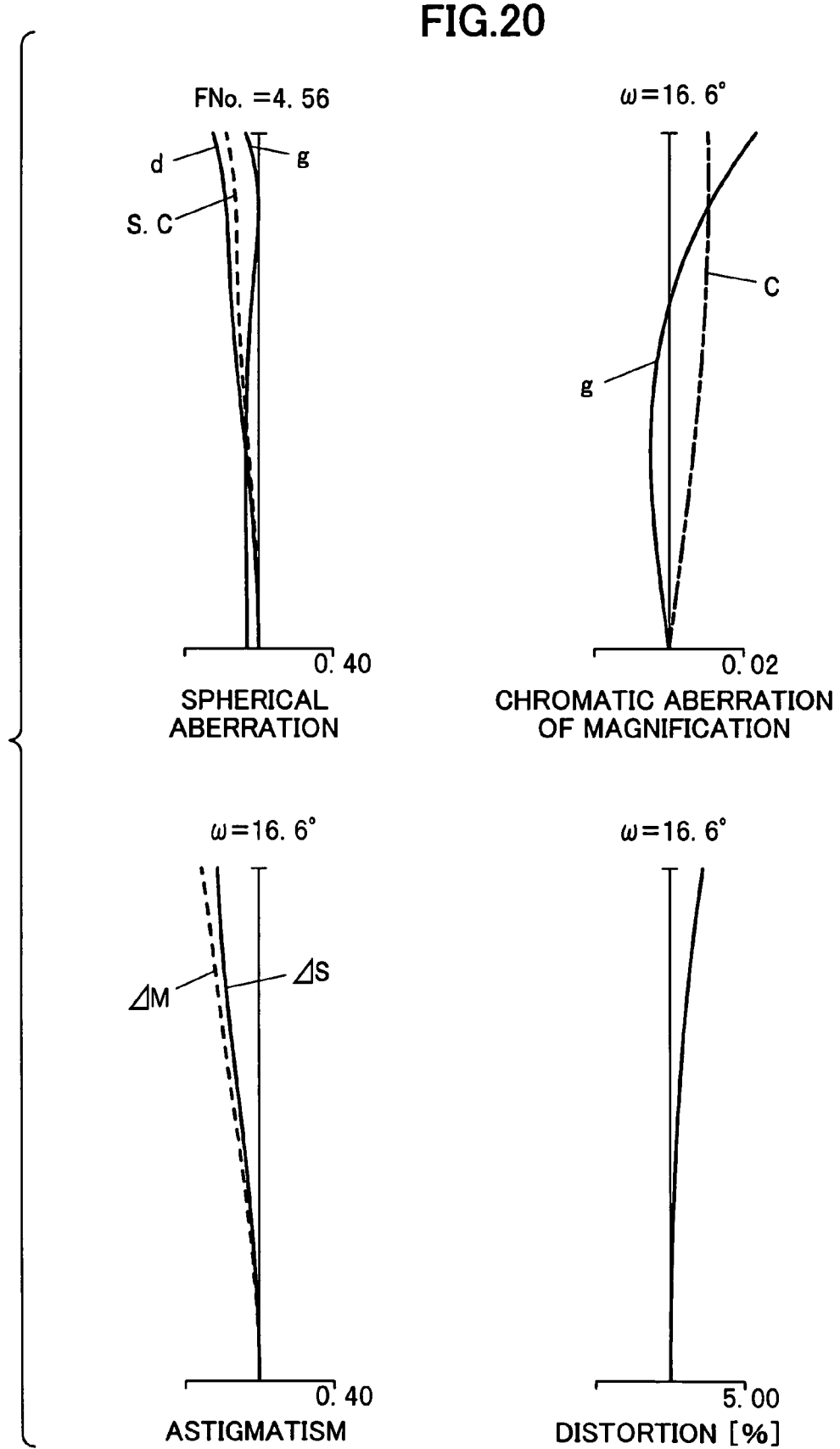
FIG. 20 depicts the aberration at the wide-angle end under the assumption of 1.6 meters in distance from the leading or foremost lens piece to the subject being photographed, in the third exemplary zoom lens.
Figure 21:
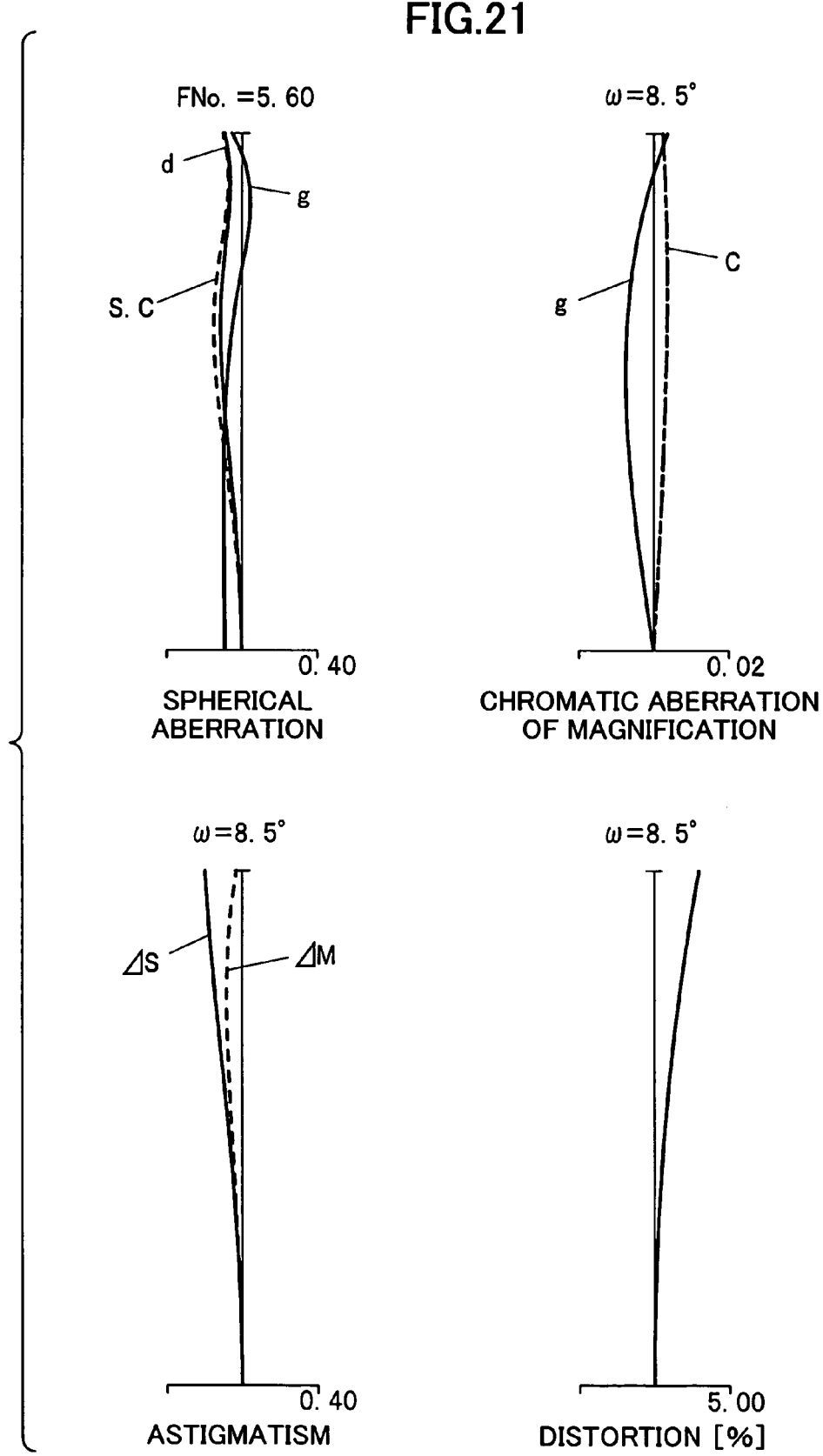
FIG. 21 depicts aberration at the intermediate focal length under the assumption of the infinitely far imaging plane in the third exemplary zoom lens.
Figure 22:
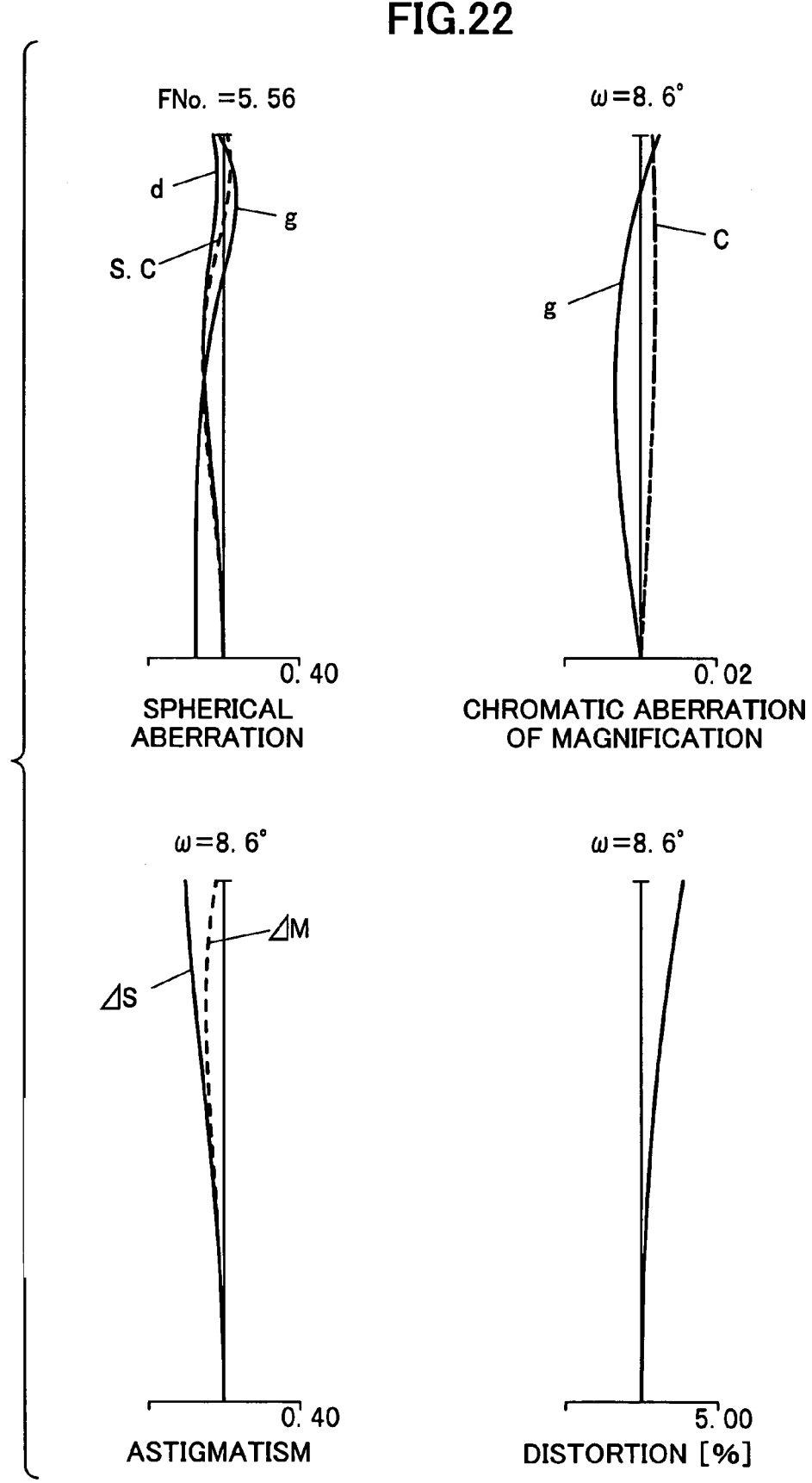
FIG. 22 depicts the aberration at the intermediate focal length under the assumption of 1.6 meters in distance from the leading or foremost lens piece to the subject being photographed, in the third exemplary zoom lens.
Figure 23:
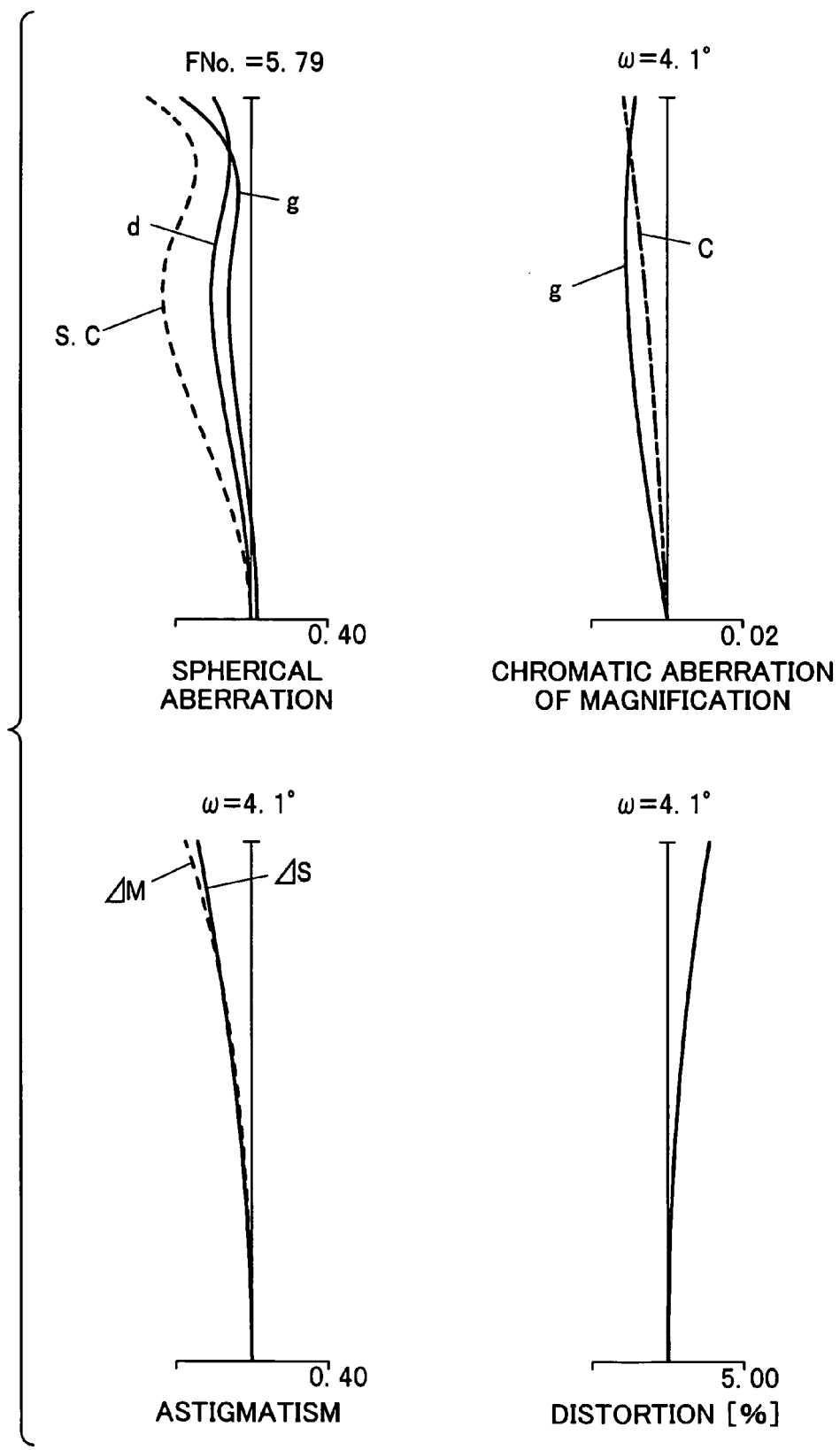
FIG. 23 depicts aberration at the telephoto end under the assumption of the infinitely far imaging plane in the third exemplary zoom lens.
Figure 24:
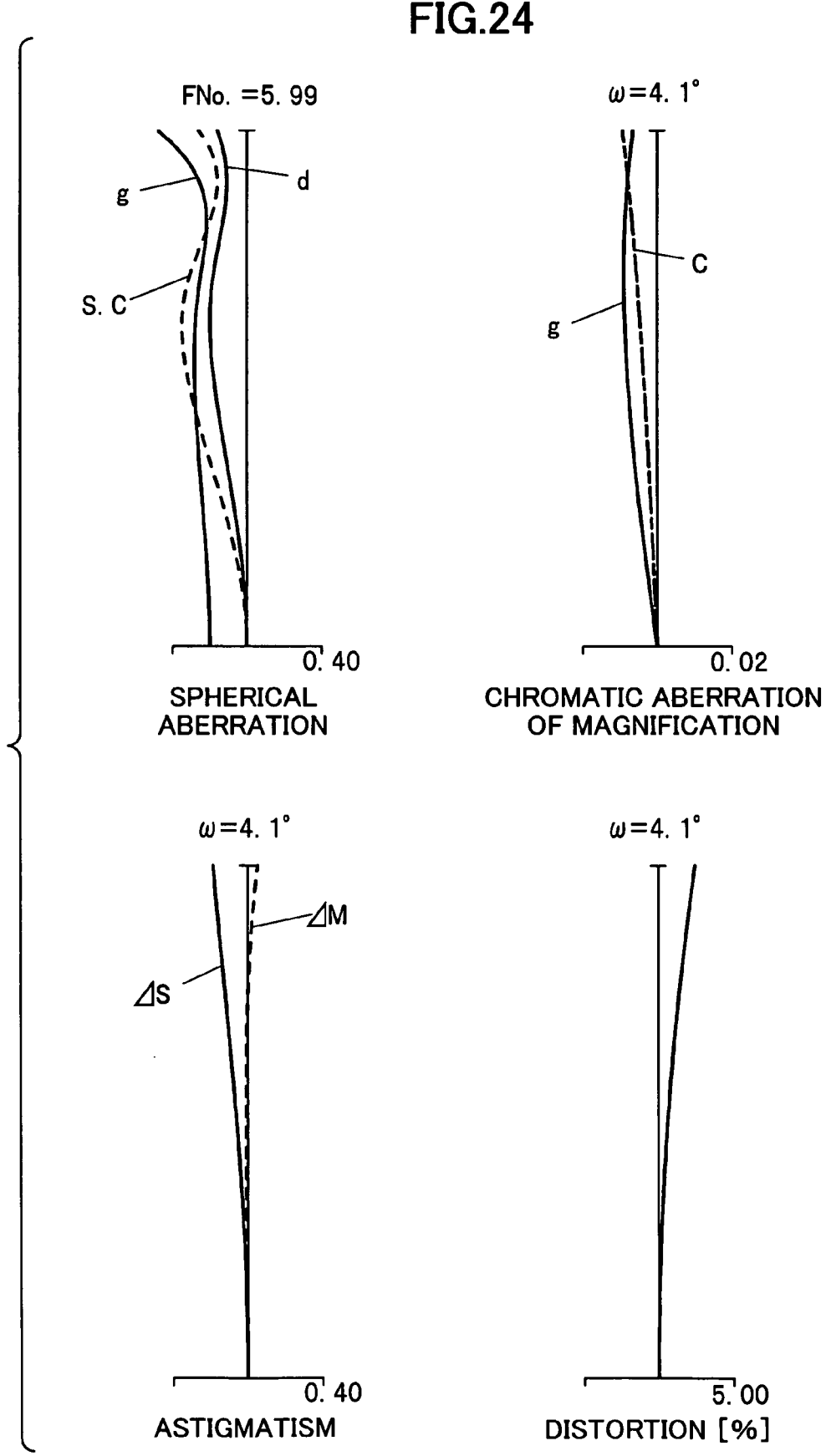
FIG. 24 depicts the aberration at the telephoto end under the assumption of 1.6 meters in distance from the leading or foremost lens piece to the subject being photographed, in the third exemplary zoom lens.
Figure 25:
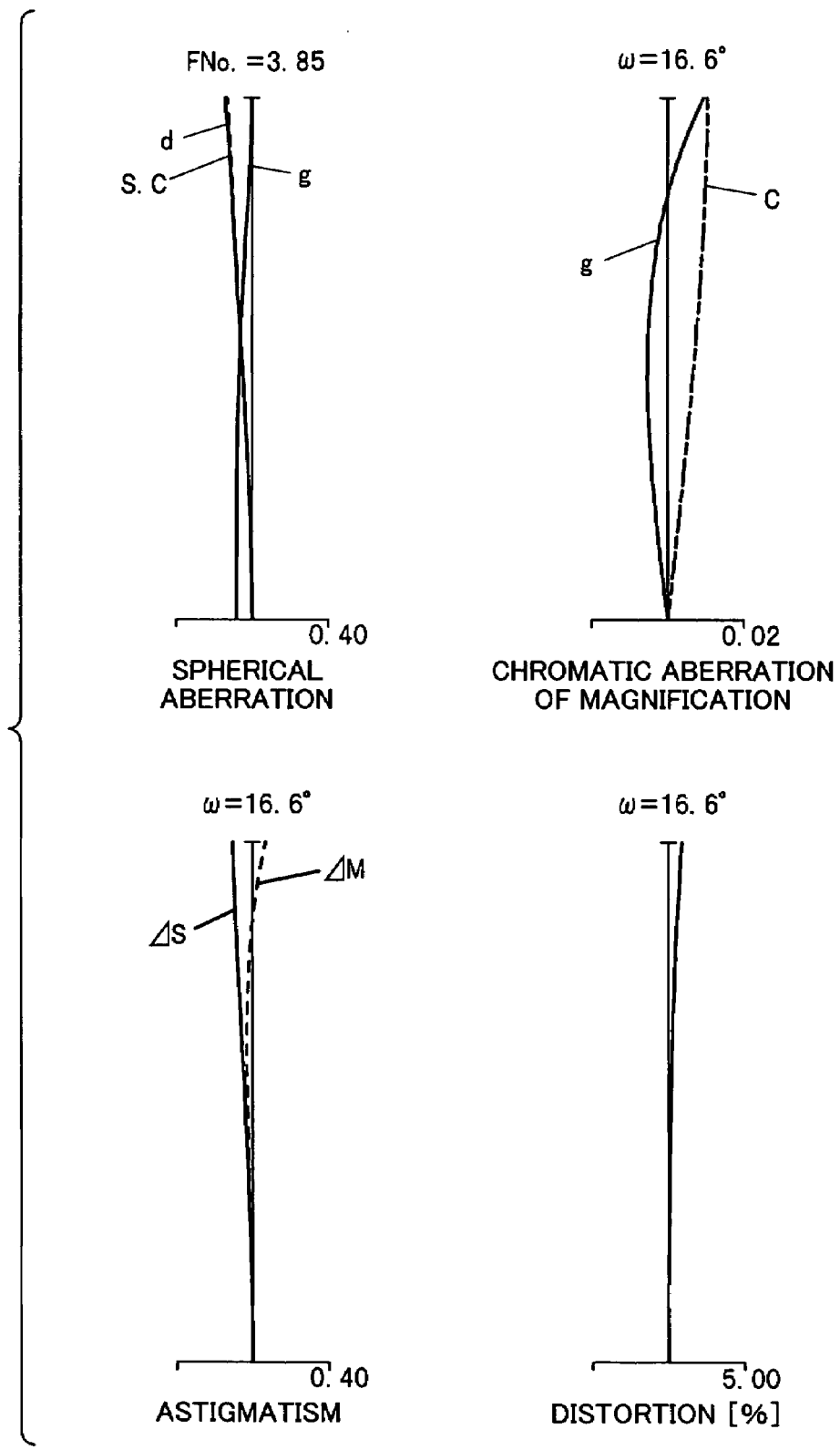
FIG. 25 depicts aberration at the wide-angle end under the assumption of the infinitely far imaging plane in the fourth exemplary zoom lens.
Figure 26:
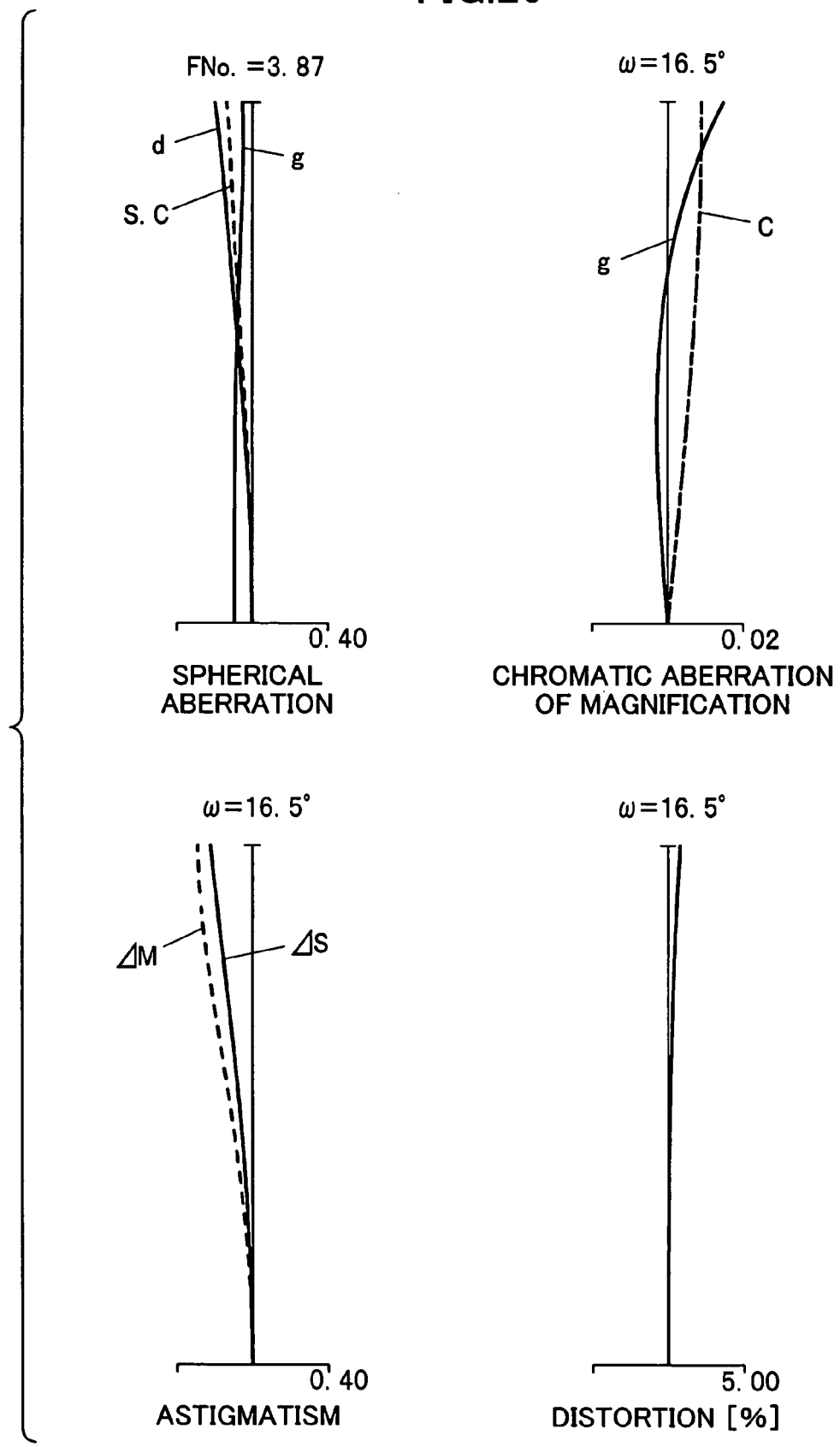
FIG. 26 depicts the aberration at the wide-angle end under the assumption of 1.6 meters in distance from the leading or foremost lens piece to the subject being photographed, in the fourth exemplary zoom lens.
Figure 27:
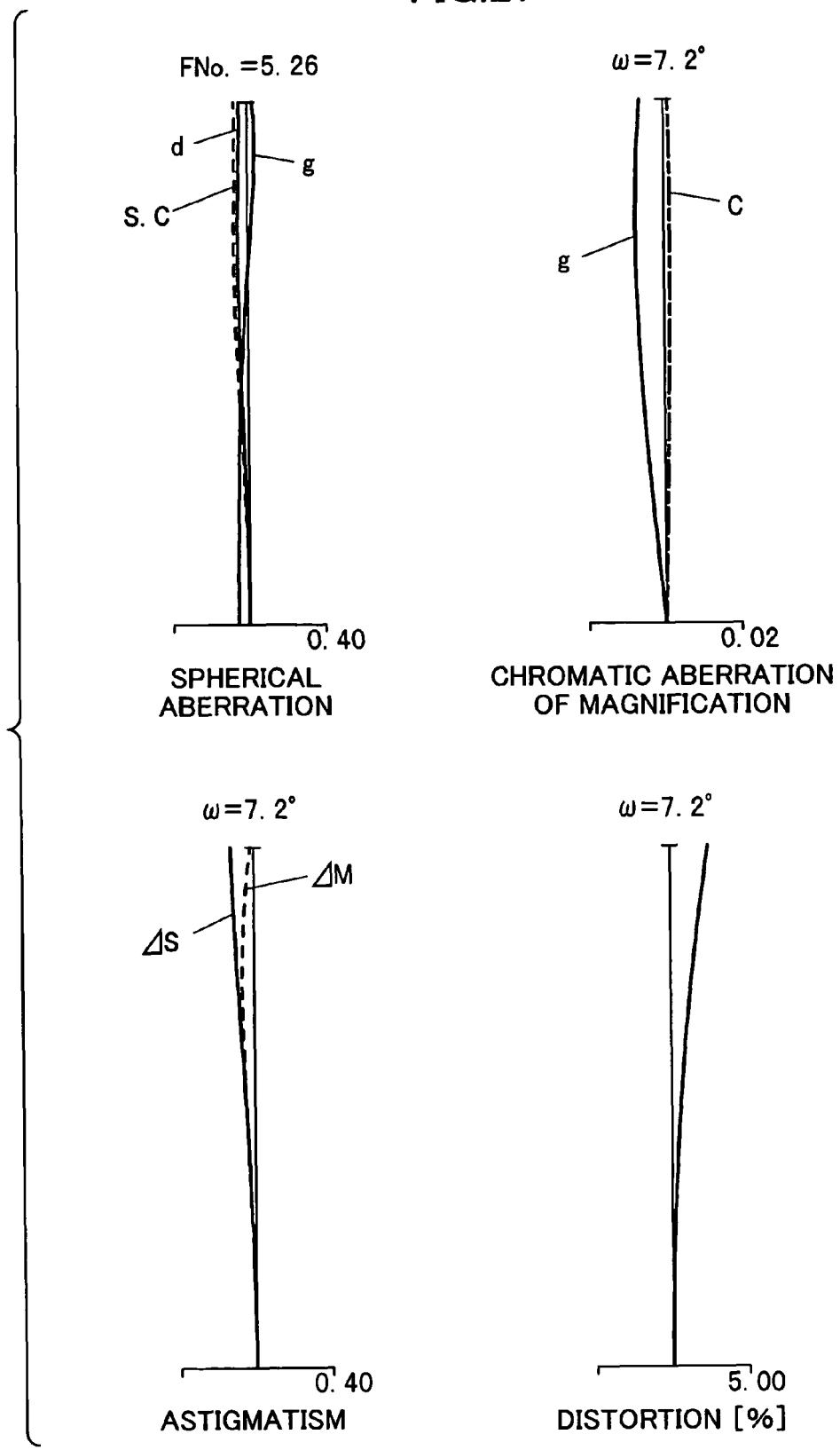
FIG. 27 depicts aberration at the intermediate focal length under the assumption of the infinitely far imaging plane in the fourth exemplary zoom lens.
Figure 28:
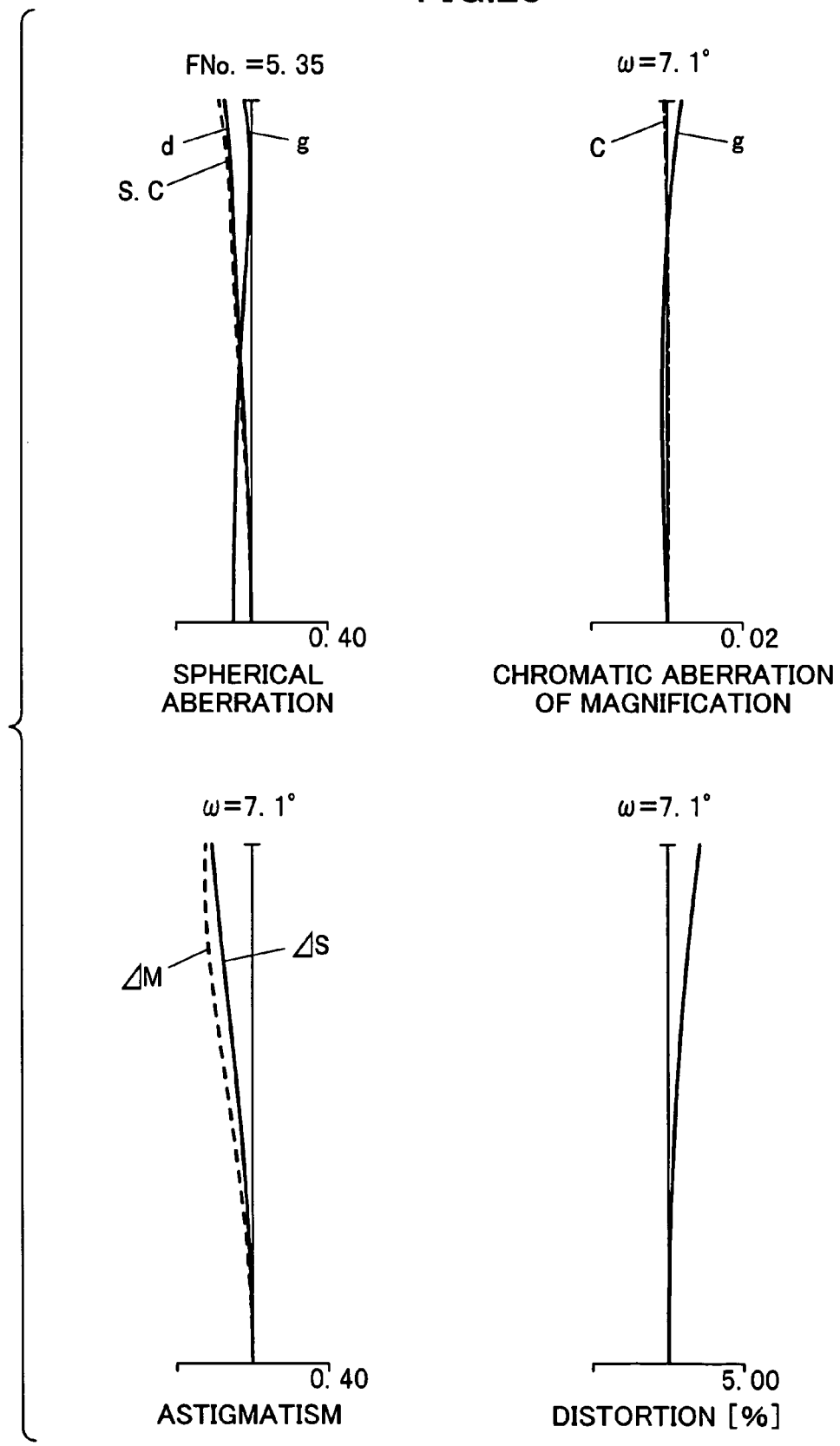
FIG. 28 depicts the aberration at the intermediate focal length under the assumption of 1.6 meters in distance from the leading or foremost lens piece to the subject being photographed, in the fourth exemplary zoom lens.
Figure 29:
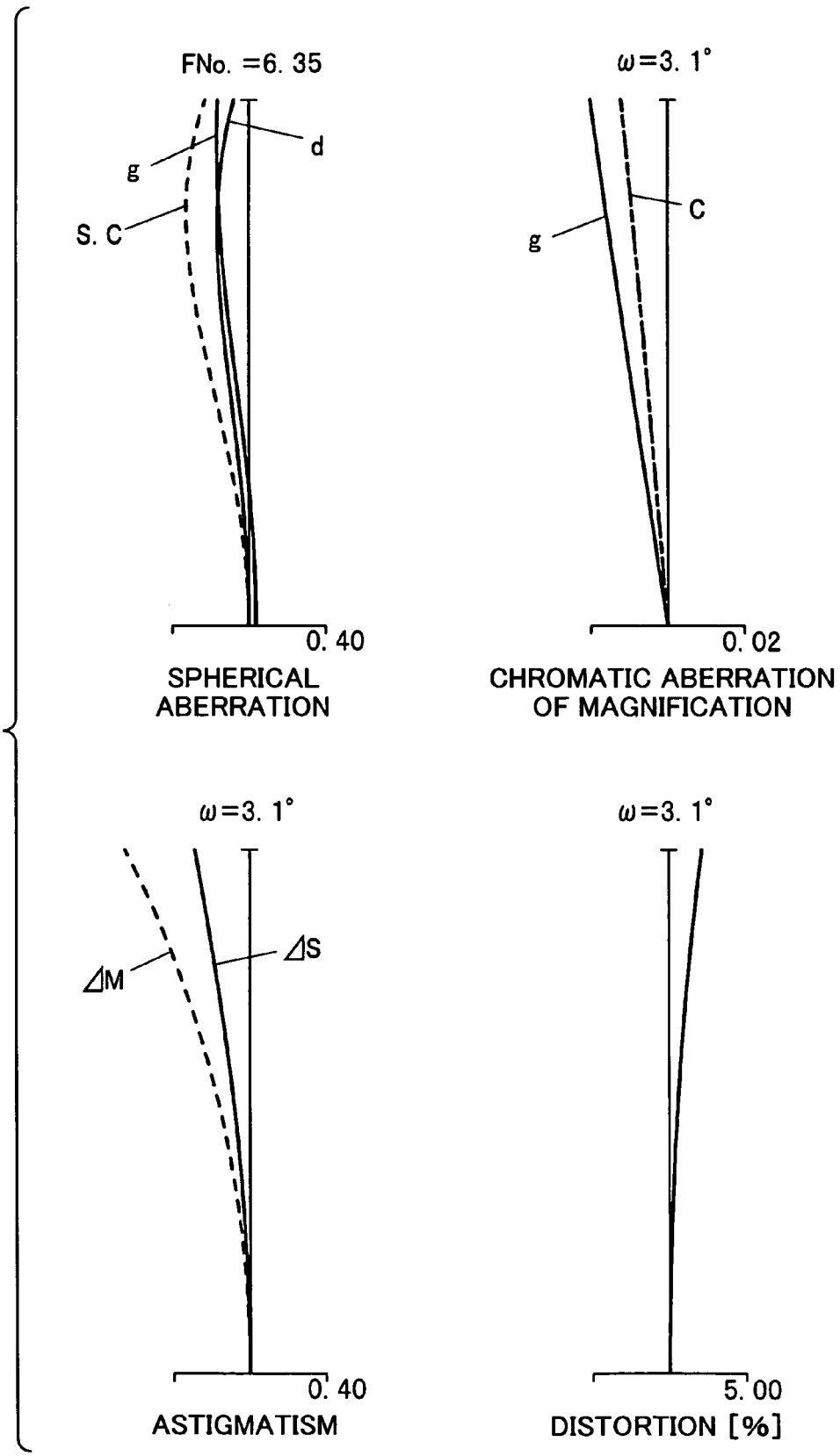
FIG. 29 depicts aberration at the telephoto end under the assumption of the infinitely far imaging plane in the fourth exemplary zoom lens.
Figure 30:
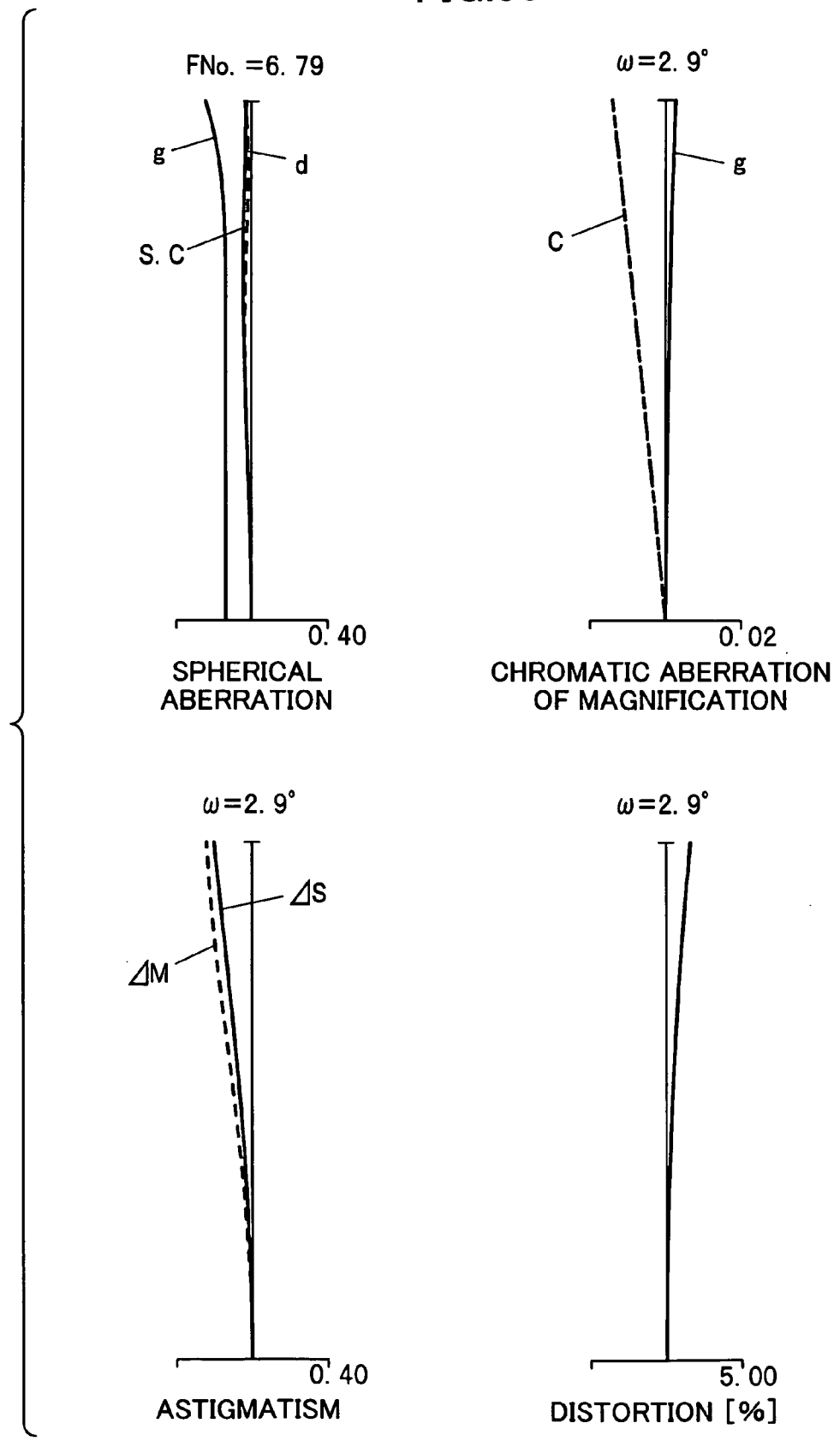
FIG. 30 depicts the aberration at the telephoto end under the assumption of 1.6 meters in distance from the leading or foremost lens piece to the subject being photographed, in the fourth exemplary zoom lens.
Figure 31:
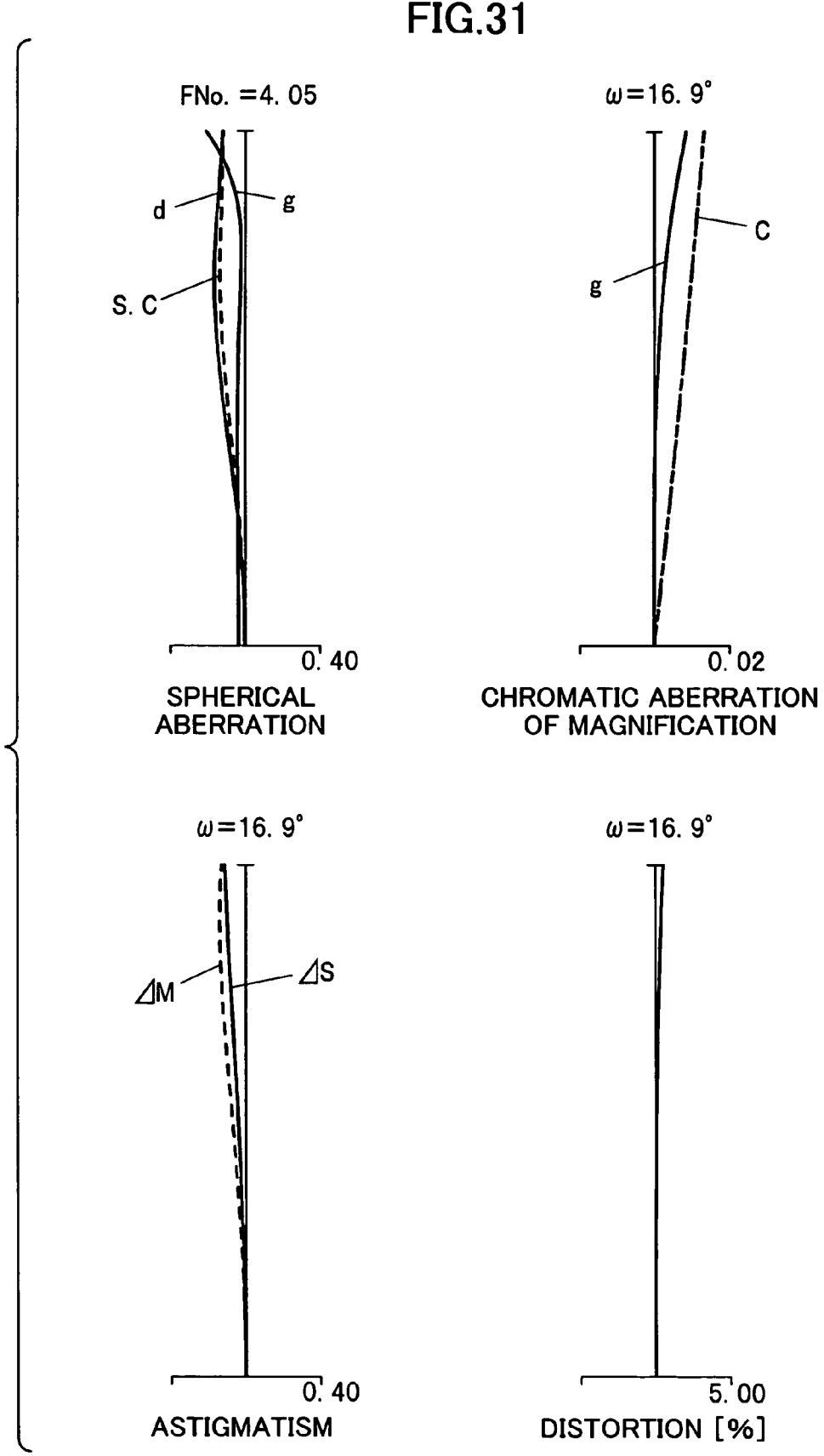
FIG. 31 depicts aberration at the wide-angle end under the assumption of the infinitely far imaging plane in the fifth exemplary zoom lens.
Figure 32:
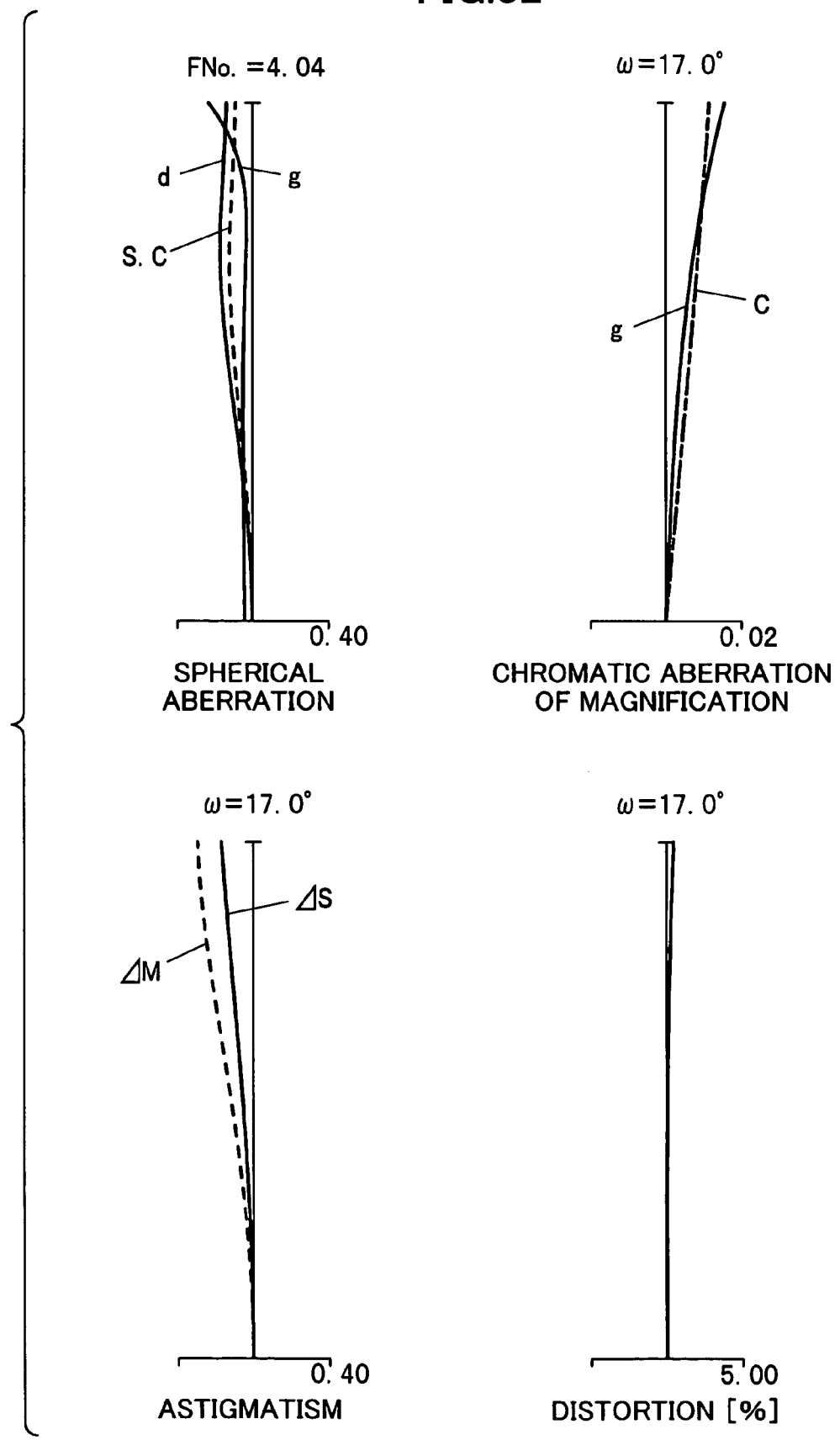
FIG. 32 depicts the aberration at the wide-angle end under the assumption of 1.6 meters in distance from the leading or foremost lens piece to the subject being photographed, in the fifth exemplary zoom lens.
Figure 33:
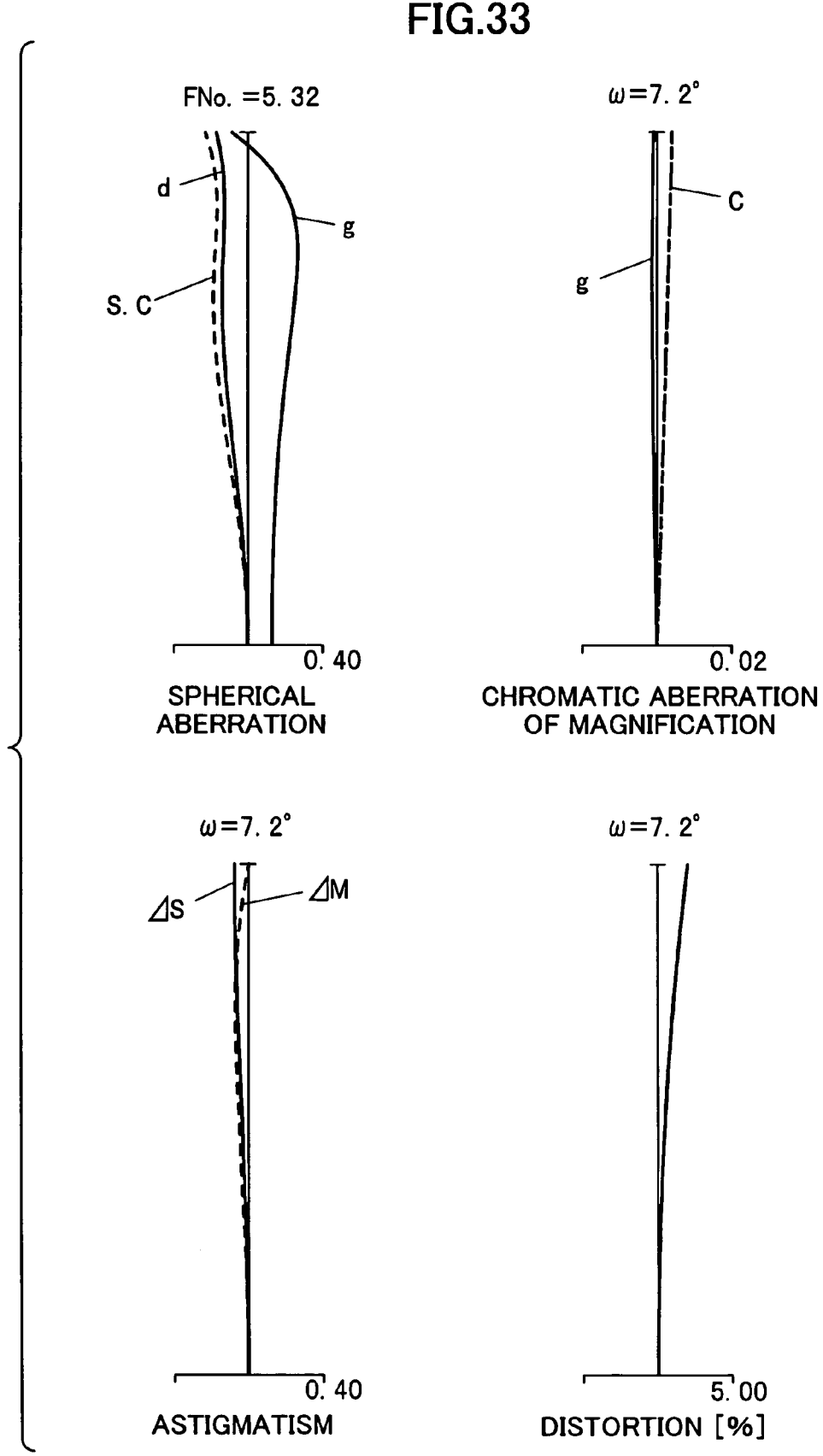
FIG. 33 depicts aberration at the intermediate focal length under the assumption of the infinitely far imaging plane in the fifth exemplary zoom lens.
Figure 34:
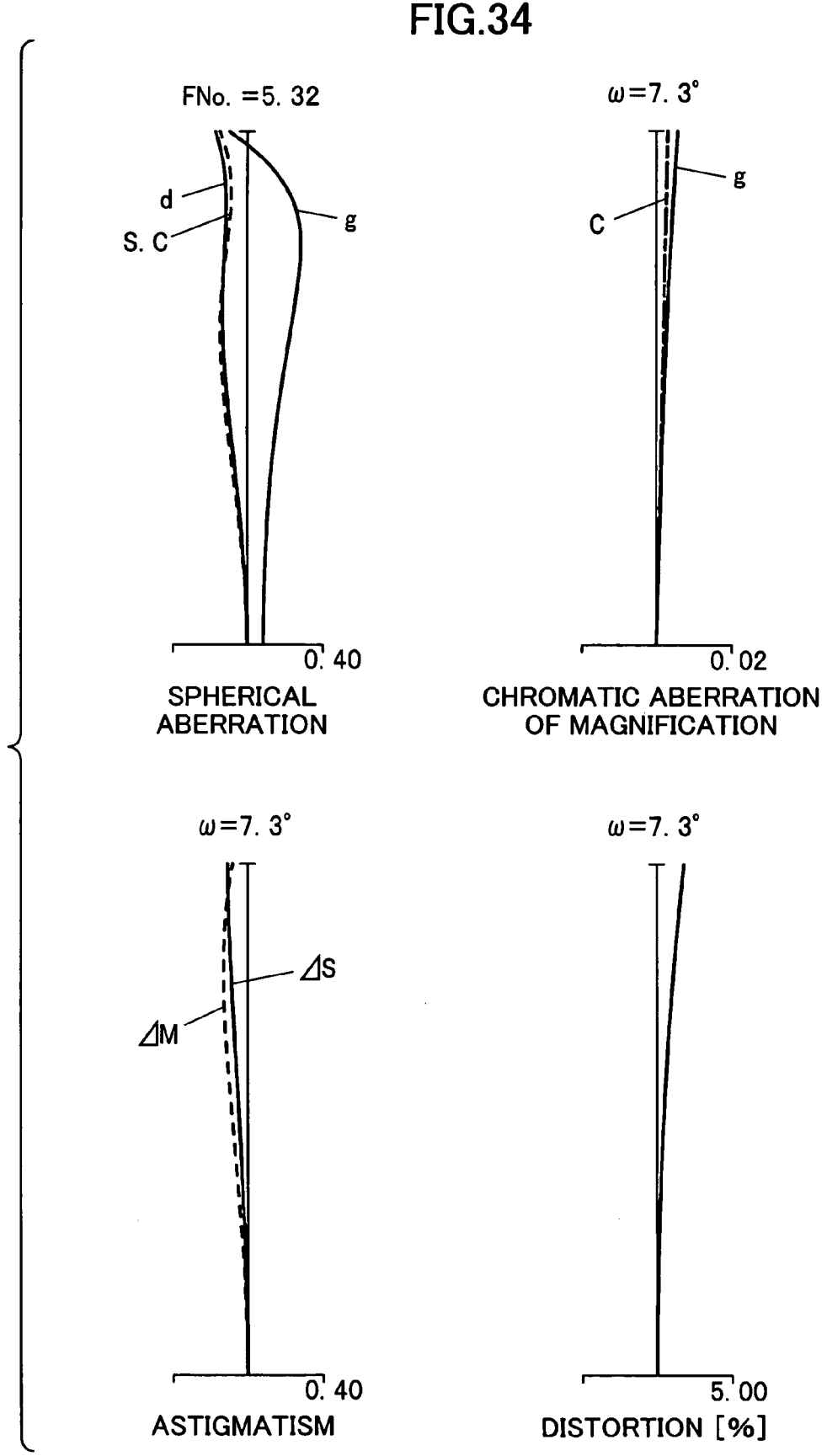
FIG. 34 depicts the aberration at the intermediate focal length under the assumption of 1.6 meters in distance from the leading or foremost lens piece to the subject being photographed, in the fifth exemplary zoom lens.
Figure 35:
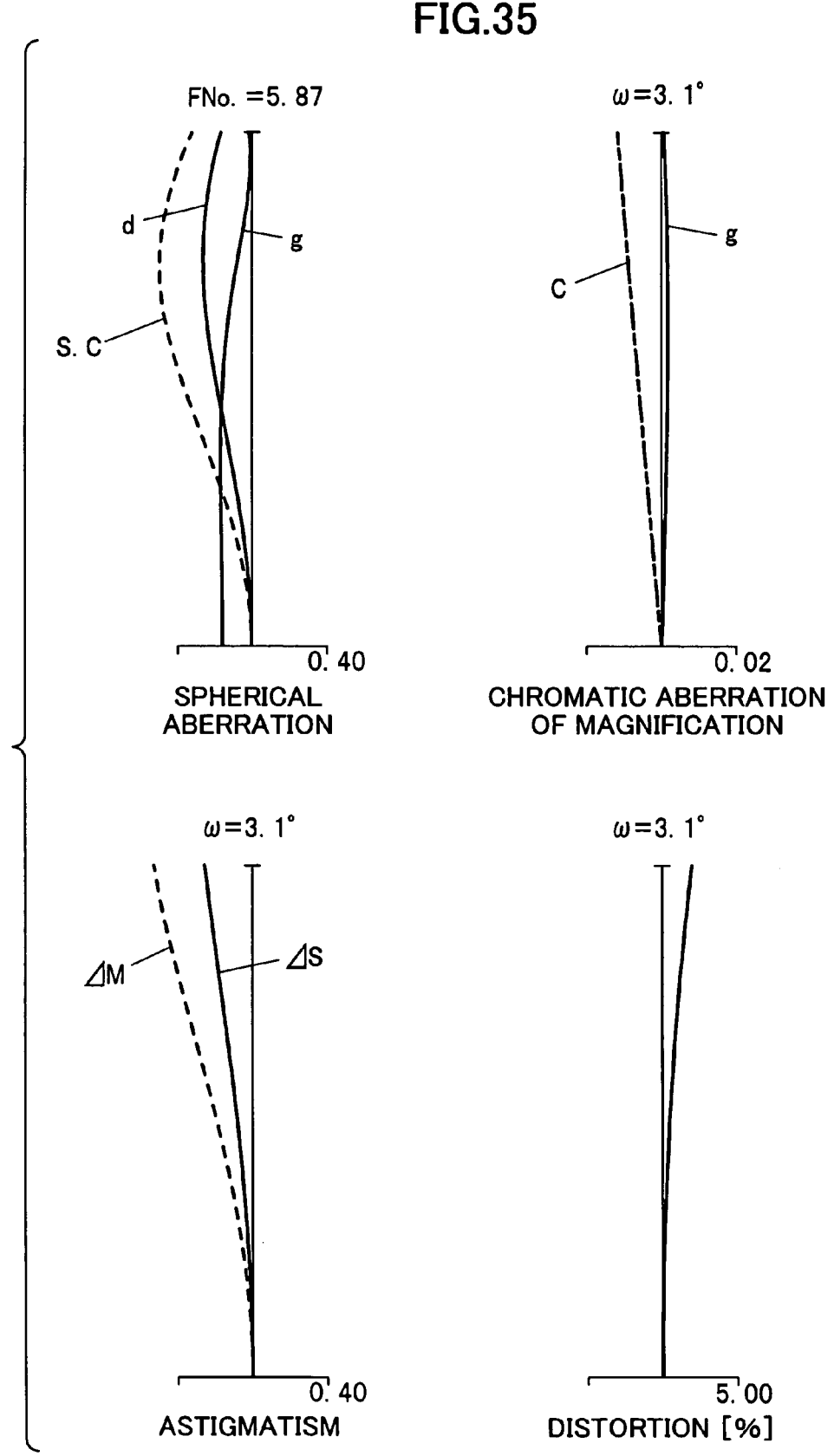
FIG. 35 depicts aberration at the telephoto end under the assumption of the infinitely far imaging plane in the fifth exemplary zoom lens.
Figure 36:
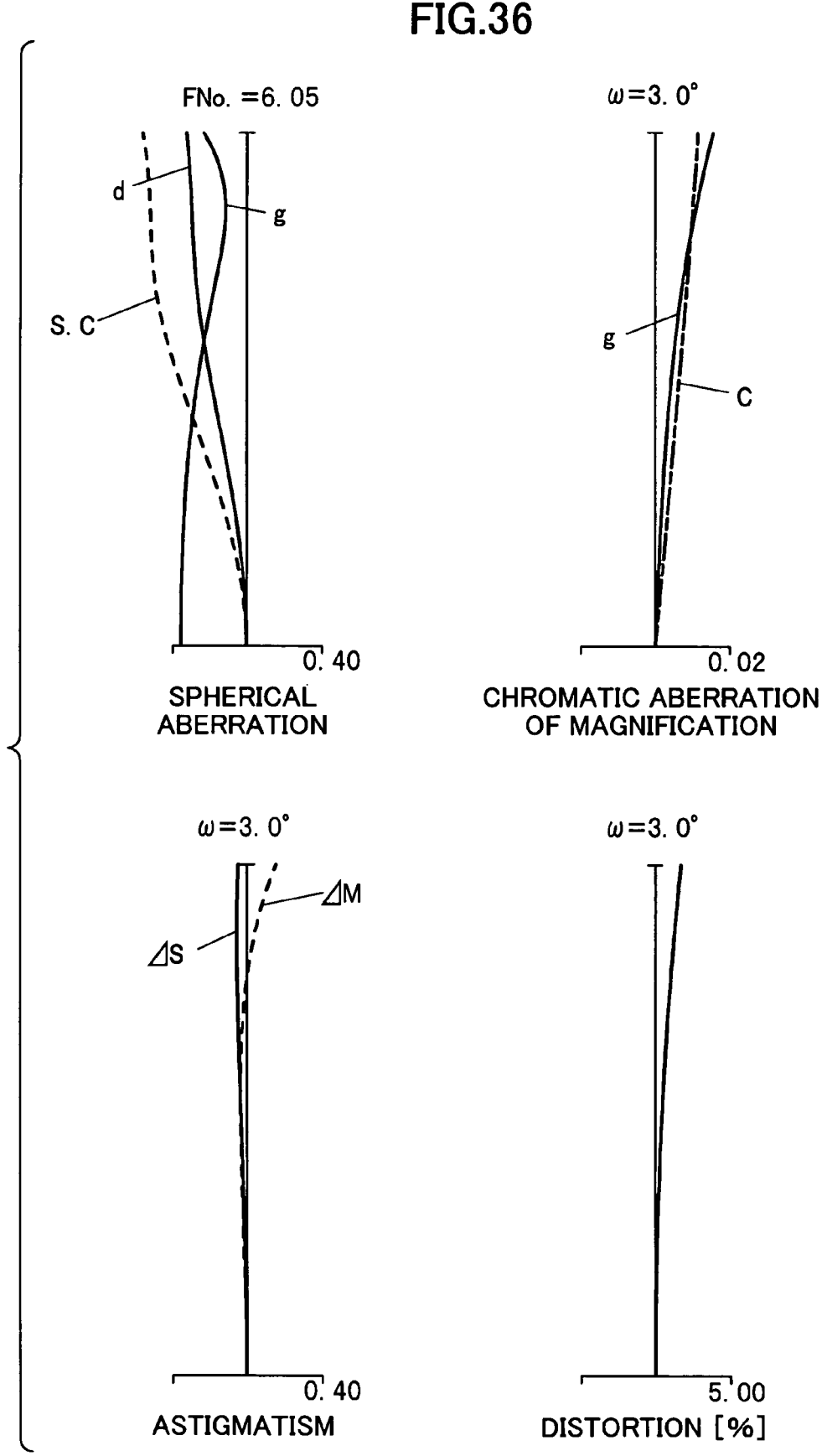
FIG. 36 depicts the aberration at the telephoto end under the assumption of 1.6 meters in distance from the leading or foremost lens piece to the subject being photographed, in the fifth exemplary zoom lens.
Figure 37:
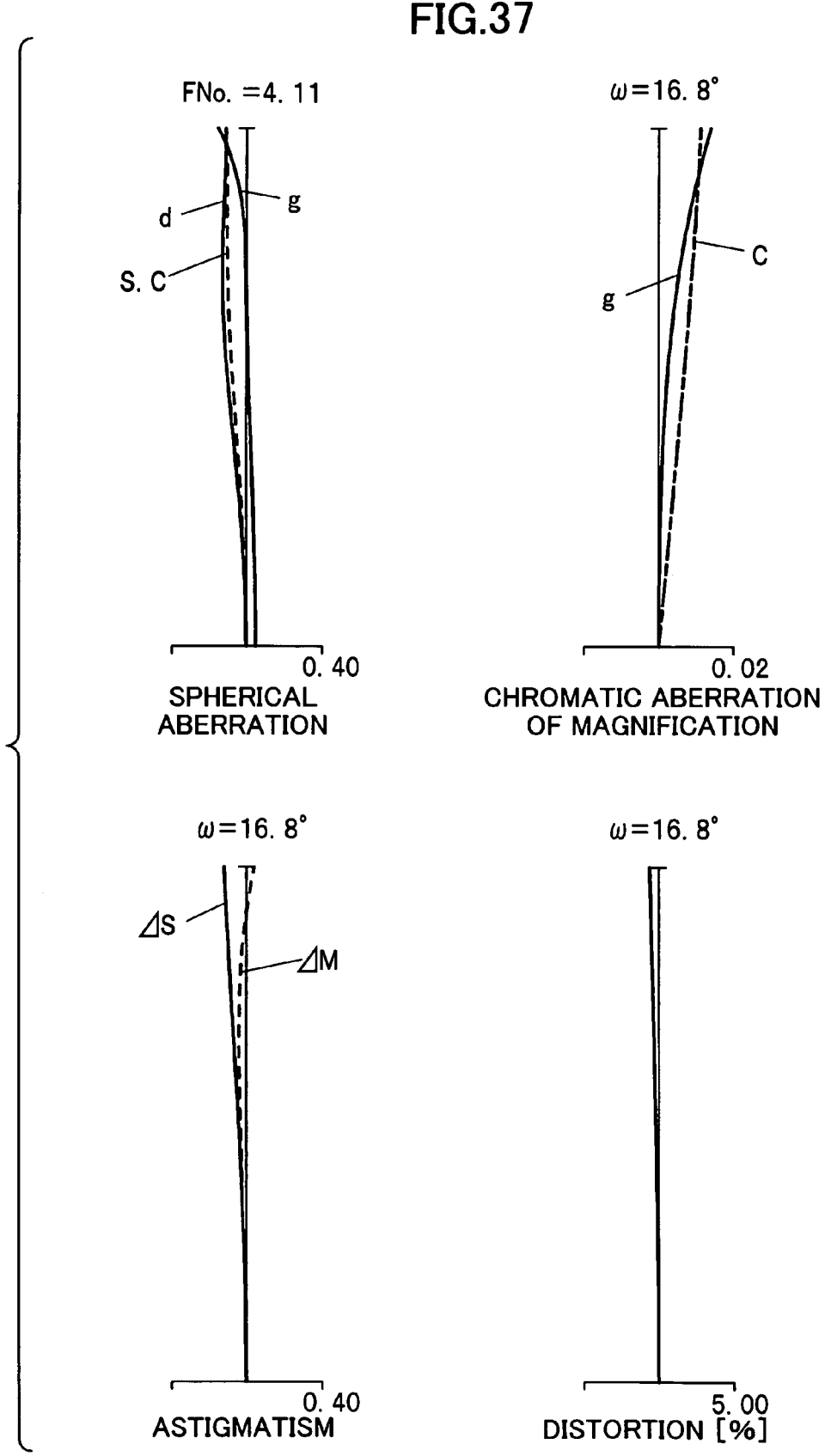
FIG. 37 depicts aberration at the wide-angle end under the assumption of the infinitely far imaging plane in the sixth exemplary zoom lens.
Figure 38:
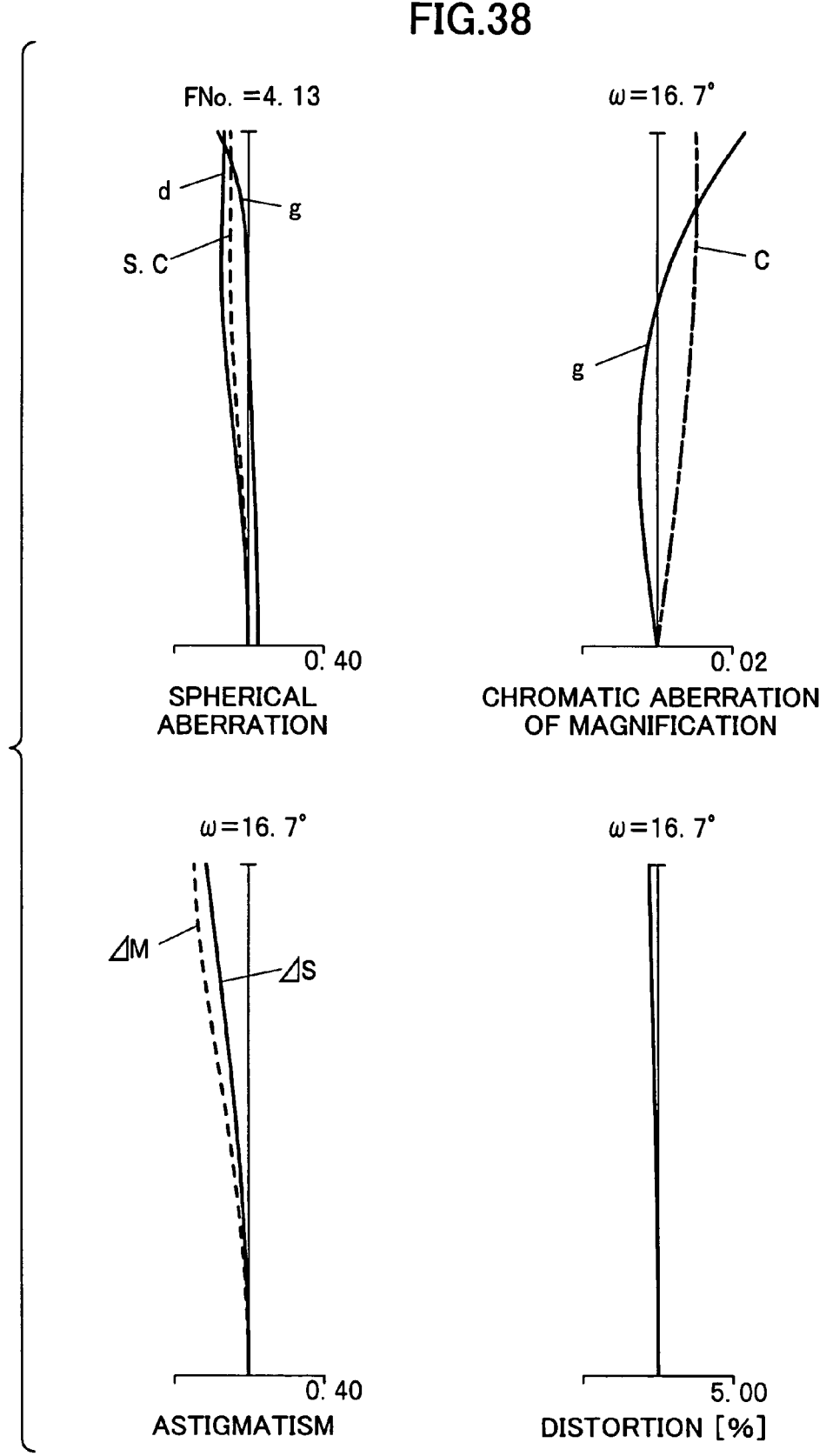
FIG. 38 depicts the aberration at the wide-angle end under the assumption of 1.6 meters in distance from the leading or foremost lens piece to the subject being photographed, in the sixth exemplary zoom lens.
Figure 39:
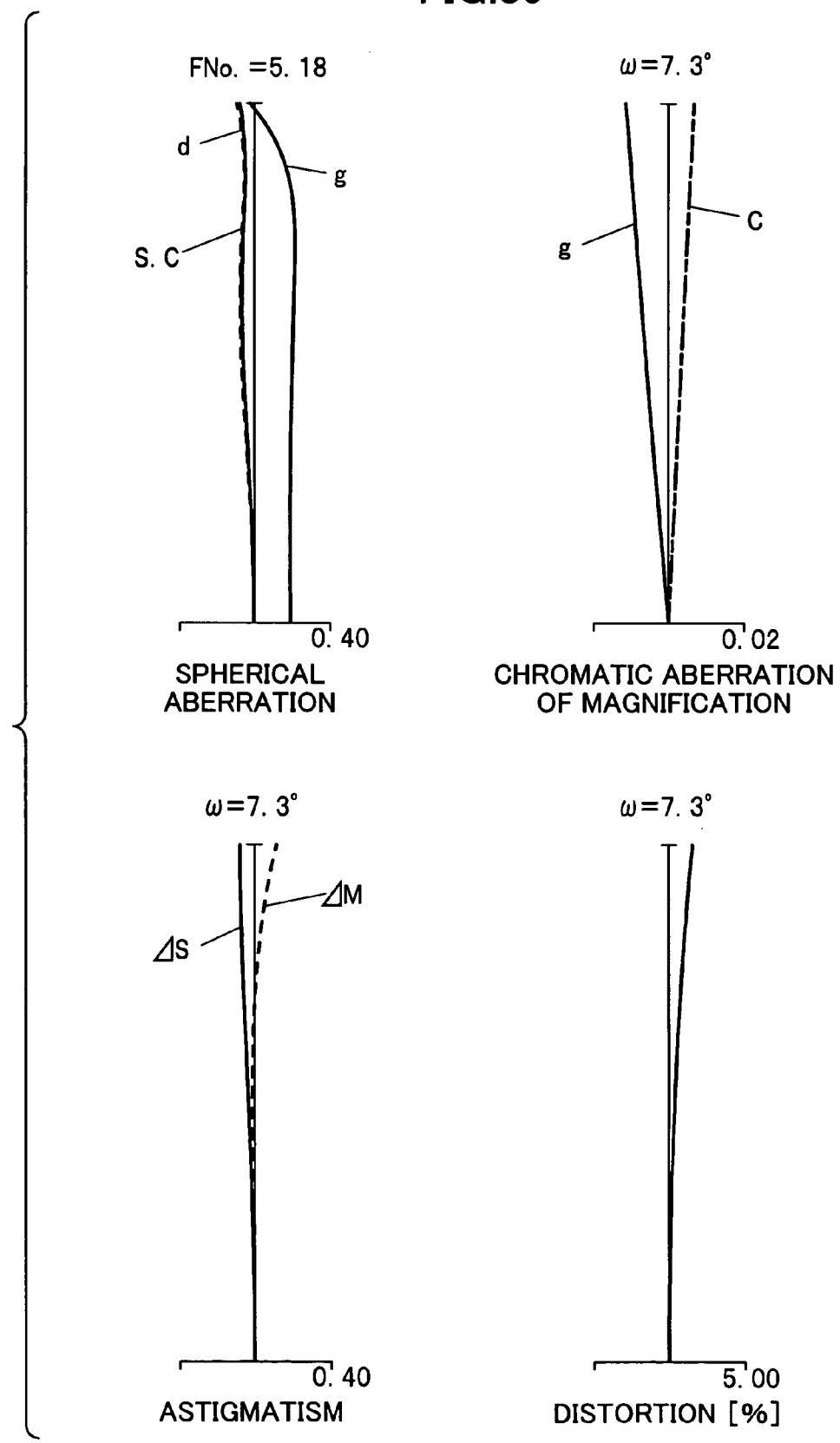
FIG. 39 depicts aberration at the intermediate focal length under the assumption of the infinitely far imaging plane in the sixth exemplary zoom lens.
Figure 40:
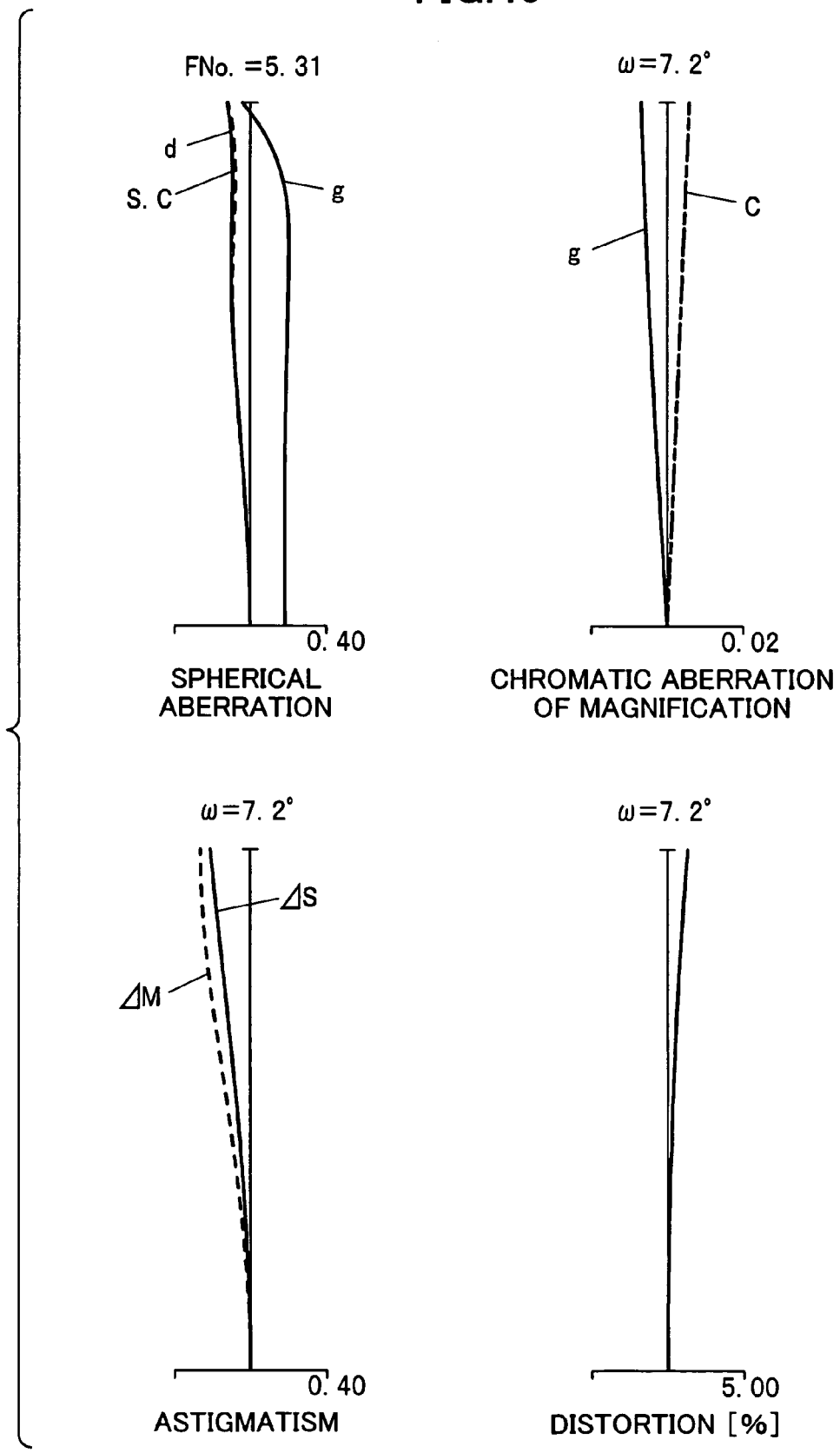
FIG. 40 depicts the aberration at the intermediate focal length under the assumption of 1.6 meters in distance from the leading or foremost lens piece to the subject being photographed, in the sixth exemplary zoom lens.
Figure 41:
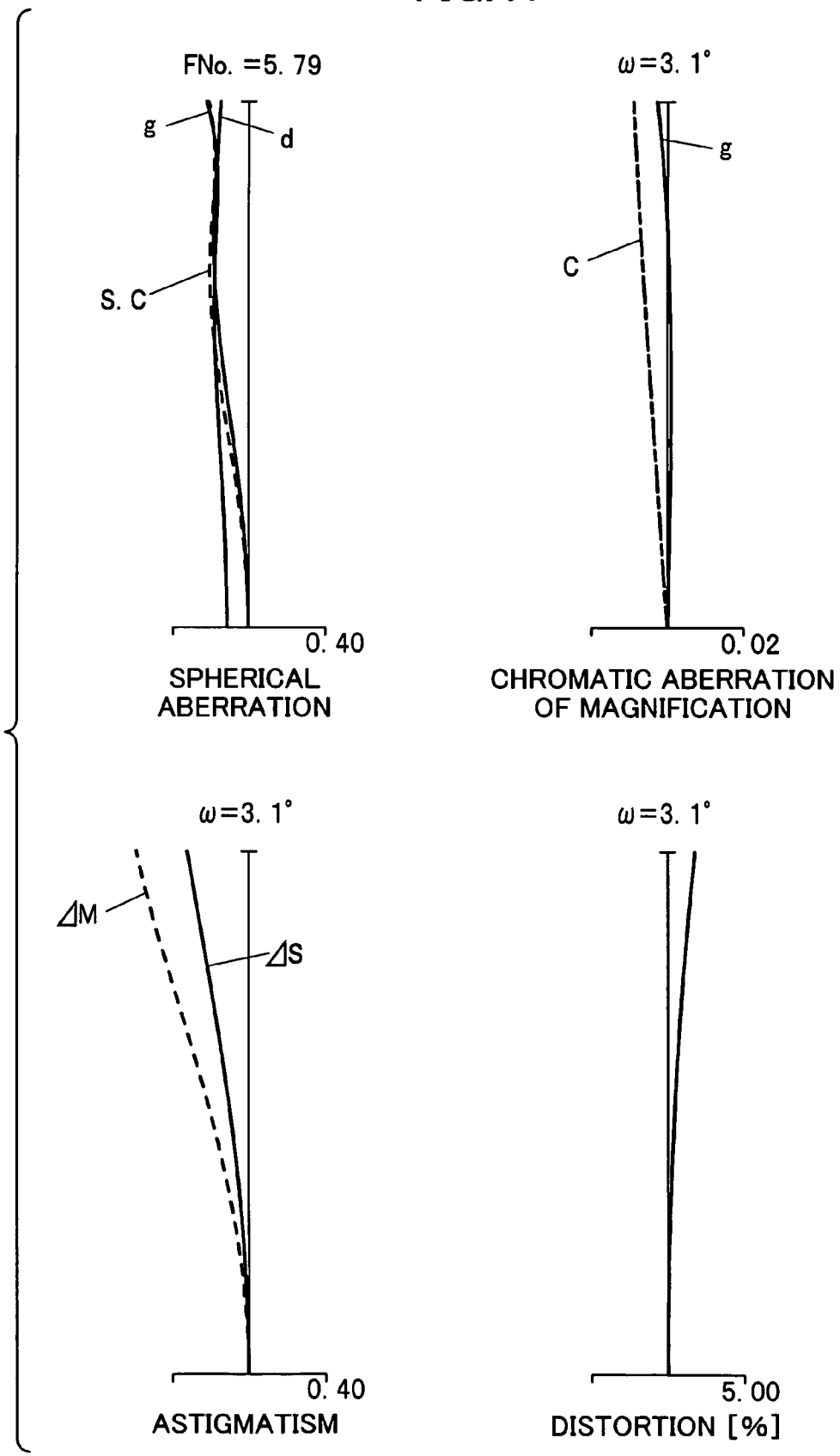
FIG. 41 depicts aberration at the telephoto end under the assumption of the infinitely far imaging plane in the sixth exemplary zoom lens.
Figure 42:
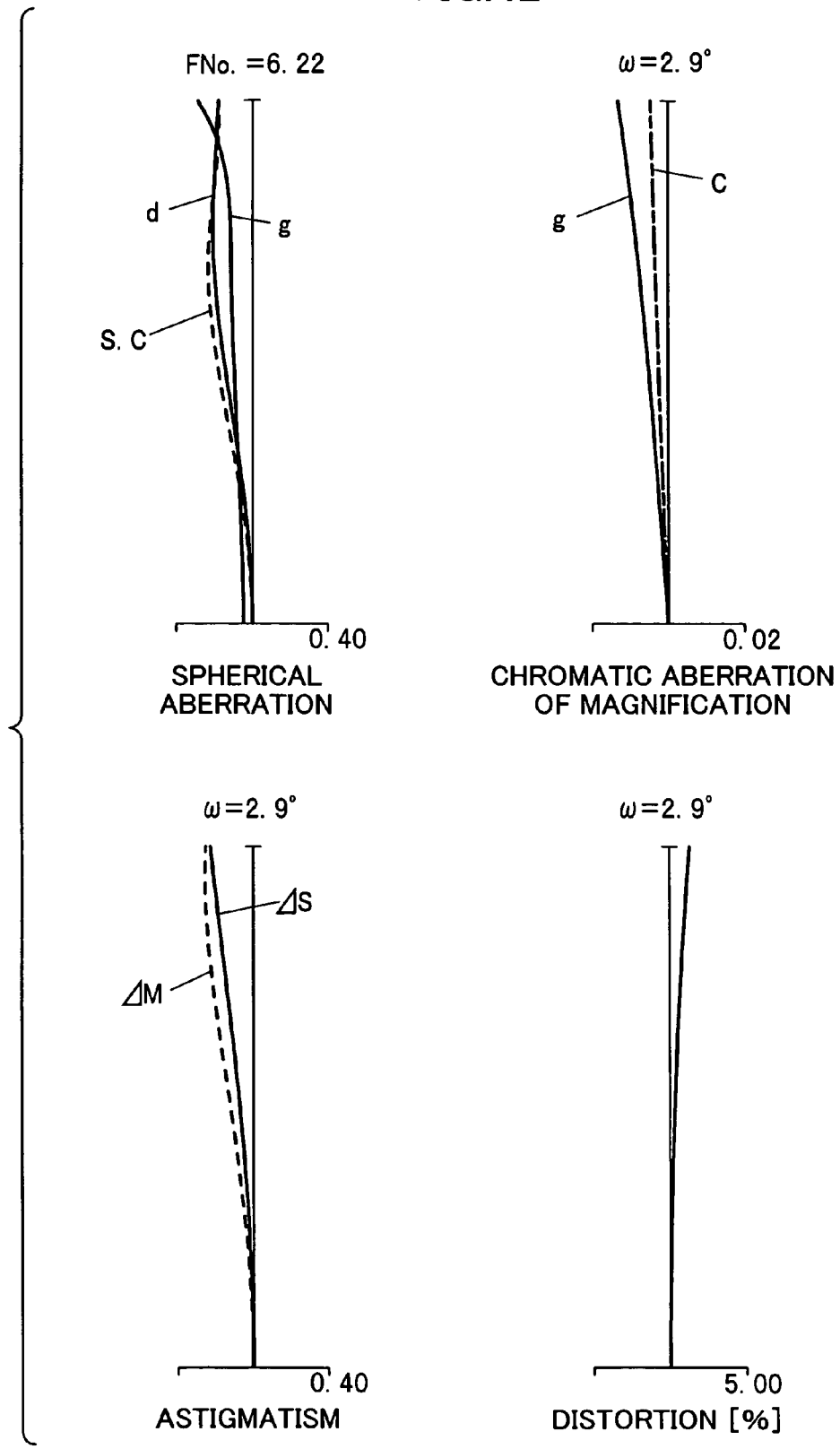
FIG. 42 depicts the aberration at the telephoto end under the assumption of 1.6 meters in distance from the leading or foremost lens piece to the subject being photographed, in the sixth exemplary zoom lens.

An inner focus zoom lens in accordance with the invention, which comprises multiple groups of lens pieces, namely, a first or leading lens group of positive refractivity, a second lens group of negative refractivity, and remaining trailing groups of positive refractivity, as a whole, where at least one group of positive refractivity among the trailing groups includes two or more negative lens pieces, at least one of which is connected on its surface to another lens piece to form a doublet composite lens so that the junction between two of them functions to diverge incident beams; wherein a sum of the refractivities of all the junctions of the composite lenses can be expressed as $\Sigma\phi=\Sigma|(N1-N2)/R|$ where N1 and N2 are refractivities that substances before and after the junction of the composite lenses respectively have, R is a radius of curvature of the junction, ft is a focal length of the comprehensive lens optics of the zoom lens at the telephoto end, and $\phi t=1/ft$ is the refractivity of the comprehensive lens optics at the telephoto end, satisfies the conditions as given by the following formula:

$$2<\Sigma\phi/\phi t<10 \qquad (1)$$

with the assumptions that the sum of the refractivities of all the junctions of the composite lenses can be expressed as $\Sigma\phi=\Sigma|(N1-N2)/R|$ where N1 and N2 are the refractivities that substances before and after the junction of the composite lenses respectively have, R is the radius of curvature of the junction, ft is the focal length of the comprehensive lens optics of the zoom lens at the telephoto end, and $\phi t=1/ft$ is the refractivity of the comprehensive lens optics at the telephoto end.

The formula (1) defines a range of the sum of the refractivities of all the junctions of the composite lenses in any of the lens group(s) (only the 4th in this case) including two or more negative lenses and one or more composite lenses, relative to the refractivity of the comprehensive lens optics. As the sum of the refractivities of the junctions exceeds the lower limit, the zoom lens tends to lose more the effects of varying the spherical aberration to be overdone and prevalent, resulting in the comprehensive lens optics hardly countervailing the spherical aberration, especially, at the telephoto end.

As the sum exceeds the upper limit defined in the formula (1), the zoom lens tends to have the spherical aberration excessively overdone and prevalent during the fourth lens group's focusing for the long distance zooming, resulting in the zoom lens hardly countervailing the spherical aberration throughout the entire variable power range unless the lens group(s) displaced ahead of the fourth lens group, especially, the third lens group adjusts the spherical aberration to be emphatically under-corrected.

An embodiment of the zoom lens according to the invention, which comprises at least five of the groups of lens pieces, namely, the first or leading lens group of positive refractivity, the second lens group of negative refractivity, the third lens group of positive refractivity, the fourth lens group of positive refractivity, and the fifth lens group of negative refractivity all arranged in order from the object side; the fourth lens group including two or more negative lens pieces, at least one of which is connected on its surface to another lens piece into a doublet composite lens so that the junction between two of them functions to diverge incident beams, satisfies the conditions as given by the following formulae:

$$40<vd1<55 \qquad (2)$$

$$20<vd2<35 \qquad (3)$$

where vd1 is the Abbe number of the negative lens piece(s) in the first lens group, and vd2 is the Abbe number of the positive lens piece(s) in any one of the lens groups of positive refractivity succeeding to the first lens group.

The formula (2) defines a range of the Abbe number of the negative lens piece in the first lens group. As the Abbe number exceeds the lower limit, the zoom lens tends to encounter difficulties in well compensating for chromatic aberration of magnification of the g-line and comatic aberration in an area below the g-line, especially, at the telephoto end. As the Abbe number exceeds the upper limit, the zoom lens tends to get hard to well compensate for the chromatic aberration of magnification of the c-line, especially, at the telephoto end.

The formula (3) defines a range of the Abbe number of the positive lens piece(s) in any one of the lens group(s) of positive refractivity succeeding to the aperture stop S.

As the Abbe number exceeds the lower limit, the zoom lens tends to encounter difficulties in well compensating for the chromatic aberration of magnification of the g-line, especially, at the telephoto end. As the Abbe number exceeds the upper limit, the zoom lens tends to get hard to well compensate for axial chromatic aberration of the c-line and the chromatic aberration of magnification of the same, especially, at the telephoto end.

The zoom lens according to the present invention applies the formula (2) to well compensate for the chromatic aberration of magnification of the g-line, especially at the telephoto end. With an adjustment by simply applying the formula (2), it becomes hard instead to satisfactorily correct the chromatic aberration of magnification of the c-line, especially at the telephoto end. Hence, such adjustment along with the application of the formula (3) enables the zoom lens to successfully correct the chromatic aberration of magnification of the c-line as well.

An embodiment of the zoom lens as defined above, in which at least five of the groups of lens pieces are provided, is advantageous in that its entire length can be downsized. Departing from these requirements, the zoom lens has its dimensions undesirably increased.

Another embodiment of the zoom lens according to the invention, in which at least six of the groups of lens pieces are provided—namely, the first lens group or the leading lens group of positive refractivity, the second lens group of negative refractivity, the third lens group of positive refractivity, the fourth lens group of positive refractivity, the fifth lens group of positive refractivity, and the six lens group of negative refractivity all arranged in order from the object side; the fifth lens group including two or more negative lens pieces, at least one of which is connected on its surface to another lens piece into a doublet composite lens so that the junction between two of them functions to diverge incident beams—is preferred in that its entire length can be downsized and that it can well compensate for astigmatism throughout the entire zoom range. Departing from these requirements, the zoom lens results in undesirably increased dimensions as well as difficulties in flattening the image plane throughout the entire zoom range.

Still another embodiment of the zoom lens according to the invention, in which the rearmost lens group closest to the image plane primarily conducts the focusing, is desirable in successfully reducing the variations in the spherical aberration, as a whole, in the comprehensive lens optics. Departing from these requirements, the zoom lens is unable to increase a height of the incident beams upon the lens group including at least two negative lens pieces and the composite lens during the focusing for the short distance zooming, and consequently, it fails to reduce the variations in the spherical aberration in the comprehensive lens optics.

Still another embodiment of the zoom lens according to the invention, in which the rearmost lens group of positive refractivity and closest to the image plane primarily conducts the focusing, is advantageous in that the variations in the spherical aberration in the comprehensive lens optics can be reduced. Departing from these requirements, the zoom lens is unable to increase a height of the incident beams upon the lens group including two negative lens pieces and the composite lens during the focusing for the short distance zooming, and therefore, it fails to reduce the variations in the spherical aberration in the comprehensive lens optics.

An embodiment of the zoom lens according to the invention, in which at least one group of positive refractivity among the third lens group and all the succeeding lens groups includes a triplet composite lens of negative-positive-negative power configuration of three of the lens pieces, implements the best mode to adjust and control the varied spherical aberration during the focusing. Departing from these requirements, the zoom lens encounters significantly more frequent and increased higher-order aberration and adverse sensitivity that means considerable correction of various types of the aberration due to manufacturing tolerance, eventually resulting in inability to design for fine products.

The formula $$1 < R/f(\text{wide}) < 8 \quad (4)$$

provides a range of the radius of curvature of an objective surface of the negative lens piece closest to the subject being photographed in the second lens group, relative to the focal length at the wide-angle end. As the radius of curvature exceeds the upper limit, it is hard to well compensate for the variations in curvature of field during the focusing, especially, at the wide-angle end. As the radius of curvature exceeds the lower limit, the desired anti-aberration effectiveness imposed on the negative lens piece closest to the subject being photographed must be taken over and countervailed by another negative lens piece(s) in the same lens group, which cannot be attained with the triplet composite power configuration of three of the lens pieces in the second lens group.

The formula $$2\omega(\text{wide}) < 40 \quad (5)$$

provides a range of the field angle at the wide-angle end.

As the field angle exceeds the upper limit, the zoom lens loses its merits as a telephoto-shooting zooming lens.

The formula $$2 < \Sigma\phi/\phi(\text{tele}) < 10 \quad (6)$$

provides a range of the sum of the refractivities of all the junctions of the composite lenses disposed along with two or more negative lens pieces in the same lens group, relative to the refractivity of the comprehensive lens optics at the telephoto end.

As the sum of the refractivities exceeds the upper limit, the zoom lens tends to have the spherical aberration excessively overdone and prevalent during such a lens group's focusing for the long distance zooming, resulting in the zoom lens hardly countervailing the spherical aberration throughout the entire variable power range unless any one(s) displaced ahead of that lens group, especially, the third lens group adjusts the spherical aberration to be emphatically under-corrected.

As the sum of the refractivities exceeds the lower limit, that lens group tends to lose more the effects of varying the spherical aberration to be overdone and prevalent, resulting in the comprehensive lens optics hardly countervailing the spherical aberration, especially, at the telephoto end.

Zoom lenses according to the present invention, including their respective variations and modifications are adapted to conduct focusing such as inner-focusing, including rear-focusing, and the like, more briskly and quickly in comparison with the front lens focusing system, and the improved zoom lenses of groups of lens pieces merely displace a single group of lens pieces to well compensate for variations in spherical aberration, especially, at the telephoto end.

<Embodiment 1>
f = 72.0785~390.0019
FNo. = 4.11~5.78
(Data on Surfaces)

| | r | d | nd | vd |
|---|---|---|---|---|
| 0 (Objective Surface) | ∞ | ∞ | | |
| 1 | 425.3905 | 2.3000 | 1.80420 | 46.50 |
| 2 | 105.0387 | 8.1955 | 1.49700 | 81.61 |
| 3 | −562.0044 | 0.3000 | | |
| 4 | 110.7871 | 7.3867 | 1.49700 | 81.61 |
| 5 | −1221.5706 | Variable | | |
| 6 | 256.4914 | 1.5000 | 1.48749 | 70.44 |
| 7 | 38.5631 | 5.8780 | | |
| 8 | −89.5171 | 0.9000 | 1.48749 | 70.44 |
| 9 | 45.0811 | 3.4531 | 1.80610 | 33.27 |
| 10 | 120.9491 | Variable | | |
| 11 | 74.0490 | 3.7000 | 1.67003 | 47.20 |
| 12 | −131.1456 | 1.9246 | | |
| 13 | −47.6423 | 1.3000 | 1.80610 | 40.73 |
| 14 | −280.5770 | 0.2000 | | |
| 15 | 43.7230 | 3.5000 | 1.72000 | 50.34 |
| 16 | 64.0768 | 4.3536 | | |
| 17 (Aperture Stop) | ∞ | Variable | | |
| 18 | −141.9867 | 3.5000 | 1.80518 | 25.46 |
| 19 | −51.7664 | 0.1500 | | |
| 20 | 48.6209 | 1.3000 | 1.83400 | 37.34 |
| 21 | 24.6183 | 10.7880 | 1.51680 | 64.20 |
| 22 | −27.6249 | 1.2000 | 1.84666 | 23.78 |
| 23 | 96.4484 | 2.2370 | | |
| 24 | 81.0305 | 4.3305 | 1.84666 | 23.78 |
| 25 | −68.8511 | Variable | | |
| 26 | 191.9351 | 1.2000 | 1.77250 | 49.62 |
| 27 | 47.7663 | 2.5284 | | |
| 28 | 482.3384 | 4.0000 | 1.84666 | 23.78 |
| 29 | −76.8478 | 5.0000 | | |
| 30 | −69.1358 | 1.5000 | 1.83481 | 42.72 |
| 31 | 200.0000 | Variable | | |
| 32 (Image Plane) | ∞ | | | |

(Various Data)

| Zoom Ratio | | 5.411 | |
|---|---|---|---|
| | WIDE | MIDDLE | TELE |
| f | 72.0785 | 167.1066 | 390.0019 |
| FNo. | 4.11 | 5.56 | 5.78 |
| 2ω° | 33.212 | 14.454 | 6.234 |
| Image Height | 21.633 | 21.633 | 21.633 |
| Full Lens Length | 225.142 | 275.999 | 311.667 |

-continued

<Embodiment 1>
f = 72.0785~390.0019
FNo. = 4.11~5.78
(Data on Surfaces)

Variable Interval
(Focused at the Infinity-Point)

| | | | |
|---|---|---|---|
| d0 | ∞ | ∞ | ∞ |
| d5 | 1.5000 | 54.4500 | 114.8693 |
| d10 | 55.5123 | 30.0166 | 1.5000 |
| d17 | 16.8647 | 10.0484 | 1.5000 |
| d25 | 21.7305 | 14.7668 | 1.0000 |
| BF | 46.9090 | 84.0920 | 110.1720 |

Variable Interval
(Focused with 1.6-meter Distance to the Subject)

| | | | |
|---|---|---|---|
| d0 | 1374.86 | 1324.00 | 1288.33 |
| d5 | 1.5000 | 54.4500 | 114.8693 |
| d10 | 55.5123 | 30.0166 | 1.5000 |
| d17 | 16.8647 | 10.0484 | 1.5000 |
| d25 | 23.3970 | 18.9842 | 17.1782 |
| BF | 45.2430 | 79.8750 | 93.9940 |

(Data on the Zoom Lens Groups)

| Group | Initial Surface | f |
|---|---|---|
| 1 | 1 | 210.0756 |
| 2 | 6 | −61.8149 |
| 3 | 11 | 165.5535 |
| 4 | 18 | 60.9734 |
| 5 | 26 | −63.5770 |

(Values of the Primary Term in the Formulae)

| | |
|---|---|
| Formula (1) | 9.68 |
| Formula (2) | 46.50 |
| Formula (3) | 23.78 |

<Embodiment 2>
f = 72.0702~387.8665
FNo. = 4.15~5.74
(Data on the Surfaces)

| | r | d | nd | vd |
|---|---|---|---|---|
| 0 (Objective Surface) | ∞ | ∞ | | |
| 1 | 464.3037 | 2.3000 | 1.80400 | 46.58 |
| 2 | 117.2776 | 7.6304 | 1.49700 | 81.61 |
| 3 | −668.1523 | 0.3000 | | |
| 4 | 125.0743 | 6.9036 | 1.49700 | 81.61 |
| 5 | −1086.8029 | Variable | | |
| 6 | 400.0000 | 1.7000 | 1.51680 | 64.20 |
| 7 | 62.9843 | 2.9660 | | |
| 8 | −209.8881 | 1.3000 | 1.48749 | 70.21 |
| 9 | 43.1221 | 2.5662 | 1.75520 | 27.51 |
| 10 | 70.2788 | Variable | | |
| 11 | 77.1859 | 3.2583 | 1.58913 | 61.18 |
| 12 | −142.4720 | 2.4834 | | |
| 13 | −43.6774 | 1.5000 | 1.72342 | 37.95 |
| 14 | −360.1644 | 0.2000 | | |
| 15 | 48.1790 | 4.1604 | 1.75520 | 27.51 |
| 16 | 102.9396 | 3.0000 | | |
| 17 (Aperture Stop) | ∞ | Variable | | |
| 18 | 221.3497 | 1.5000 | 1.76182 | 26.55 |
| 19 | 55.0393 | 3.5987 | | |
| 20 | 176.6014 | 4.9403 | 1.51633 | 64.15 |
| 21 | −40.6879 | 0.2000 | | |
| 22 | 132.6269 | 5.9583 | 1.56883 | 56.34 |
| 23 | −33.2235 | 1.3000 | 1.78590 | 44.19 |
| 24 | −266.0050 | 0.2000 | | |
| 25 | 52.1984 | 4.0687 | 1.49700 | 81.61 |
| 26 | −458.0671 | Variable | | |

-continued

<Embodiment 2>
f = 72.0702~387.8665
FNo. = 4.15~5.74
(Data on the Surfaces)

| | | | | |
|---|---|---|---|---|
| 27 | 103.5193 | 1.5000 | 1.83481 | 42.72 |
| 28 | 43.0987 | 2.3941 | | |
| 29 | 1915.8683 | 3.7371 | 1.76182 | 26.55 |
| 30 | −44.9612 | 1.5000 | 1.48749 | 70.21 |
| 31 | −66.5655 | 3.1137 | | |
| 32 | −50.2801 | 1.2000 | 1.80400 | 46.58 |
| 33 | 200.0000 | Variable | | |
| 34 (Image Plane) | ∞ | | | |

(Various Data)

| Zoom Ratio | | 5.382 | |
|---|---|---|---|
| | WIDE | MIDDLE | TELE |
| f | 72.0702 | 167.0620 | 387.8665 |
| FNo. | 4.15 | 5.12 | 5.74 |
| 2ω° | 33.214 | 14.390 | 6.260 |
| Image Height | 21.633 | 21.633 | 21.633 |
| Full Lens Length | 230.089 | 283.557 | 320.126 |

Variable Interval
(Focused at the Infinity-Point)

| | | | |
|---|---|---|---|
| d0 | ∞ | ∞ | ∞ |
| d5 | 7.7179 | 76.4777 | 132.8660 |
| d10 | 62.9882 | 33.7114 | 1.5000 |
| d17 | 15.9264 | 10.2597 | 1.5000 |
| d26 | 20.8883 | 14.7132 | 1.5000 |
| BF | 47.0890 | 72.9160 | 107.2810 |

Variable Interval
(Focused with 1.6-meter Distance to the Subject)

| | | | |
|---|---|---|---|
| d0 | 1369.91 | 1316.44 | 1279.87 |
| d5 | 7.7179 | 76.4777 | 132.8660 |
| d10 | 62.9882 | 33.7114 | 1.5000 |
| d17 | 15.9264 | 10.2597 | 1.5000 |
| d26 | 22.3449 | 19.0030 | 15.1222 |
| BF | 45.6330 | 68.6270 | 93.6590 |

(Data on the Zoom Lens Groups)

| Group | Initial Surface | f |
|---|---|---|
| 1 | 1 | 232.6486 |
| 2 | 6 | −71.5603 |
| 3 | 11 | 165.8567 |
| 4 | 18 | 56.5968 |
| 5 | 27 | −57.0465 |

(Values of the Primary Term in the Formulae)

| | |
|---|---|
| Formula (1) | 2.53 |
| Formula (2) | 46.58 |
| Formula (3) | 27.51 |

<Embodiment 3>
f = 71.7730~291.9632
FNo. = 4.59~5.79
(Data on the Surfaces)

| | r | d | nd | vd |
|---|---|---|---|---|
| 0 (Objective Surface) | ∞ | ∞ | | |
| 1 | 75.0392 | 5.6833 | 1.48749 | 70.44 |
| 2 | 617.3294 | 0.2000 | | |
| 3 | 88.8879 | 1.4000 | 1.78590 | 43.93 |
| 4 | 44.0278 | 8.0931 | 1.49700 | 81.61 |
| 5 | 526.7875 | Variable | | |
| 6 | 275.5840 | 1.0000 | 1.77250 | 49.62 |

-continued

<Embodiment 3>
f = 71.7730~291.9632
FNo. = 4.59~5.79
(Data on the Surfaces)

| | | | | |
|---|---|---|---|---|
| 7 | 32.9367 | 2.9002 | | |
| 8 | −251.0357 | 1.0000 | 1.48749 | 70.44 |
| 9 | 25.3841 | 4.0675 | 1.67270 | 32.17 |
| 10 | 135.9493 | Variable | | |
| 11 (Aperture Stop) | ∞ | 2.0000 | | |
| 12 | 29.8854 | 5.0241 | 1.48749 | 70.44 |
| 13 | −268.4437 | 2.0014 | | |
| 14 | −34.6079 | 1.0000 | 1.77250 | 49.62 |
| 15 | −94.7884 | Variable | | |
| 16 | −29.8468 | 2.7103 | 1.72825 | 28.32 |
| 17 | −23.8487 | 0.1000 | | |
| 18 | 70.8448 | 1.0000 | 1.80610 | 33.27 |
| 19 | 28.8852 | 8.2977 | 1.48749 | 70.44 |
| 20 | −20.2504 | 1.0000 | 1.80610 | 33.27 |
| 21 | −42.2605 | 0.1000 | | |
| 22 | 37.7570 | 3.5000 | 1.77250 | 49.62 |
| 23 | 199.3442 | Variable | | |
| 24 | 97.6915 | 1.0000 | 1.62041 | 60.34 |
| 25 | 26.3176 | 2.9258 | | |
| 26 | −153.4459 | 2.5953 | 1.84666 | 23.78 |
| 27 | −40.0547 | 1.2000 | 1.77250 | 49.62 |
| 28 | 200.0000 | Variable | | |
| 34 (Image Plane) | ∞ | | | |

(Various Data)

| Zoom Ratio | | 4.068 | |
|---|---|---|---|
| | WIDE | MIDDLE | TELE |
| f | 71.7730 | 140.0942 | 291.9632 |
| FNo. | 4.59 | 5.60 | 5.79 |
| 2ω° | 32.824 | 17.054 | 8.246 |
| Image Height | 21.633 | 21.633 | 21.633 |
| Full Lens Length | 175.925 | 206.840 | 235.878 |

Variable Interval
(Focused at Infinity-Point)

| | | | |
|---|---|---|---|
| d0 | ∞ | ∞ | ∞ |
| d5 | 1.6500 | 30.4176 | 65.7475 |
| d10 | 28.9039 | 15.7723 | 3.6150 |
| d15 | 20.3493 | 14.9521 | 7.8202 |
| d23 | 13.6315 | 9.7660 | 1.5000 |
| BF | 52.5920 | 77.1330 | 98.3970 |

Variable Interval
(Focused with 1.6-meter Distance to the Subject)

| | | | |
|---|---|---|---|
| d0 | 1424.07 | 1393.16 | 1364.12 |
| d5 | 1.6500 | 30.4176 | 65.7475 |
| d10 | 28.9039 | 15.7723 | 3.6150 |
| d15 | 20.3493 | 14.9521 | 7.8202 |
| d23 | 14.3597 | 11.3889 | 6.3196 |
| BF | 51.8640 | 75.5100 | 93.5770 |

(Data on the Zoom Lens Groups)

| Group | Initial Surface | f |
|---|---|---|
| 1 | 1 | 139.7971 |
| 2 | 6 | −49.1963 |
| 3 | 11 | 193.8488 |
| 4 | 16 | 36.0311 |
| 5 | 24 | −39.7982 |

(Values of the Primary Term in the Formulae)

| Formula (1) | 7.81 |
|---|---|
| Formula (2) | 43.93 |
| Formula (3) | 28.32 |

<Embodiment 4>
f = 72.0790~388.0549
FNo. = 3.85~6.35
(Data on the Surfaces)

| | r | d | nd | vd |
|---|---|---|---|---|
| 0 (Objective Surface) | ∞ | ∞ | | |
| 1 | 241.2170 | 2.3000 | 1.83400 | 37.34 |
| 2 | 111.0797 | 6.7649 | 1.49700 | 81.61 |
| 3 | −695.2799 | 0.3000 | | |
| 4 | 137.5395 | 5.8335 | 1.49700 | 81.61 |
| 5 | −754.2861 | Variable | | |
| 6 | 350.0000 | 1.5000 | 1.62280 | 57.06 |
| 7 | 40.8284 | 4.5778 | | |
| 8 | −86.6512 | 1.2000 | 1.48749 | 70.44 |
| 9 | 47.9402 | 3.3989 | 1.80610 | 33.27 |
| 10 | 266.2338 | Variable | | |
| 11 | 171.9973 | 3.3732 | 1.65844 | 50.85 |
| 12 | −112.6153 | 1.9131 | | |
| 13 | −42.7454 | 1.2000 | 1.83481 | 42.72 |
| 14 | −261.9302 | 0.2000 | | |
| 15 | 74.0402 | 3.8458 | 1.60311 | 60.69 |
| 16 | −179.3158 | 5.0000 | | |
| 17 (Aperture Stop) | ∞ | Variable | | |
| 18 | −414.6225 | 3.1568 | 1.78472 | 25.72 |
| 19 | −78.3244 | 3.4069 | | |
| 20 | 78.3956 | 1.5000 | 1.79950 | 42.34 |
| 21 | 34.8786 | 10.1423 | 1.48749 | 70.44 |
| 22 | −34.8808 | 1.5000 | 1.84666 | 23.78 |
| 23 | −96.8311 | 0.3338 | | |
| 24 | 60.7270 | 4.5000 | 1.72000 | 50.34 |
| 25 | −392.9783 | Variable | | |
| 26 | 132.9111 | 1.2000 | 1.80420 | 46.50 |
| 27 | 36.5287 | 2.8896 | | |
| 28 | −489.4854 | 3.9259 | 1.84666 | 23.78 |
| 29 | −36.8054 | 1.2000 | 1.83481 | 42.72 |
| 30 | 200.0000 | Variable | | |
| 31 (Image Plane) | ∞ | | | |

(Various Data)

| Zoom Ratio | | 5.384 | |
|---|---|---|---|
| | WIDE | MIDDLE | TELE |
| f | 72.0790 | 167.0937 | 388.0549 |
| FNo. | 3.85 | 5.26 | 6.35 |
| 2ω° | 33.130 | 14.400 | 6.248 |
| Image Height | 21.633 | 21.633 | 21.633 |
| Full Lens Length | 235.118 | 276.672 | 320.213 |

Variable Interval (Focused at the Infinity-Point)

| | | | |
|---|---|---|---|
| d0 | ∞ | ∞ | ∞ |
| d5 | 2.5000 | 46.8297 | 92.3228 |
| d10 | 54.0017 | 26.1796 | 2.0000 |
| d17 | 32.9868 | 25.7167 | 19.6391 |
| d25 | 16.6794 | 11.7738 | 3.0000 |
| BF | 53.7880 | 91.0100 | 128.0890 |

Variable Interval (Focused with 1.6-meter Distance to the Subject)

| | | | |
|---|---|---|---|
| d0 | 1364.88 | 1323.33 | 1279.79 |
| d5 | 2.5000 | 46.8297 | 92.3228 |
| d10 | 54.0017 | 26.1796 | 2.0000 |
| d17 | 32.2739 | 23.6712 | 12.9801 |
| d25 | 17.3923 | 13.8193 | 9.6590 |
| BF | 53.7880 | 91.0100 | 128.0890 |

(Data on the Zoom Lens Groups)

| Group | Initial Surface | f |
|---|---|---|
| 1 | 1 | 185.9118 |
| 2 | 6 | −64.1404 |
| 3 | 11 | 199.4687 |
| 4 | 18 | 49.3767 |
| 5 | 26 | −45.6959 |

-continued

<Embodiment 4>
f = 72.0790~388.0549
FNo. = 3.85~6.35
(Data on the Surfaces)

(Values of the Primary Term in the Formulae)

| Formula (1) | 7.47 |
| Formula (2) | 37.34 |
| Formula (3) | 25.72 |

<Embodiment 5>
f = 70.7231~388.1393
FNo. = 4.05~5.87
(Data on the Surfaces)

| | r | d | nd | vd |
|---|---|---|---|---|
| 0 (Objective Surface) | ∞ | ∞ | | |
| 1 | 341.4865 | 2.3000 | 1.80420 | 46.50 |
| 2 | 100.0749 | 8.6788 | 1.49700 | 81.61 |
| 3 | −580.6182 | 0.3000 | | |
| 4 | 102.6378 | 7.9544 | 1.49700 | 81.61 |
| 5 | −1349.2717 | Variable | | |
| 6 | 250.0000 | 1.7000 | 1.63854 | 55.45 |
| 7 | 38.5099 | 5.5546 | | |
| 8 | −113.5820 | 1.3000 | 1.48749 | 70.44 |
| 9 | 50.7413 | 3.1884 | 1.80610 | 33.27 |
| 10 | 154.1035 | Variable | | |
| 11 | 83.8353 | 3.7221 | 1.63854 | 55.45 |
| 12 | −166.1224 | 1.8375 | | |
| 13 | −44.9779 | 1.3078 | 1.83481 | 42.72 |
| 14 | 232.9722 | 0.2000 | | |
| 15 | 59.8407 | 3.9720 | 1.84666 | 23.78 |
| 16 | −354.6810 | 2.0000 | | |
| 17 (Aperture Stop) | ∞ | Variable | | |
| 18 | 204.1703 | 1.3000 | 1.84666 | 23.78 |
| 19 | 34.6621 | 6.4963 | 1.64769 | 33.84 |
| 20 | −98.0309 | Variable | | |
| 21 | −317.9391 | 1.3000 | 1.84666 | 23.78 |
| 22 | 36.5447 | 10.8707 | 1.63854 | 55.45 |
| 23 | −25.8401 | 1.3000 | 1.80610 | 33.27 |
| 24 | −60.5610 | 0.2000 | | |
| 25 | 59.5597 | 4.6131 | 1.84666 | 23.78 |
| 26 | −533.7403 | Variable | | |
| 27 | 63.6049 | 1.2000 | 1.72000 | 50.34 |
| 28 | 31.8746 | 3.6172 | | |
| 29 | −235.1399 | 4.0756 | 1.78472 | 25.72 |
| 30 | −37.4552 | 1.2000 | 1.80420 | 46.50 |
| 31 | 237.3893 | Variable | | |
| 32 (Image Plane) | ∞ | | | |

(Various Data)

| Zoom Ratio | 5.488 | | |
|---|---|---|---|
| | WIDE | MIDDLE | TELE |
| f | 70.7231 | 167.0889 | 388.1393 |
| FNo. | 4.05 | 5.32 | 5.87 |
| 2ω° | 33.848 | 14.468 | 6.256 |
| Image Height | 21.633 | 21.633 | 21.633 |
| Full Lens Length | 235.174 | 278.686 | 320.220 |

Variable Interval (Focused at the Infinity-Point)

| d0 | ∞ | ∞ | ∞ |
|---|---|---|---|
| d5 | 2.5000 | 49.1230 | 100.5475 |
| d10 | 51.3031 | 21.4622 | 2.0000 |
| d17 | 18.8055 | 10.7526 | 0.9318 |
| d20 | 1.4049 | 7.7484 | 12.6161 |
| d26 | 18.9608 | 15.5224 | 4.1107 |
| BF | 62.0110 | 93.8890 | 119.8250 |

Variable Interval (Focused with 1.6-meter Distance to the Subject)

| d0 | 1364.82 | 1321.31 | 1279.78 |
|---|---|---|---|
| d5 | 2.5000 | 49.1230 | 100.5475 |
| d10 | 51.3031 | 21.4622 | 2.0000 |

-continued

<Embodiment 5>
f = 70.7231~388.1393
FNo. = 4.05~5.87
(Data on the Surfaces)

| d17 | 18.8055 | 10.7526 | 0.9318 |
|---|---|---|---|
| d20 | 1.4049 | 7.7484 | 12.6161 |
| d26 | 19.8428 | 18.2832 | 14.1726 |
| BF | 61.1290 | 91.1280 | 109.7630 |

(Data on the Zoom Lens Groups)

| Group | Initial Surface | f |
|---|---|---|
| 1 | 1 | 186.6475 |
| 2 | 6 | −56.9423 |
| 3 | 11 | 164.6565 |
| 4 | 18 | 197.9375 |
| 5 | 21 | 63.1960 |
| 6 | 27 | −53.3835 |

(Values of the Primary Term in the Formulae)

| Formula (1) | 4.73 |
| Formula (2) | 46.50 |
| Formula (3) | 23.78 |

<Embodiment 6>
f = 72.0562~388.0927
FNo. = 4.11~5.79
(Data on the Surfaces)

| | r | d | nd | vd |
|---|---|---|---|---|
| 0 (Objective Surface) | ∞ | ∞ | | |
| 1 | 322.4599 | 2.3000 | 1.80420 | 46.50 |
| 2 | 91.0103 | 9.2192 | 1.49700 | 81.61 |
| 3 | −569.0188 | 0.3000 | | |
| 4 | 93.4615 | 8.6041 | 1.49700 | 81.61 |
| 5 | −1008.031 | Variable | | |
| 6 | 198.4362 | 1.7000 | 1.61800 | 63.39 |
| 7 | 37.6062 | 8.4309 | | |
| 8 | −70.0748 | 1.3000 | 1.48749 | 70.44 |
| 9 | 52.5435 | 3.2219 | 1.80610 | 33.27 |
| 10 | 190.1372 | Variable | | |
| 11 | 73.6767 | 3.8864 | 1.61800 | 63.39 |
| 12 | −176.6382 | 2.1013 | | |
| 13 | −42.3439 | 1.7886 | 1.83481 | 42.72 |
| 14 | 196.0411 | 0.2000 | | |
| 15 | 69.6402 | 4.5000 | 1.84666 | 23.78 |
| 16 | −174.3032 | 2.0000 | | |
| 17 (Aperture Stop) | ∞ | Variable | | |
| 18 | −5925.0049 | 1.3000 | 1.84666 | 23.78 |
| 19 | 39.5747 | 7.5004 | 1.59551 | 39.22 |
| 20 | −56.4431 | Variable | | |
| 21 | 174.5724 | 1.3000 | 1.84666 | 23.78 |
| 22 | 47.3325 | 8.8734 | 1.61800 | 63.39 |
| 23 | −33.6393 | 1.3000 | 1.80610 | 33.27 |
| 24 | −147.2232 | 0.2000 | | |
| 25 | 81.2810 | 4.0000 | 1.84666 | 23.78 |
| 26 | −208.9178 | Variable | | |
| 27 | 145.4029 | 1.2000 | 1.61800 | 63.39 |
| 28 | 41.1585 | 2.8866 | | |
| 29 | −934.5306 | 4.0410 | 1.74077 | 27.76 |
| 30 | −46.3879 | 1.2000 | 1.80420 | 46.50 |
| 31 | 390.3333 | Variable | | |
| 32 (Image Plane) | ∞ | | | |

(Various Data)

| Zoom Ratio | 5.386 | | |
|---|---|---|---|
| | WIDE | MIDDLE | TELE |
| f | 72.0562 | 167.0619 | 388.0927 |
| FNo. | 4.11 | 5.18 | 5.79 |

-continued

<Embodiment 6>
f = 72.0562~388.0927
FNo. = 4.11~5.79
(Data on the Surfaces)

| 2ω° | 33.610 | 14.530 | 6.268 |
|---|---|---|---|
| Image Height | 21.633 | 21.633 | 21.633 |
| Full Lens Length | 240.127 | 284.816 | 330.165 |

Variable Interval (Focused at the Infinity-Point)

| d0 | ∞ | ∞ | ∞ |
|---|---|---|---|
| d5 | 2.5000 | 47.2958 | 92.4906 |
| d10 | 46.1612 | 18.4655 | 2.0000 |
| d17 | 17.1294 | 10.9430 | 6.3591 |
| d20 | 2.8519 | 11.5811 | 13.0322 |
| d26 | 21.9339 | 18.2572 | 2.5000 |
| BF | 66.1963 | 94.9192 | 130.4291 |

Variable Interval (Focused with 1.6-meter Distance to the Subject)

| d0 | 1359.87 | 1315.18 | 1269.84 |
|---|---|---|---|
| d5 | 2.5000 | 47.2958 | 92.4906 |
| d10 | 46.1612 | 18.4655 | 2.0000 |
| d17 | 17.1294 | 10.9430 | 6.3591 |
| d20 | 1.9768 | 8.4604 | 1.9920 |
| d26 | 22.8090 | 21.3779 | 13.5402 |
| BF | 66.1963 | 94.9192 | 130.4291 |

(Data on the Zoom Lens Groups)

| Group | Initial Surface | f |
|---|---|---|
| 1 | 1 | 172.0317 |
| 2 | 6 | −52.5524 |
| 3 | 11 | 189.0866 |
| 4 | 18 | 228.1124 |
| 5 | 21 | 69.8075 |
| 6 | 27 | −65.9427 |

(Values of the Primary Term in the Formulae)

| Formula (1) | 4.04 |
|---|---|
| Formula (2) | 46.50 |
| Formula (3) | 23.78 |

Detailed Description of Embodiment 1 to 4

The preferred embodiments disclosed as Embodiment 1 to Embodiment 4 have five groups of lens pieces, namely, the first or foremost lens group of positive refractivity, the second lens group of negative refractivity, the third lens group of positive refractivity, the fourth lens group of positive refractivity, and the fifth lens group of negative refractivity, and in order to alter the variable power from the wide-angle view to the telephoto view, at least the first, the third, the fourth, the fifth of the lens groups are moved toward the subject being photographed so that the first and the second of the lens groups to move to have an increased interval therebetween, the second and the third of them to move to have the decreased interval therebetween, the third and the fourth of them to move to have the reduced interval therebetween, and the fourth and the fifth of them to move to have the reduced interval therebetween.

The aperture stop is disposed in position closer to either the image plane or the subject being photographed in the third lens group, and it is displaced along with the lens pieces of the third lens group.

In order to focus from long distance zooming to short distance zooming, there are two ways, namely, rear-focusing (as set forth in Embodiment 1 to Embodiment 3) where the rearmost lens group closest to the image plane (the fifth in this case) is displaced, and inner-focusing (as set forth in Embodiment 4) where the rearmost lens group of positive refractivity and being the closest to the image plane of all positive lens groups is displaced. Either of the inner- and rear-focusing systems can attain more brisk and quick focusing, compared with front lens focusing, and employing these focusing systems enables the zoom lenses to be downsized without degradation in ensuring a sufficient amount of spherical light. A displacement of the lens groups relative to the identical subject being photographed becomes greater as the focal length increases.

The lens group(s) (the fourth in this case) of positive refractivity among the third lens group and all the succeeding lens groups has two or more negative lens pieces, and at least one of the negative lens pieces has its one major surface connected to another lens piece to form the composite lens of which junction serves to diverge beams incident thereon. In general, the zoom lens is prone to under-correct variations in spherical aberration unless it is specifically modified in structure to reduce the displacement of the lens groups used for the focusing. The zoom lens according to the present invention also has the first to the third of the lens groups adapted to under-correct the varied spherical aberration. With the fourth lens group of positive refractivity designed to have two negative lens pieces at least one of which is the composite lens having the beam diverging junction, the fourth lens group causes the varied spherical aberration to be overdone and prevalent, thereby countervailing the varied spherical aberration, as a whole, in the comprehensive lens optics, especially at the telephoto end.

The overdone variations in the spherical aberration by the fourth lens group is by virtue of excessively correcting the spherical aberration as a result of inducing the beams to be incident upon the fourth lens group at a higher point during the short distance zooming relative to the long distance zooming. In this way, the lens groups dedicated to the focusing does not have its performance design limited to the rear focus but have a choice of the internal focus by the rearmost lens group of positive refractivity and closest to the image plane (as in Embodiment 4).

However, any of the focusing lens groups other than the one including two negative lens pieces at least one of which is the composite lens serving to diverge beams at its junction with the remaining component lens piece(s) cannot induce the incident beams thereon to enter at the higher point during the short distance focusing, and therefore, the varied spherical aberration cannot be reduced.

To satisfy requirements of the composite lenses, it is desirable that the negative lens component should be made of glass showing a high refractive index while the positive lens component is made of glass showing a low refractive index, so as to enhance a radius of curvature at the junction between them. In the present invention, however, the requirements are defined to meet those given in the formula (1).

The best mode for the focusing with the reduced variations in the spherical aberration desirably includes a triplet composite lens of negative-positive-negative power configuration of three lens pieces in at least one lens group (in this case, the fourth) of positive refractivity among the third and the remaining succeeding ones. Although a single lens is also capable of inducing the spherical aberration to be overdone, such a mono-lens configuration is liable to cause high-order aberration as well as enhanced sensitivity, which resultantly obstructs the way of enhancing the radius of curvature.

Detailed Description of Embodiment 5 and Embodiment 6

The preferred embodiments disclosed as Embodiment 5 and Embodiment 6 have six groups of lens pieces, namely, the first or foremost lens group of positive refractivity, the second lens group of negative refractivity, the third lens group of positive refractivity, the fourth lens group of positive refractivity, the fifth lens group of positive refractivity, and the six lens group of negative refractivity, and in order to alter the variable power from the wide-angle view to the telephoto view, at least the first, the third, the fourth, the fifth and the sixth of the lens groups are moved toward the subject being photographed so that the first and the second of the lens groups to move to have an increased interval therebetween, the second and the third of them to move to have the decreased interval therebetween, the third and the fourth of them to move to have the reduced interval therebetween, and the fourth and the fifth of them to move to have the increased interval therebetween, and the fifth and the sixth of them to move to have the reduced interval therebetween. The second lens group may keep static during altering the power ratio.

The aperture stop is disposed in position closer to either the image plane or the subject being photographed in the third lens group, and it is displaced along with the lens pieces of the third lens group.

In order to focus from the long distance zooming to the short distance zooming, there are two ways, namely, the rear focus (as set forth in Embodiment 5) where the rearmost lens group closest to the image plane (the sixth in this case) is displaced, and the internal focus (as set forth in Embodiment 6) where the rearmost lens group of positive refractivity and closest to the image plane is displaced.

During altering the variable power from the wide-angle view to the telephoto view, the fourth lens group and the fifth lens group are displaced to come farther from each other. In this way, the zoom lens is satisfactorily compensated for astigmatism.

The fifth lens group includes two or more negative lens pieces one of which is a component of the composite lens that has its junction serving to diverge beams, thereby inducing the spherical aberration to be overdone and prevalent in the fifth lens group during the focusing so as to countervail the varied spherical aberration in the comprehensive lens optics, especially, at the telephoto end.

Moreover, the fourth lens group includes an additional composite lens that has a junction between the component lens pieces serving to diverge beams incident thereon, thereby functioning as an auxiliary effect of inducing the overdone spherical aberration. In this way, the fourth lens group in combination with the fifth cooperatively works to reduce the varied spherical aberration during the focusing.

What is claimed is:

1. In an inner-focusing zoom lens comprising multiple groups of lens pieces, including a first lens group of positive refractivity on the object side within the zoom lens, a second lens group of negative refractivity, and at least three trailing lens groups having positive refractivity, as a whole, at both the wide angle end and the telephoto end, wherein:
   the trailing lens groups include a third lens group of positive refractivity, a fourth lens group of positive refractivity, and a fifth lens group of negative refractivity all arranged in this order from an object side to an image side,
   the fourth lens group includes two or more negative lens pieces, at least one of which is connected on its surface to another lens piece to form a composite lens so that the junction between two of them functions to diverge incident beams; and
   a sum of the refractivities of all the junctions of the composite lens can be expressed as $\Sigma\phi=\Sigma|(N1-N2)/R|$ where N1 and N2 are refractivities that substances before and after the junction of the composite lens respectively have, R is a radius of curvature of the junction, ft is a focal length of the comprehensive lens optics of the zoom lens at the telephoto end, and $\phi t=1/ft$ is the refractivity of the comprehensive lens optics at the telephoto end, the requirements as defined in the following formula are satisfied:

$$2<\Sigma\phi/\phi t<10 \tag{1}$$

2. The inner-focusing zoom lens according to claim 1, wherein there are at least four trailing lens groups, including a third lens group of positive refractivity, a fourth lens group of positive refractivity, a fifth lens group of positive refractivity, and a six lens group of negative refractivity all arranged in this order from an object side to an image side; the fifth lens group including two or more negative lens pieces, at least one of which is connected on its surface to another lens piece to form a composite lens so that the junction between two of them functions to diverge incident beams.

3. A rear-focusing zoom lens comprising multiple groups of lens pieces, including a first lens group of positive refractivity on the object side within the zoom lens, a second lens group of negative refractivity, and at least three trailing lens groups having positive refractivity, as a whole, at both the wide angle end and the telephoto end, wherein:
   the trailing lens groups include a third lens group of positive refractivity, a fourth lens group of positive refractivity, and a fifth lens group of negative refractivity all arranged in this order from an object side to an image side;
   the fourth lens group includes two or more negative lens pieces, at least one of which is connected on its surface to another lens piece to form a composite lens so that the junction between two of them functions to diverge incident beams;
   a sum of the refractivities of all the junctions of the composite lens can be expressed as $\Sigma\phi=\Sigma|(N1-N2)/R|$ where N1 and N2 are refractivities that substances before and after the junction of the composite lens respectively have, R is a radius of curvature of the junction, ft is a focal length of the comprehensive lens optics of the zoom lens at the telephoto end, and $\phi t=1/ft$ is the refractivity of the comprehensive lens optics at the telephoto end, the requirements as defined in the following formula are satisfied:

$$2<\Sigma\phi/\phi t<10 \tag{1), and}$$

the rearmost lens group closest to the image plane of the zoom lens primarily conducts the focusing.

4. The inner-focusing zoom lens according to claim 1, wherein at least one lens group of positive refractivity among the trailing lens groups includes a triplet composite lens of negative-positive-negative power configuration in that order from an object side to an image side.

5. The inner-focusing zoom lens according to claim 1, wherein
   the first lens group at least includes one negative lens piece and two or more positive lens pieces, and the first lens group provides optical properties as expressed by the following formulae:

$$40<vd1<55 \tag{2}$$

$$20<vd2<35 \tag{3}$$

where vd1 is an Abbe number for all of the negative lens pieces in the first lens group, and vd2 is the Abbe number for all of the positive lens pieces in any one of the lens groups of positive refractivity succeeding the first lens group.

* * * * *